(12) United States Patent
Saito et al.

(10) Patent No.: US 9,886,188 B2
(45) Date of Patent: Feb. 6, 2018

(54) MANIPULATING MULTIPLE OBJECTS IN A GRAPHIC USER INTERFACE

(75) Inventors: Akira Saito, Yamato (JP); Takeyuki Shimura, Yamato (JP); Shigeki Takeuchi, Yamato (JP); Hayato Uenohara, Yamato (JP); Satoshi Yokoyama, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 507 days.

(21) Appl. No.: 13/217,780

(22) Filed: Aug. 25, 2011

(65) Prior Publication Data
US 2013/0055127 A1 Feb. 28, 2013

(51) Int. Cl.
G06F 3/0488 (2013.01)
G06F 17/30 (2006.01)
G06F 3/0486 (2013.01)
G06F 3/0481 (2013.01)
G06F 3/0484 (2013.01)

(52) U.S. Cl.
CPC ........ G06F 3/04883 (2013.01); G06F 3/0486 (2013.01); G06F 3/04817 (2013.01); G06F 3/04842 (2013.01); G06F 17/30115 (2013.01); G06F 17/30126 (2013.01)

(58) Field of Classification Search
CPC .. G06F 3/0486; G06F 3/0482; G06F 3/04817; G06F 17/30126; G06F 17/30115
USPC .................................................. 715/769, 810
See application file for complete search history.

(56) References Cited

U.S. PATENT DOCUMENTS

| | | | | |
|---|---|---|---|---|
| 8,316,022 B2* | 11/2012 | Matsuda et al. | | 707/736 |
| 8,402,382 B2* | 3/2013 | Agarawala et al. | | 715/765 |
| 8,793,605 B2* | 7/2014 | Szeto | | 715/769 |
| 2004/0150664 A1* | 8/2004 | Baudisch | | 345/740 |
| 2007/0245266 A1* | 10/2007 | Zerba | | 715/837 |
| 2007/0271524 A1* | 11/2007 | Chiu et al. | | 715/767 |
| 2008/0250190 A1* | 10/2008 | Johnson | | 711/103 |
| 2011/0072344 A1* | 3/2011 | Harris | | G06F 3/04817 715/702 |
| 2011/0197155 A1* | 8/2011 | Lee et al. | | 715/770 |
| 2012/0084689 A1* | 4/2012 | Ledet et al. | | 715/769 |
| 2012/0324368 A1* | 12/2012 | Putz et al. | | 715/748 |

FOREIGN PATENT DOCUMENTS

| | | | |
|---|---|---|---|
| JP | H09244848 A | 9/1997 | |
| JP | 2004110734 A | 4/2004 | |
| JP | 2004280532 A | 10/2014 | |

* cited by examiner

*Primary Examiner* — Christopher J Fibbi
(74) *Attorney, Agent, or Firm* — Patents on Demand P.A.; Brian K. Buchheit

(57) ABSTRACT

An embodiment of the disclosure displays a plurality of icons for files and a plurality of icons for folders within a graphical user interface. A set of two or more icons can be selected via user input for inclusion within a group object. The group object can be moved within the graphical user interface responsive to user input to within a predetermined range of one of the icons for one of the folders. Responsive to moving, a subset of files of the group object can be determined. Selection of the files within the subset can be based on whether attributes of the folder match attributes of the files. Additionally, responsive to moving the group object, the subset of files can be moved or copied to the one of the folders to which the group object was moved.

25 Claims, 54 Drawing Sheets

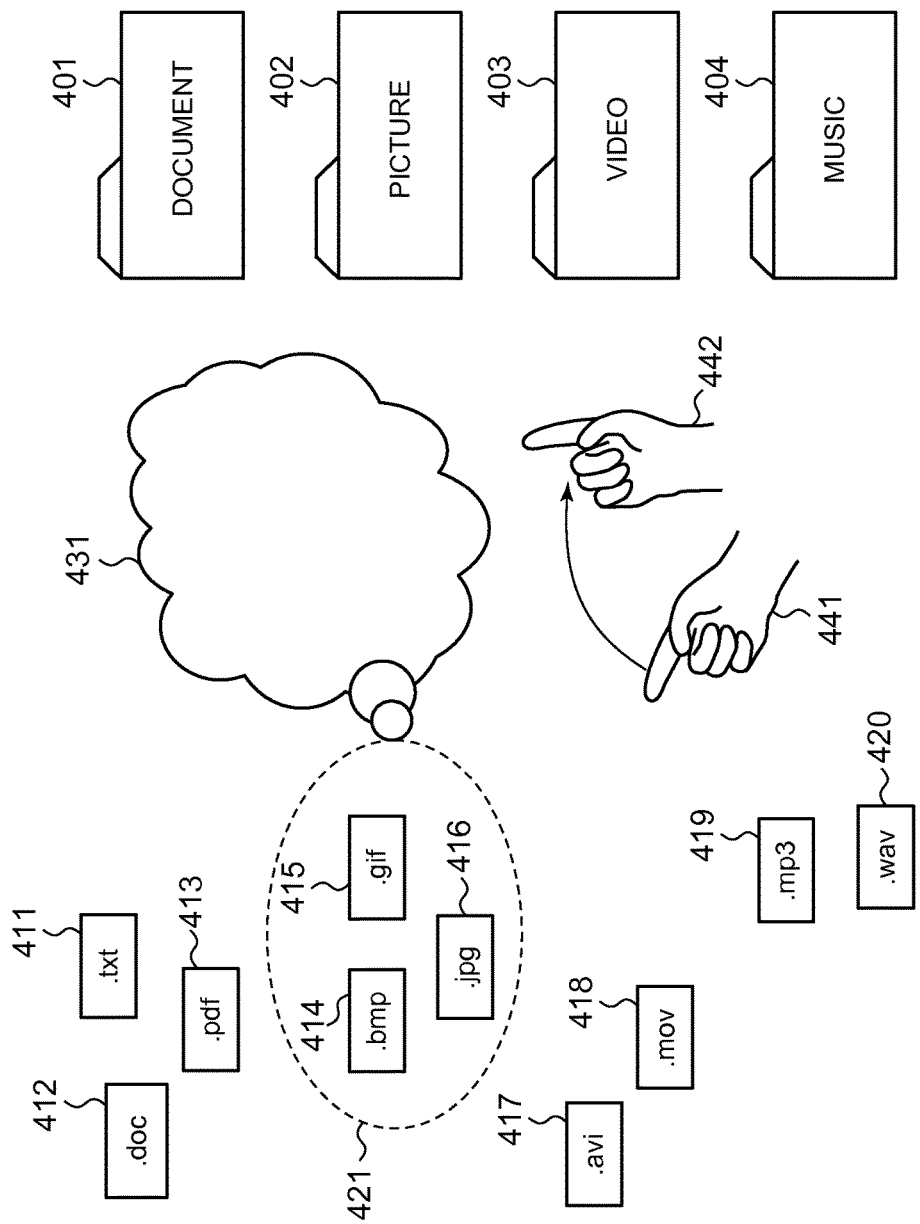

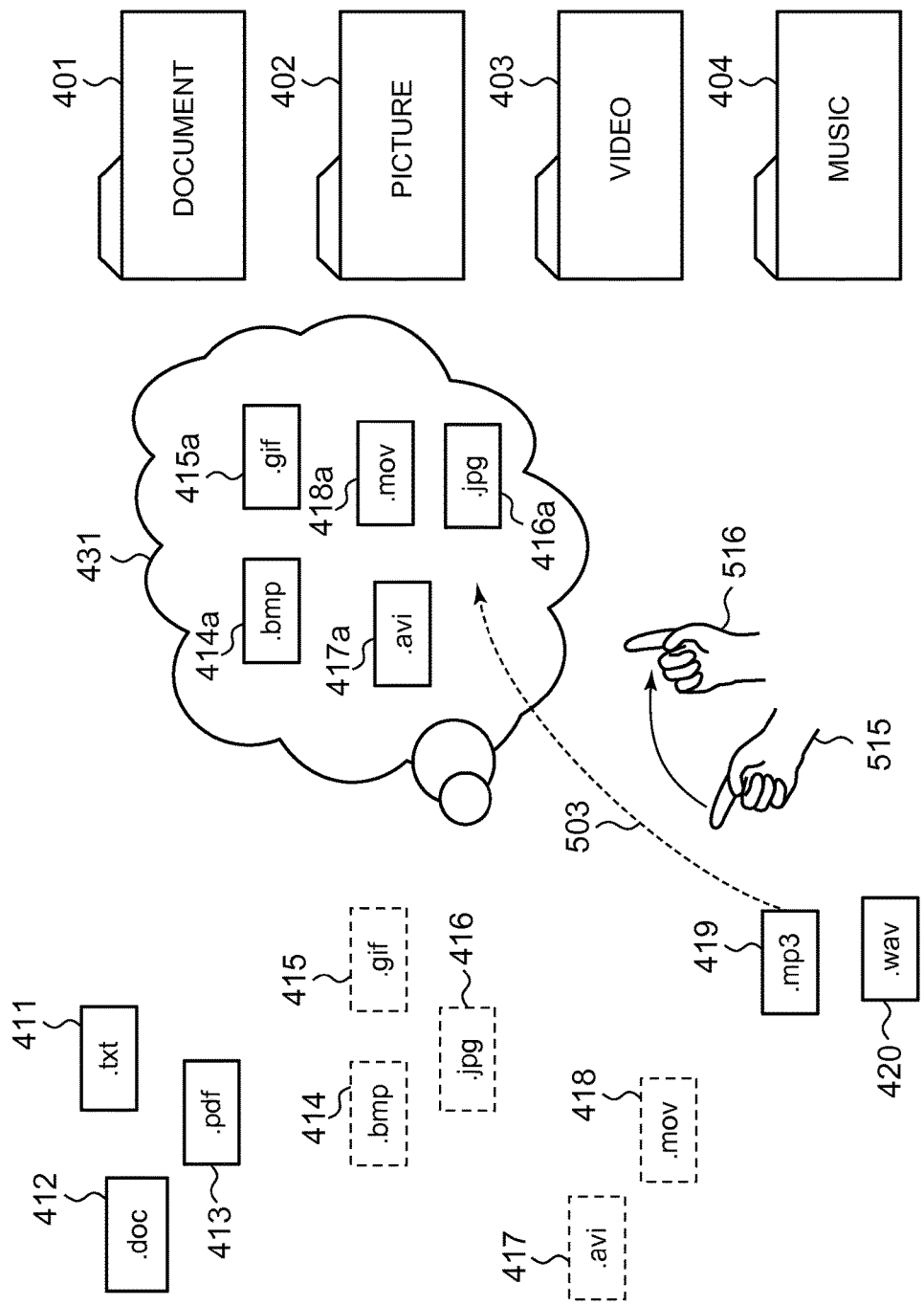

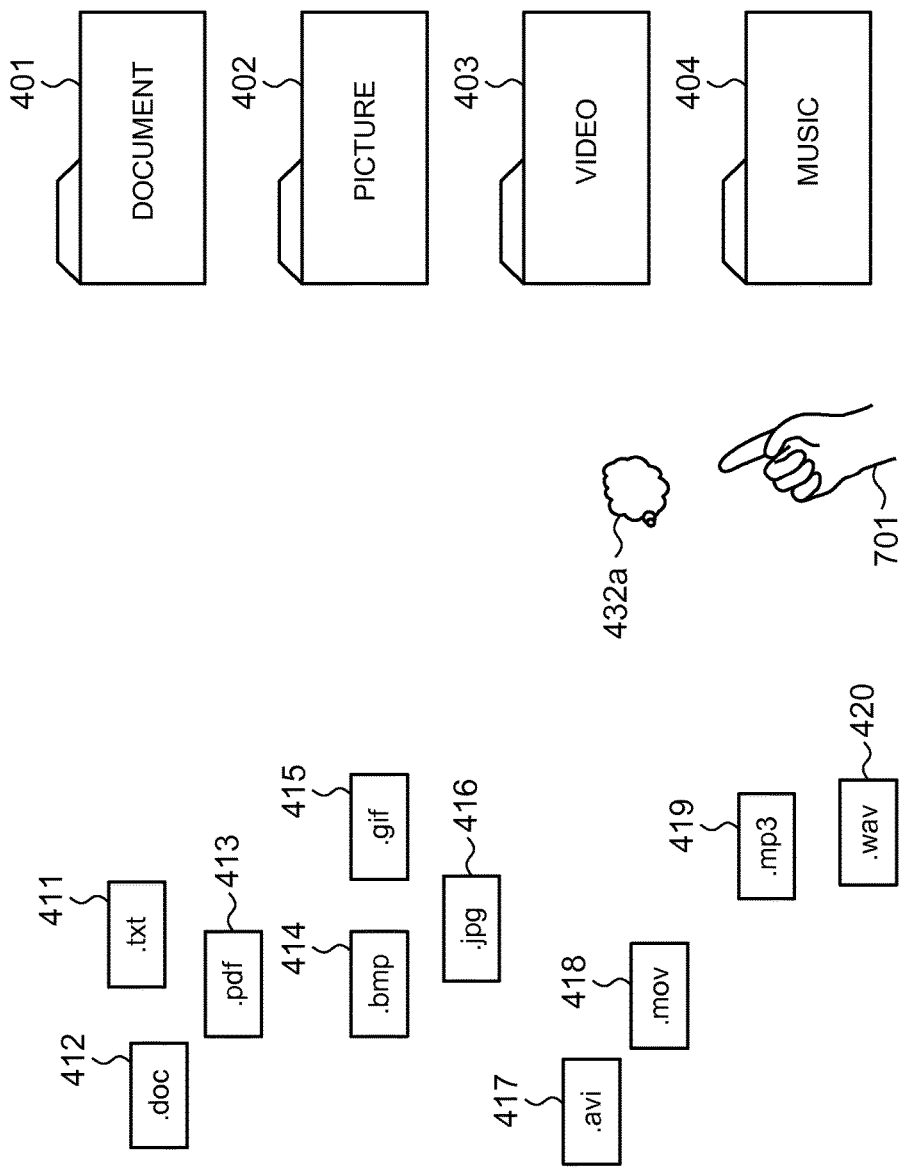

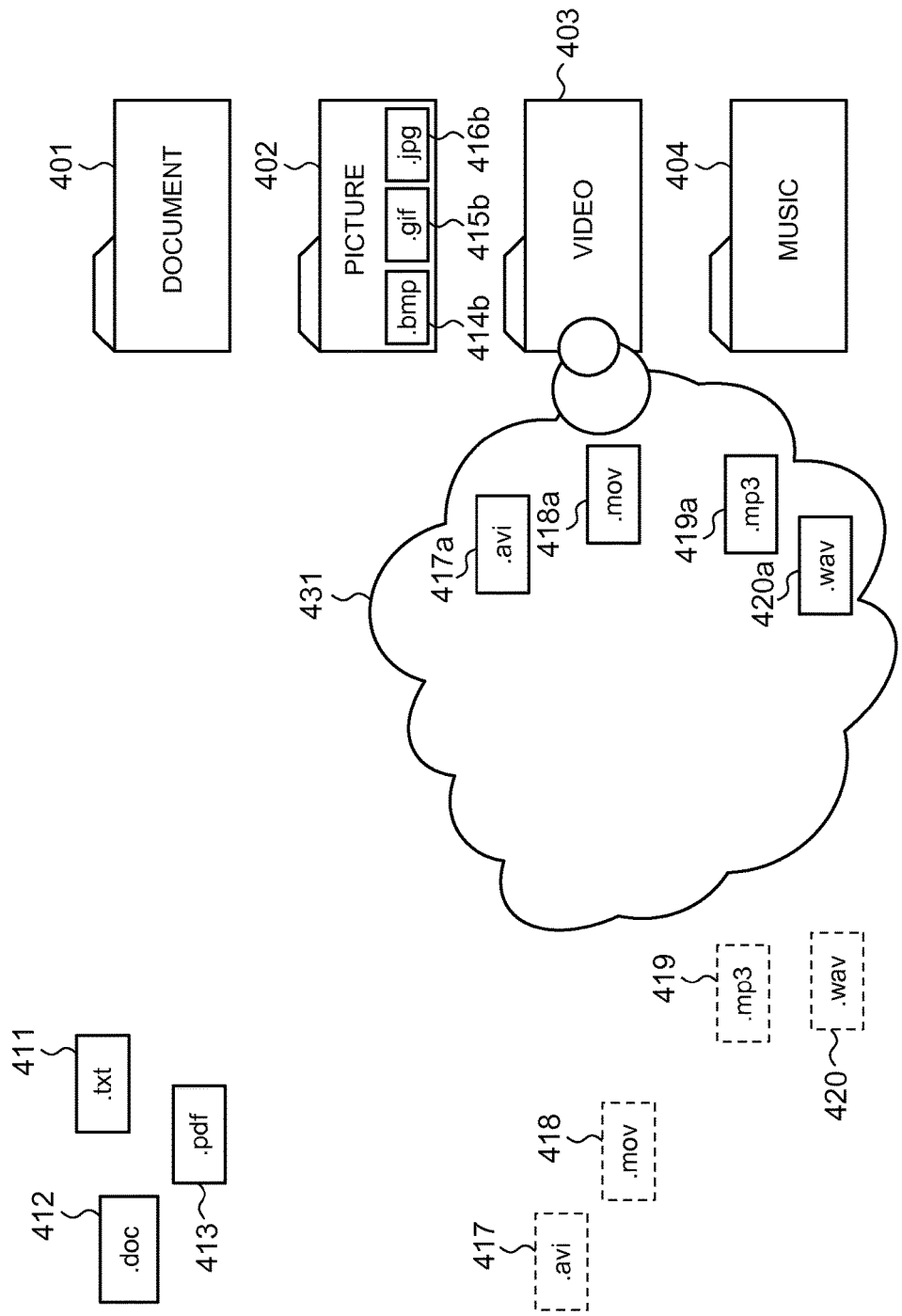

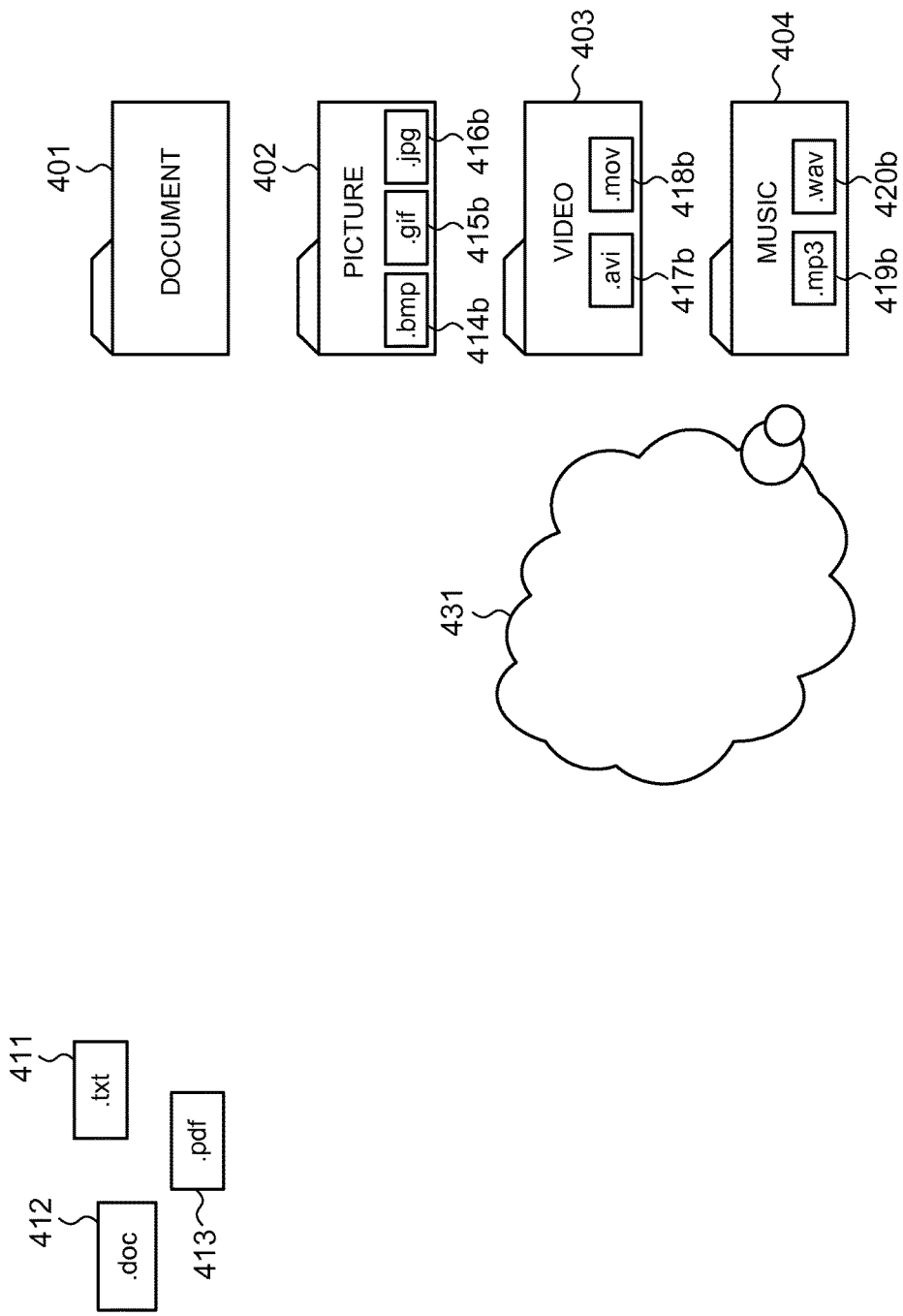

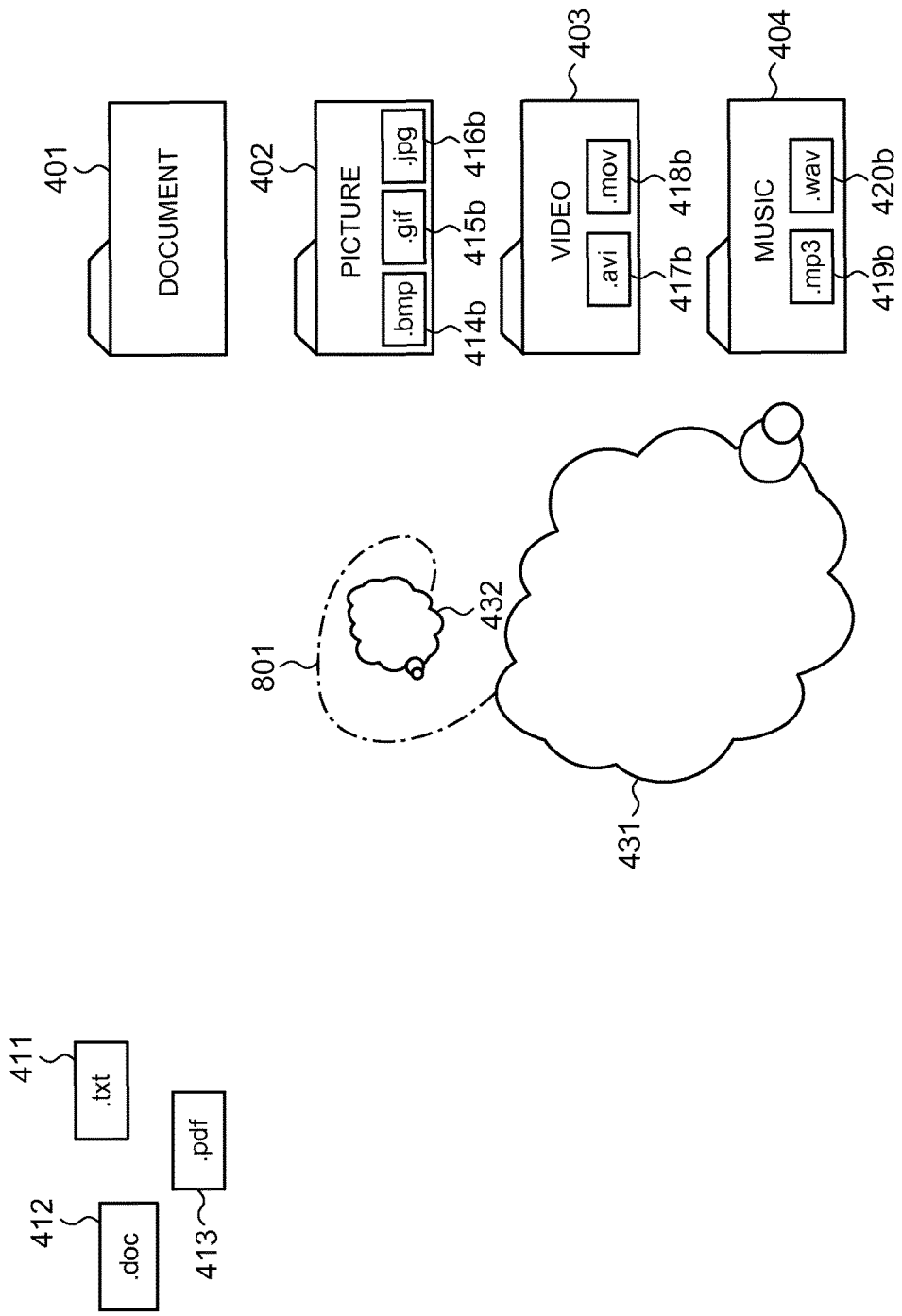

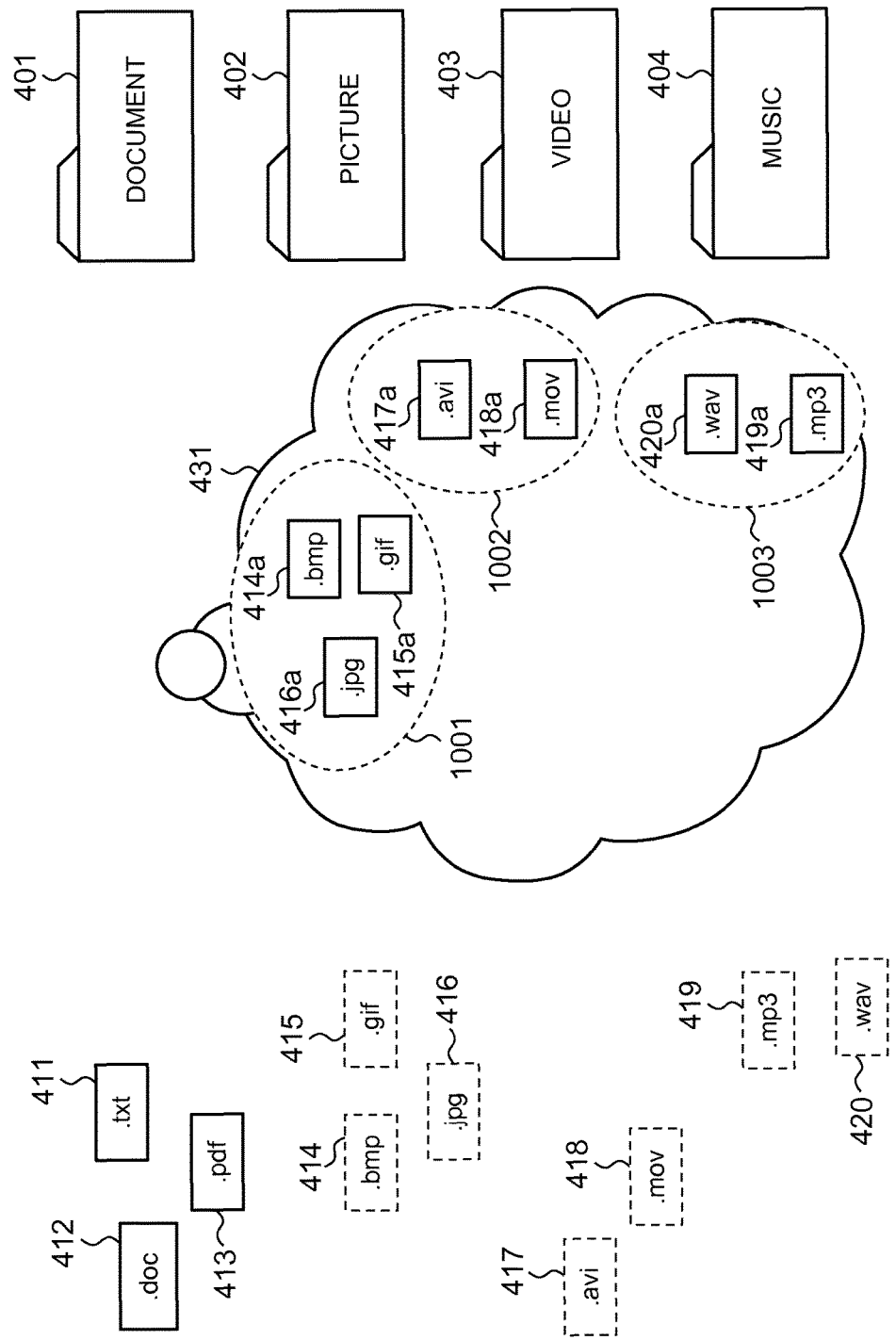

MANIPULATING MULTIPLE OBJECTS IN A GRAPHIC USER INTERFACE

BACKGROUND

The present invention relates to a graphical user interface for manipulating multiple objects.

Recently, there has been an increase in opportunities to use devices capable of manipulating objects intuitively with touch controls, such as a computer, a smart phone, a music player, a photo frame, or a game machine, equipped with a touch screen (also called a touch panel). On these touch screens, files need to be handled by the work of fingers.

BRIEF SUMMARY

In one aspect of the disclosure can include a method that displays a plurality of icons for files and a plurality of icons for folders within a graphical user interface. A user input to create a group object can be received, which results in a group object being created and being displayed in the graphical user interface. A set of two or more icons can be selected via user input for inclusion within the group object. The group object can be moved within the graphical user interface responsive to user input. The moving of the group object can be within a predetermined range of one of the icons for one of the folders. Responsive to moving the group object, a subset of files of the group object can be determined. The subset can comprise at least one but less a total number of files of the group object. Selection of the files within the subset can be based on whether attributes of the folder match attributes of the files. Additionally, responsive to moving the group object, the subset of files can be moved or copied to the one of the folders to which the group object was moved.

In one aspect of the disclosure can include a method that selects two more of a plurality of objects within a graphical user interface in response to a first operation performed by software executing on a device comprising hardware. The first operation can occurs responsive to user input. A group object used for manipulating objects can be displayed in the graphical user interface in response to a second operation performed by software executing on the device. The second operation can occurs responsive to user input. The selected objects can be displaying in the group object in response to a third operation performed by software executing on the device. When the group object has been moved within the graphical user interface from a starting position to within a predetermined range of a first destination object, a subset of the selected objects can be copied or moved into the first destination object. The subset can comprise at least one object but less a total number of objects contained within the group object. The determination of which of the selected objects is to be copied or moved to the first destination object is made based on attributes associated with files to which the selected objects correspond. The moving of the group object within the graphical user interface can occur in response to a fourth operation performed by software executing on the device. The fourth operation can be performed in response to user input.

Systems and computer-program products embodying the invention are also provided.

BRIEF DESCRIPTION OF THE SEVERAL VIEWS OF THE DRAWINGS

FIG. 4C is a diagram showing the operation example to activate the group object used in the embodiments of the disclosure;

FIG. 5D is a diagram showing the operation example to move files into the group object used in the embodiments of the disclosure;

FIG. 7A is a diagram showing an operation example to activate a group object again after temporarily hiding the group object used in the embodiments of the disclosure;

FIG. 8D is a diagram showing the operation example, in accordance with an embodiment of the disclosure, to move, into the multiple destination objects, the specific objects among the objects displayed in the group object;

FIG. 8G is a diagram showing the operation example, in accordance with an embodiment of the disclosure, to move, into the multiple destination objects, the specific objects among the objects displayed in the group object;

FIG. 8H is a diagram showing the operation example, in accordance with an embodiment of the disclosure, to move, into the multiple destination objects, the specific objects among the objects displayed in the group object;

FIG. 10C is a diagram showing the operation example, in accordance with an embodiment of the disclosure, to sort the objects in the group object when the group object has been moved into the predetermined range of the destination object;

DETAILED DESCRIPTION

Figure 1:
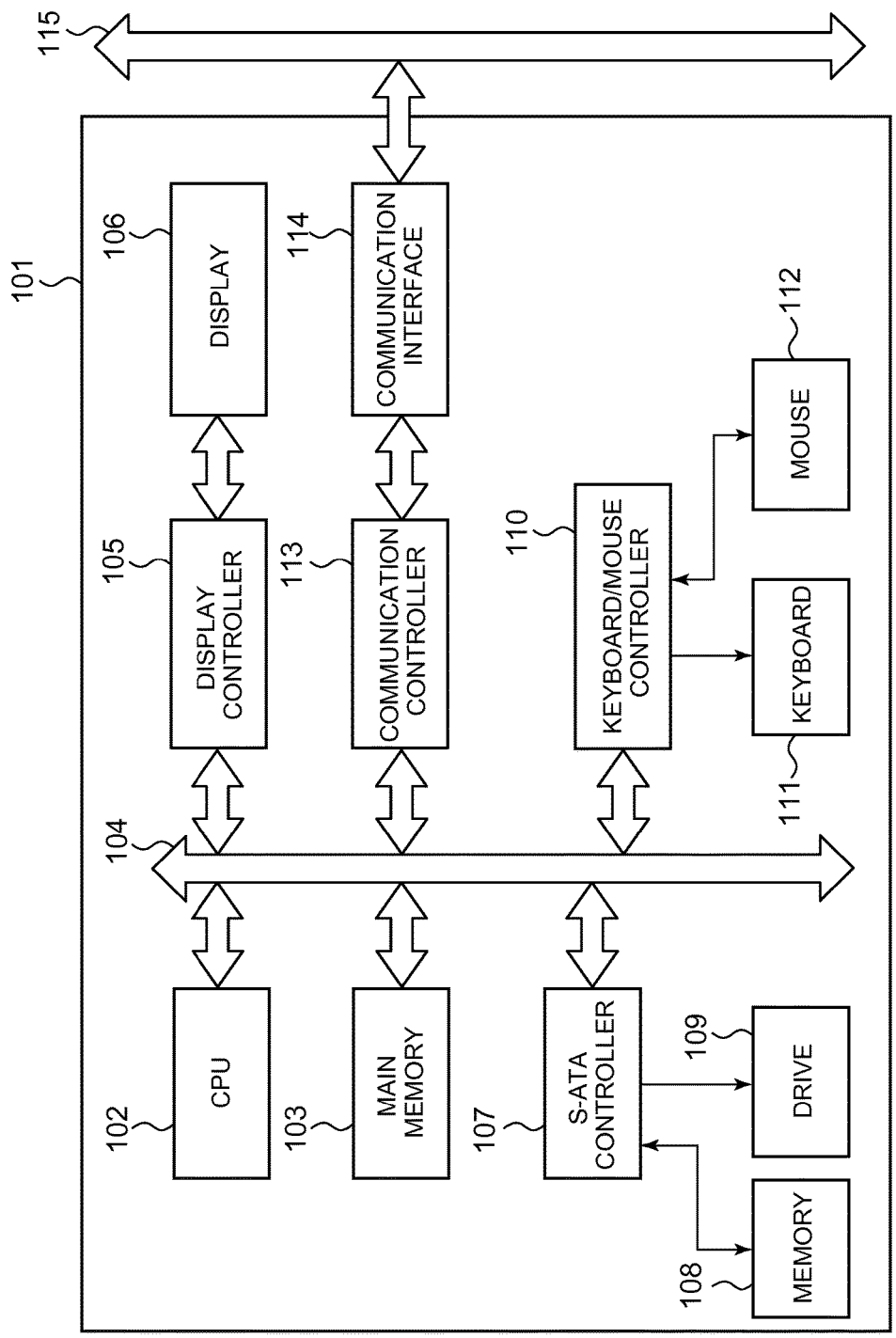
FIG. 1 is a block diagram of computer hardware in embodiments of the disclosure.

Keeping files organized is burdensome for users. For example, there is a case where various files, such as document files, picture files, video files, and music files, are placed on the desktop. In such a case, for example, there is a need to select the document files, the picture files, the video files, and the music files, respectively, and move the files to predetermined folders, such as "document," "picture," "video," and "music" folders (see FIG. 3B to be described later). At this time, though two or more files can be selected at the same time, the user can specify only one folder as their destination. Thus, when moving files to two or more destinations, the user is required to select files for each destination. Problems with known solutions for file selection have been recognized during the course of discovering the present solution to these problems.

Specifically, embodiments of the disclosure provide a method of manipulating multiple objects in a device capable of manipulating objects. In one embodiment, one or more objects displayed on a screen of a device can be selected responsive to receiving user input (i.e., in response to a first operation). A group object used to manipulate objects can be displayed (i.e., in response to a second operation).

Selected objects in the group object can then be displayed (i.e., in response to a third operation). The group object can be moved responsive to user input into a predetermined range of a first destination object (e.g., drop- and drag to the first destination object or its vicinity). When the group object has been moved into a predetermined range of a first destination object (i.e., in response to a fourth operation), a specific object among the objects displayed in the group object can be copied or moved into the first destination object. Alternatively, responsive to the moving of the group object to the first destination object, an attribute associated with the first destination object (or an attribute associated with an object stored in the first destination object) can be opened.

In one embodiment of the present invention, when the group object has been moved into a predetermined range of the first destination object (e.g., on the first destination object or the vicinity), the group object processing section sorts and displays the objects displayed in the group object or groups and displays the objects displayed in the group object according to an attribute associated with the first destination object or an attribute associated with an object stored in the first destination object.

In one embodiment of the present invention, when the group object is within a predetermined range of a first destination candidate object and a second destination candidate object, the group object processing section displays an object, having an attribute identical or similar to an attribute associated with the first destination candidate object or an attribute associated with an object stored in the first destination candidate object, at a position close to the first destination candidate object in the group object, and an object, having an attribute identical or similar to an attribute associated with the second destination candidate object or an attribute associated with an object stored in the second destination candidate object, at a position close to the second destination candidate object in the group object.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram of computer hardware in the embodiments of the present invention.

A computer 101 includes a CPU 102 and a main memory 103, which are connected to a bus 104. The CPU 102 is preferably based on a 32-bit or 64-bit architecture. For example, Intel Corporation's Core i™ series, Core 2™ series, Atom™ series, Xeon™ series, Pentium® series, Celeron® series, AMD Corporation's Phenom™ series, Athlon™ series, Turion™ series, or Sempron™ can be used. A display 106 such as a liquid crystal display (LCD) can be connected to the bus 104 through a display controller 105. The display 106 is used to display, on an appropriate graphic interface, information on a computer connected to a network through a communication line to manage the computer and information on software running on the computer. A disk 108 can also be connected to the bus 104 through an SATA or IDE controller 107. For example, a hard disk or silicon disk and a drive 109, such as a CD, DVD, or BD drive, can be connected. Further, a keyboard 111 and a mouse 112 can be connected to the bus 104 through a keyboard/mouse controller 110 or a USB bus (not shown).

An operating system, programs for providing a Java® computing environment such as J2EE, Java® application, Java® virtual machine (VM), and Java® runtime (JIT) compiler, the other programs, and data are stored on the disk (108) in a manner to be able to be loaded into the main memory.

The drive 109 is used to install a program from a CD-ROM, a DVD-ROM, or a BD onto the disk 108 as needed.

For example, a communication interface 114 follows the Ethernet® protocol. The communication interface 114 is connected to the bus 104 through a communication controller 113 to take a role in connecting the computer 101 physically to a communication line 115, providing a network interface layer to the TCP/IP communication protocol for the communication function of the operating system on the computer 101. The communication line may be in a wired LAN environment or a wireless LAN environment based on a wireless LAN standard such as IEEE802.11a/b/g/n.

Figure 2:
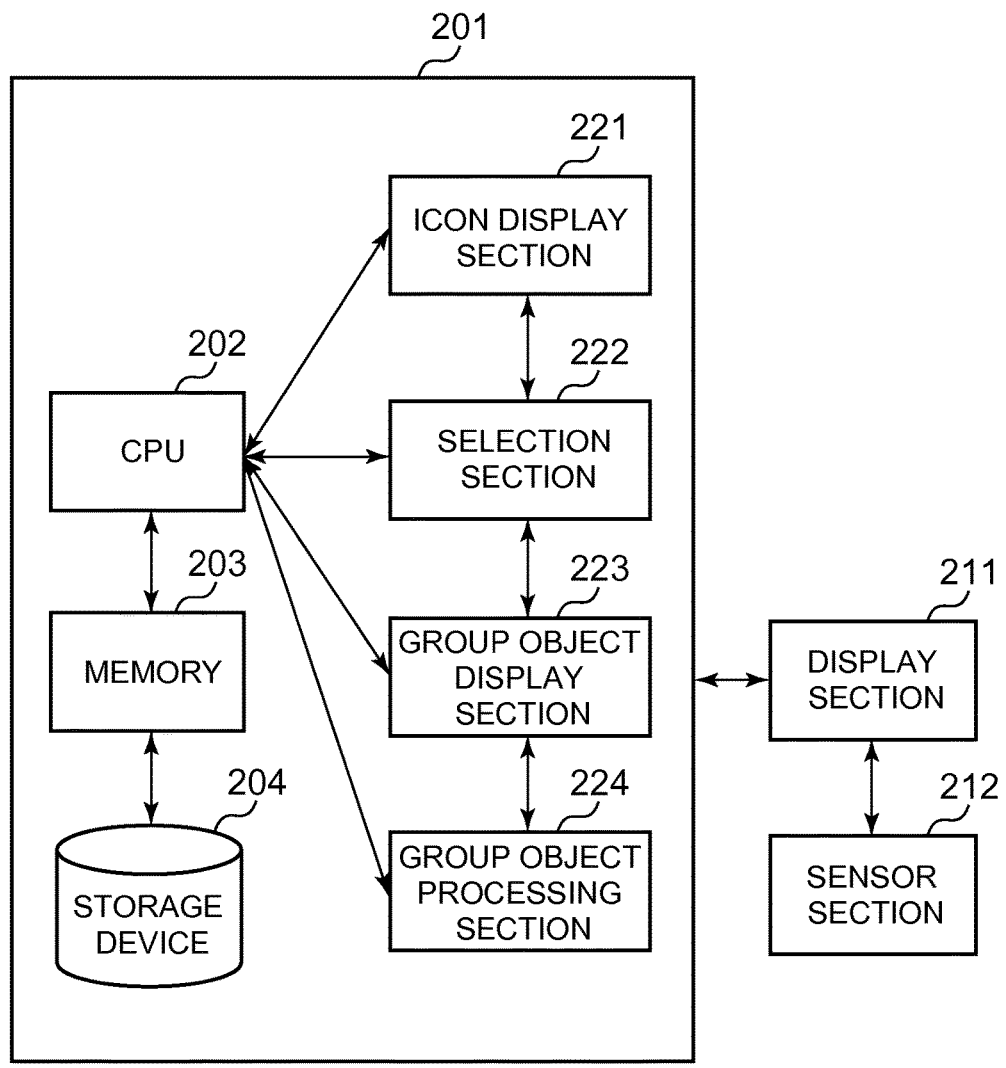
FIG. 2 is a block diagram of a device capable of manipulating objects and used in the embodiments of the disclosure.

FIG. 2 is a functional block diagram of a device 201 capable of manipulating objects and used in the embodiments of the present invention.

For example, the "device capable of manipulating objects" (hereinafter simply called "device" as well) means a touch-input capable device (e.g., a touch screen or a touch pad), a variety of sensors (such as a proximity sensor, a line-of-sight sensor, or a brain wave sensor), or a computer, a smart phone, a music player, a photo frame, a game machine, a tablet, or an information board equipped with a device that allows entries with a click and/or drag operation using a mouse or a touch pen, a gesture of the mouse, or a flick of the pen. The device is also a device capable of selecting objects. The proximity sensor can be a sensor for detecting the motion of a human, such as the motion of a hand, a finger, an arm, or a leg, to enable the selection of an object(s) on the device. The line-of-sight sensor (also called a view tracking system) is a sensor for detecting the movement of a human eye to enable eye-gaze input onto the device. The brain wave sensor is a sensor for detecting human brain waves or a state of consciousness to enable input onto the device.

In the embodiments of the present invention, the "operations" include, for example, touch operations, various sensor detectable operations, click and/or drag operations, mouse gesture operations, and pen flick operations. In the following, these "operations" may be simply called user's operations. Specific examples of these operations are predefined in association with the content of each object manipulation. Those skilled in the art can set the content about how to manipulate the object as appropriate.

For example, in first and second embodiments to be described later, a user can move a group object into a predetermined range of a destination object to copy or move objects in the group object into the destination object. The user's operations in this case are as follows.

1. In the case of touch operations or various sensor detectable operations:
   (1) When the user drags objects to be selected onto a destination object with a finger or a hand, an operation designed for the destination object is performed. In other words, if the destination object is on the same disk volume as the selected object, the selected object is moved into the destination object, while if the destination object is on a disk volume different from the selected object, the selected object is copied into the destination object.
   (2) When the user does a long press, with a finger or a hand, on an object to be selected, a menu for selecting a copy or move operation is displayed to enable the user to select copy or move. After selecting copy or move, when the user drags the object to the destination object, the copy or move operation selected by the user is performed.
   (3) When the user drags a file to be selected to a destination object and drops thereon using a finger or a hand, a dialog for selecting copy or move is displayed on the destination object. If the user selects copy or move, the copy or move operation selected by the user is performed.
2. In the case of click and/or drag or various sensor detectable operations:
   (1) When the user drags an object to be selected to a destination object with a left-click, an operation designed for the destination object is performed. In other words, if the destination object is on the same disk volume as the selected object, the selected object is moved into the destination object, while if the destination object is on a disk volume different from the selected object, the selected object is copied into the destination object.

(2) When the user right-clicks on an object to be selected, a menu for selecting copy or move is displayed to enable the user to select copy or move. After selecting copy or move, when the user drags the object to a destination object, the copy or move operation selected by the user is performed.

(3) When the user right-clicks on an object to be selected to select the object, and drags the object to a destination object and drops thereon, a dialog for selecting copy or move is displayed on the destination object. When the user selects copy or move, the copy or move operation selected by the user is performed.

3. In the case of a mouse gesture or pen flick operation, the same technique as above is applied.

The device 201 includes a CPU 202, a memory 203, and a storage device 204. The device also includes a display section 211 (e.g., a liquid crystal display device) for displaying objects and a group object. The device can also include a sensor section 212 for receiving signals from a touch screen or touch pad, or various sensors. Further, the device can include a device (e.g., mouse 112) that allows entries using click and/or drag, mouse gesture, or pen flick operations.

In the embodiments of the present invention, the "objects" include, for example, folders, files, and shortcuts. The files include, for example, data files and application files. The shortcuts include, for example, folder shortcuts, file shortcuts, and application shortcuts. The objects can be displayed within folders on the display section 211 typically as icon images.

In the embodiments of the present invention, the "group object" is used to help a user to manipulate and process objects, which is an intermediate tray inside the screen to temporarily hold and record objects selected by the user therein. Further, the "group object" is temporarily used to enable the user to manipulate and process multiple objects all at once. In addition, the "group object" can show the user objects selected by the user in the form of icons therein.

The device 201 can further include an icon display section 221, a selection section 222, a group object display section 223, and a group object processing section 224.

The icon display section 221 displays objects on the display section 211. For example, the objects can be displayed on a folder as icons.

The group object display section 223 displays a group object on the display section 211 in response to a user's operation. For example, the group object can be displayed on the desktop in the shape of a cloud. The shape of a cloud is optional, and the size of the cloud can be scaled to any size depending on the size of icons displayed in the cloud.

The group object display section 223 displays objects in the group object according to user's operations. The group object display section 223 can also provide a reduced display of the group object as a small icon or delete the group object from the display section 211 in response to a user's operation or when a predetermined period of time has elapsed.

The selection section 222 enables the selection of objects on a folder and one or multiple objects in the group object.

The group object processing section 224 can carry out first to third embodiments to be described below according to user's operations.

First Embodiment of the Disclosure

In accordance with one embodiment, When a group object has been moved into a predetermined range of a first destination object, the group object processing section 224 copies or moves, into the first destination object, a specific object among the objects displayed in the group object according to an attribute associated with the first destination object or an attribute associated with an object stored in the first destination object, or opens the object in the first destination object. Further, when a group object has been moved into a predetermined range of the n-th destination object (where n is an integer larger than one), the group object processing section 224 selects a specific object from among the objects in the group object according to an attribute associated with the n-th destination object or an attribute associated with an object stored in the n-th destination object, and copies or moves the selected specific object into the n-th destination object, or opens the object in the n-th destination object.

When the specific object (e.g., a folder, a file, or a shortcut) in the group object is copied into the destination object (e.g., a folder), it means that the specific object exists both in the group object and the destination object.

When the specific object (e.g., a folder, a file, or a shortcut) in the group object has been moved into the destination object (e.g., a folder), it means that the specific object disappears from the group object and exists in the destination object. In this case, since the specific object disappears from the group object, the specific object also disappears from the original position before being moved to the group object.

Opening, in the destination object (e.g., an application file or its shortcut), the specific object (e.g., a folder, a file, or a shortcut) in the group object means that the specific file is opened in the destination object.

The time "when the group object has been moved into the predetermined range of the first or n-th destination object" means that the group object is moved near the first or n-th destination object, or the group object is so moved that the group object will overlap at least part of the first or n-th destination object.

The attributes associated with objects include, for example, information associated with a folder, a file, or a shortcut, information associated with an application, information associated with music, video, image or picture data, information associated with an electronic book, and information associated with a link.

The information associated with a folder, a file, or a shortcut includes part or all of its name, its extension, kind, size (capacity), created date and time, updated date and time, its creator, access right (e.g., given to a user or a group), character code, format or version corresponding to the application, and its tag and title.

For example, file extensions are as follows.
Document File: txt, doc, pdf, htm(html)
Image File: bmp, gif, jpg(jpeg), png
Audio File: mp3, way, aiff, rm(ra, ram), asf(wma)
Video File: mpg(mpeg), avi, mov, rm(ra, rm), asf(wma)
Compressed File: lzh, zip
Fragmented File: bat
Executable File: exe When the objects are folders, the folder types include, for example, document, picture, video, and music. The attributes of objects that can be stored in the folder may be associated with the folder types.

The information associated with an application includes, for example, information on the application itself (e.g., company name, product name, version, digital signature, price, etc.), and the format corresponding to the application or its version. For example, the format corresponding to the application is as follow: Microsoft® Word 2007 version can handle Word files (Word 2007 format) created in the version and Word files (Word 97-2003 formats) created in previous versions. However, Microsoft® Word 2003 version cannot handle Word files created in the 2007 version by default. Thus, since the Word 2007 format and the Word 97-2003 formats are different in the format corresponding to the application, both files can be handled as different files.

The information associated with music or image data includes, for example, title, artist name, recorded album name, composer's name, lyric writer's name, record company name, genre, playback term, released date, listening frequency, and listener reviews.

The information associated with image or picture data includes, for example, a subject(s) seen thereon (e.g., person, animal, etc.), shooting date, shooting location (e.g., GPS data), film number, and recording number.

The information associated with an electronic book includes, for example, title, publisher name, genre, published date, and reading frequency.

The information associated with a link includes domain name of a URL link, page title, last updated date and time of the page, dead link.

In one example of the disclosure, copying or moving, or opening the above-mentioned specific object includes reading an attribute associated with the first destination object or an attribute associated with an object stored in the first destination object, and copying or moving an object having the same attribute, read as mentioned above among the objects displayed in the group object, into the first destination object, or opening the object in the first destination object.

In another example of the disclosure, when there are two or more attributes associated with the first destination object or two or more attributes associated with objects stored in the first destination object, copying or moving, or opening the above-mentioned specific object includes calculating the percentage of presence of each of the attributes of the objects in the first destination object or the number of objects, copying or moving, into first destination object, objects having an attribute whose calculated percentage of presence or the number of objects is largest among the objects displayed in the group object, or opening the objects in the first destination object.

Second Embodiment of the Disclosure

In accordance with an embodiment of the disclosure, when the group object has been moved into the predetermined range of the first destination object, the group object processing section 224 can display the objects displayed in the group object by sorting the objects or display the objects displayed in the group object by grouping the objects according to the attribute associated with the first destination object or the attribute associated with an object stored in the first destination object. When the group object has been moved into the predetermined range of the n-th destination object (where n is an integer larger than one), the group object processing section 224 can display the objects displayed in the group object by sorting the objects or display the objects displayed in the group object by grouping the objects according to the attribute associated with the n-th destination object or the attribute associated with an object stored in the n-th destination object.

In one example of the present invention, the above-mentioned sorting includes reading an attribute associated with the first or n-th destination object or an attribute associated with the object stored in the first or n-th destination object, and displaying objects, having the same attribute as the read attribute among the objects displayed in the group object, at a position close to the first or n-th destination object in the group object.

In another example of the present invention, when there are two or more attributes associated with the first or n-th destination object or two or more attributes associated with objects stored in the first or n-th destination object, the above-mentioned sorting includes calculating the percentage of presence of each of the attributes of the objects in the first or n-th destination object or the number of objects, and displaying objects, whose calculated percentage of presence or the number of objects is largest among the objects displayed in the group object, at a position close to the first or n-th destination object in the group object.

In the embodiment of the present invention, after the above-mentioned sorting, the group object processing section 224 copies or moves, into the first destination object, objects being within a range in which the objects in the group object overlap the first destination object and located in the group object, or opens the objects in the first destination object.

Third Embodiment of the Disclosure

When the group object is in a predetermined range of a first destination candidate object and a second destination candidate object, the group object processing section 224 can display objects, having an attribute identical or similar to the attribute associated with the first destination candidate object or the attribute associated with an object stored in the first destination candidate object, at a position close to the first destination candidate object in the group object, and display objects, having an attribute identical or similar to the attribute associated with the second destination candidate object or the attribute associated with an object stored in the second destination candidate object, at a position close to the second destination candidate object in the group object.

In the embodiment of the present invention, the group object processing section 224 copies or moves, into the first destination object, the objects displayed at the position close to the first destination candidate object in the group object or opens the objects in the first destination object, or copies or moves, into the second destination object, the objects displayed at the position close to the second destination candidate object in the group object or opens the objects in the second destination object.

Figure 3A:
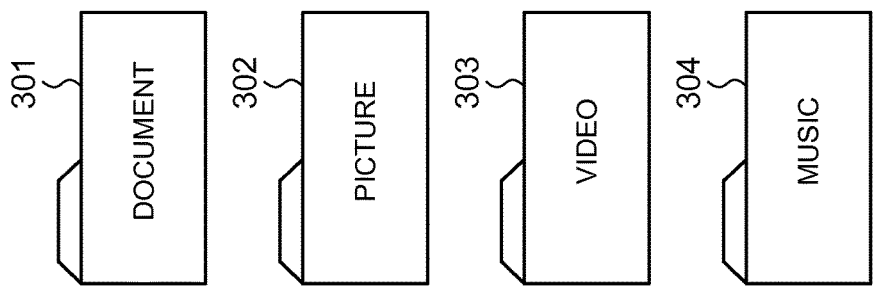
FIG. 3A is a diagram showing an operation example to move multiple files to multiple destinations in accordance with an embodiment of the disclosure.
Figure 3A:
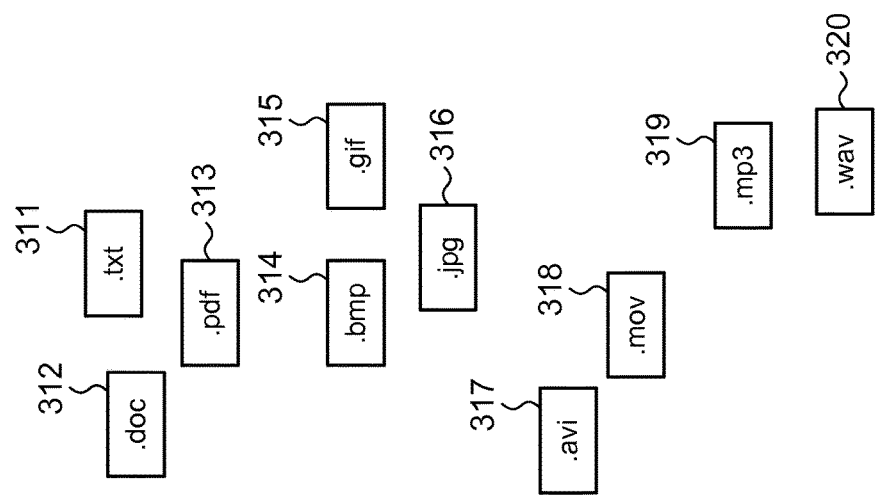
Figure 3B:
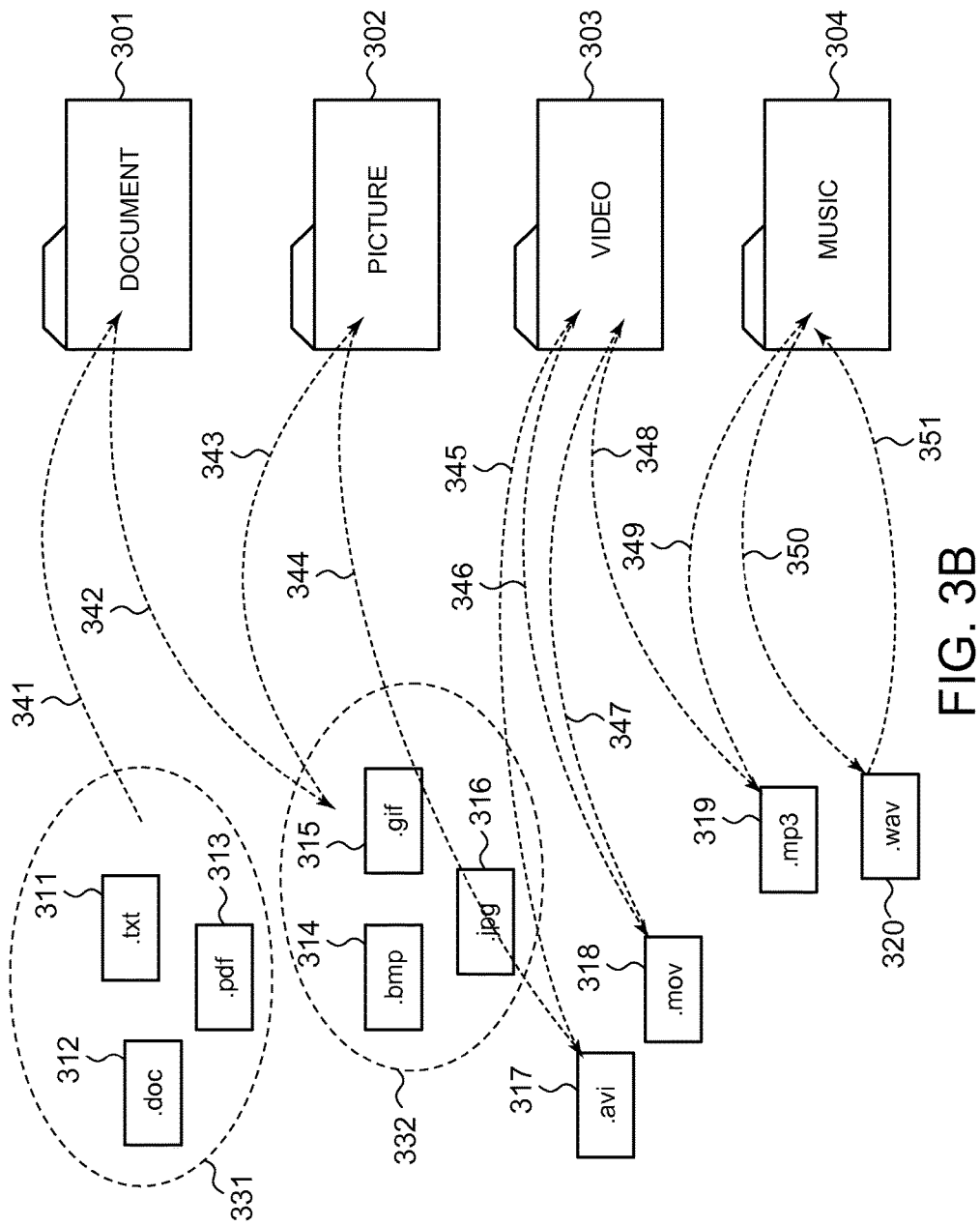
FIG. 3B is a diagram showing the operation example to move multiple files to multiple destinations in accordance with an embodiment of the disclosure.
Figure 3C:
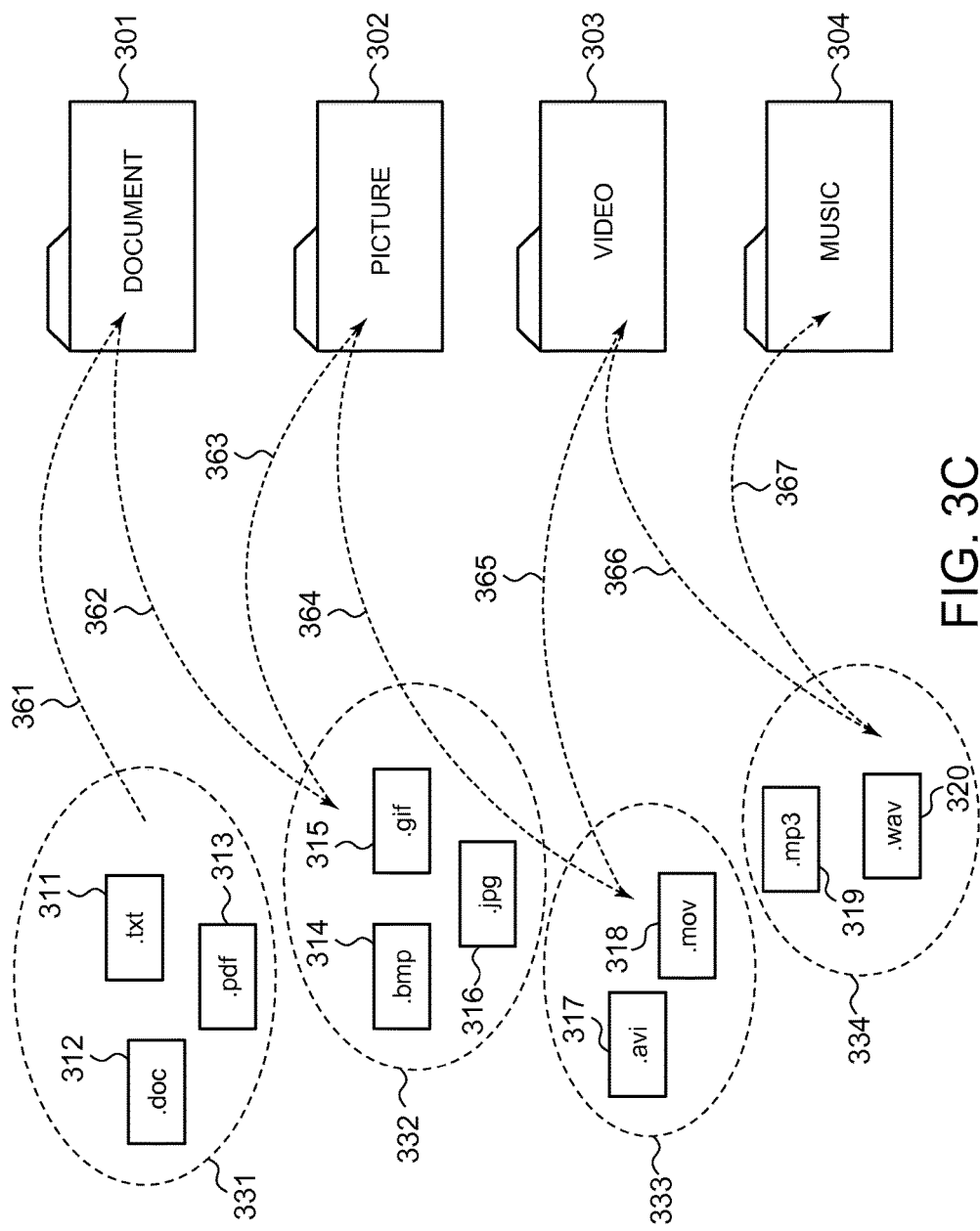
FIG. 3C is a diagram showing the operation example to move multiple files to multiple destinations in accordance with an embodiment of the disclosure.

FIG. 3A to FIG. 3C are diagrams showing an operation example when multiple files are moved to multiple destinations as a conventional technique.

FIG. 3A shows multiple files 311-320 as objects and multiple folders 301-304 that can be destinations of these files.

It is assumed that the files 311-320 and the folders 301-304 are displayed on the desktop.

Each extension of the files 311-313 indicates that the file is a document file.

Each extension of the files 314-316 indicates that the file is a picture (image) file.

Each extension of the files 317-318 indicates that the file is a video file.

Each extension of the files 319-320 indicates that the file is a music (or sound) file.

The document folder 301 is associated with an attribute indicating that the document files can be stored in the folder or file extensions storable in the folder.

The picture folder 302 is associated with an attribute indicating that the picture files can be stored in the folder or file extensions storable in the folder.

The video folder 303 is associated with an attribute indicating that the video files can be stored in the folder or file extensions storable in the folder.

The music folder 304 is associated with an attribute indicating that the music files can be stored in the folder or file extensions storable in the folder.

FIG. 3B and FIG. 3C show trajectories (the motion of a hand, a finger, or the mouse) in sorting the multiple files into the folders as the multiple destinations.

FIG. 3B shows trajectories (the motion of a hand, a finger, or the mouse) including cases where a user selects multiple files for a folder as their destination and sorts the selected multiple files into the folder all at once and where the user selects an individual file and sorts the selected individual file into a folder.

First, the user selects the document files 311-313, 331 and moves these document files into the document folder 301, 341.

Next, the user returns to the location of picture files to select picture files 342, selects the picture files 314-316, 332 and moves these picture files into the picture folder 302, 343.

Next, the user returns to the location of the video file 317 to select the video file 317, 344, selects the video file 317, and moves the file into the video folder 303, 345. Similarly, the user returns to the location of the video file 318, 346, selects the video file 318, and moves the video file 318 into the video folder 303, 347.

Finally, the user returns to the location of the music file 319 to select the music file 319, 348, selects the music file 319, and moves the music file 319 into the music folder 304, 349. Similarly, the user returns to the location of the music file 320, 350, selects the music file 320, and moves the music file 320 into the music folder 304, 351.

FIG. 3C shows trajectories (the motion of a hand, a finger, or the mouse) when the user selects files for a folder as their destination, and sorts the selected multiple files into the folder all at once.

Unlike in FIG. 3B, the user selects the video files 317 and 318 at the same time 333, and moves the selected video files 317 and 318 into the video folder 303, 365. Then, the user returns to the location of the music files 319 and 320, 366, selects the music files 319 and 320 at the same time 334, and moves the selected music files 319 and 320 into the music folder 304, 367. Even in this case, since the user is required to perform operations to move back and forth between the location of files and the destination folders many times, the number of trajectories is large.

As shown in FIG. 3B and FIG. 3C, multiple files can be selected at the same time. However, one destination folder can only be specified. Therefore, when there are multiple destination folders as mentioned above, there is a need to repeatedly select an individual file for each destination folder and move the selected file. Further, for example, when the user wants to move picture files into a "my picture" folder, there is a need to perform operations to select only target picture files from various kinds of files as mentioned above. In addition, when the destination folders are located away from one another, or when target files are located in positions away from the destination folders, since the physical distance along which the user perform operations becomes long, such file operations are burdensome for the user. Thus, in the conventional method, the intuitive operational feeling as the advantage of the graphical user interface is impaired.

FIG. 4A to FIG. 4G are diagrams showing an operation example to activate a group object used in the embodiments of the present invention.

Figure 4A:
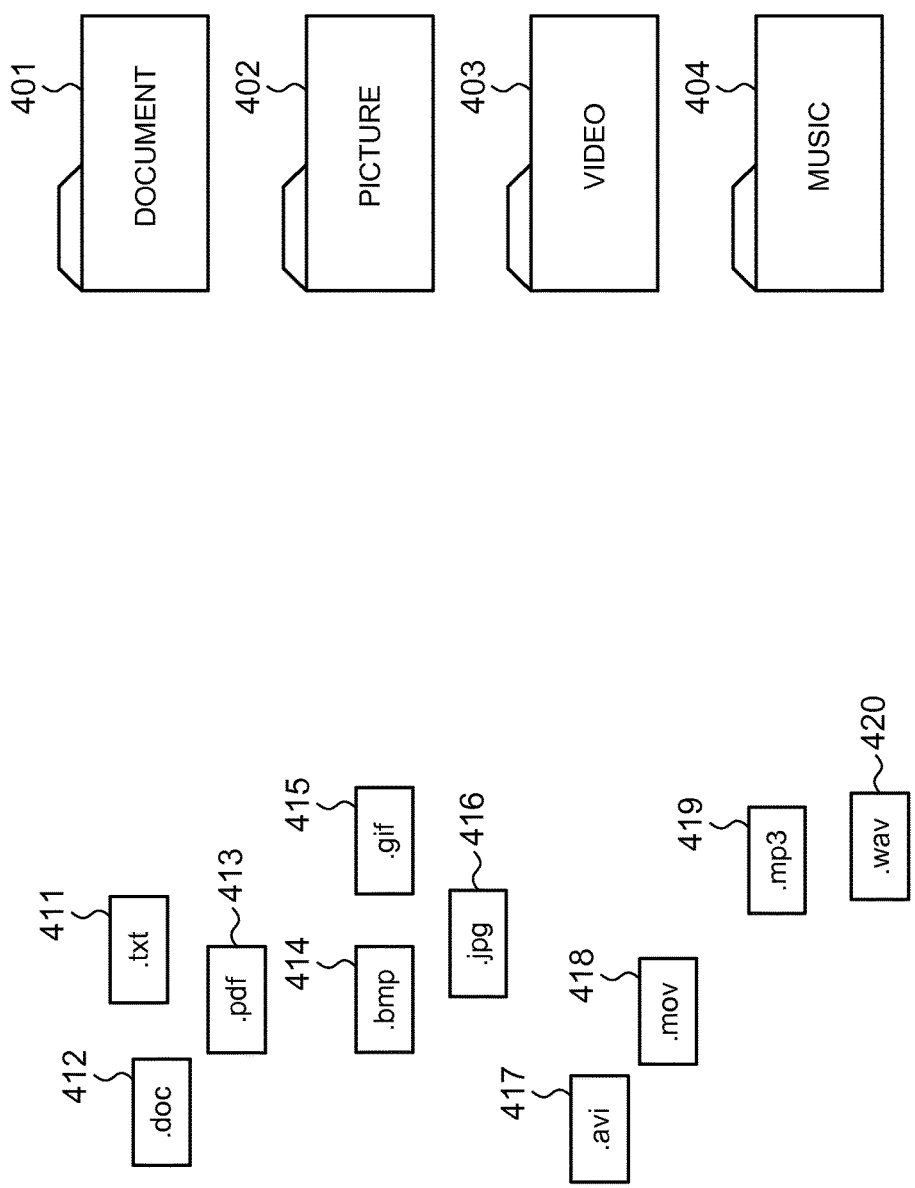
FIG. 4A is a diagram showing an operation example to activate a group object used in the embodiments of the disclosure.

Like FIG. 3A, FIG. 4A shows multiple files 411-420 as objects and multiple folders 401-404 that can be the destinations of these files.

Figure 4B:
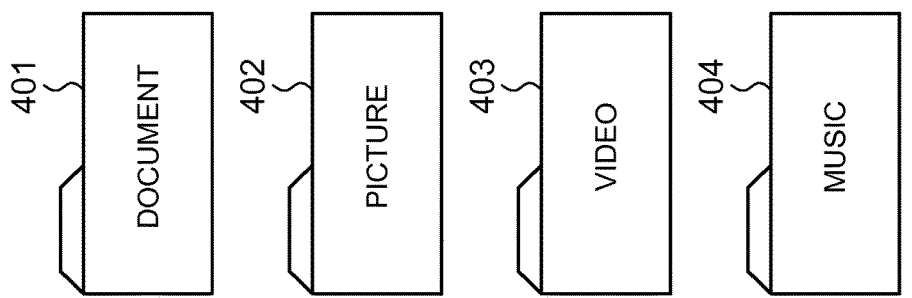
FIG. 4B is a diagram showing the operation example to activate the group object used in the embodiments of the disclosure.
Figure 4B:
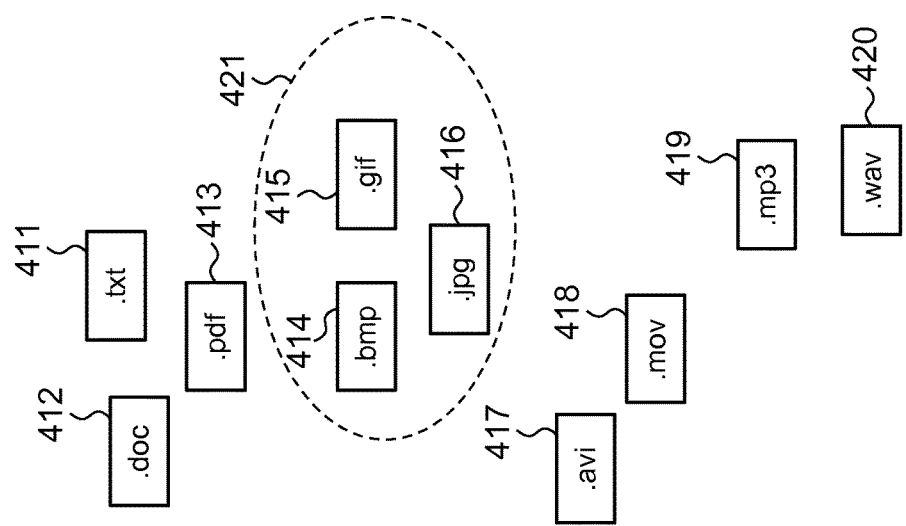
Figure 4D:
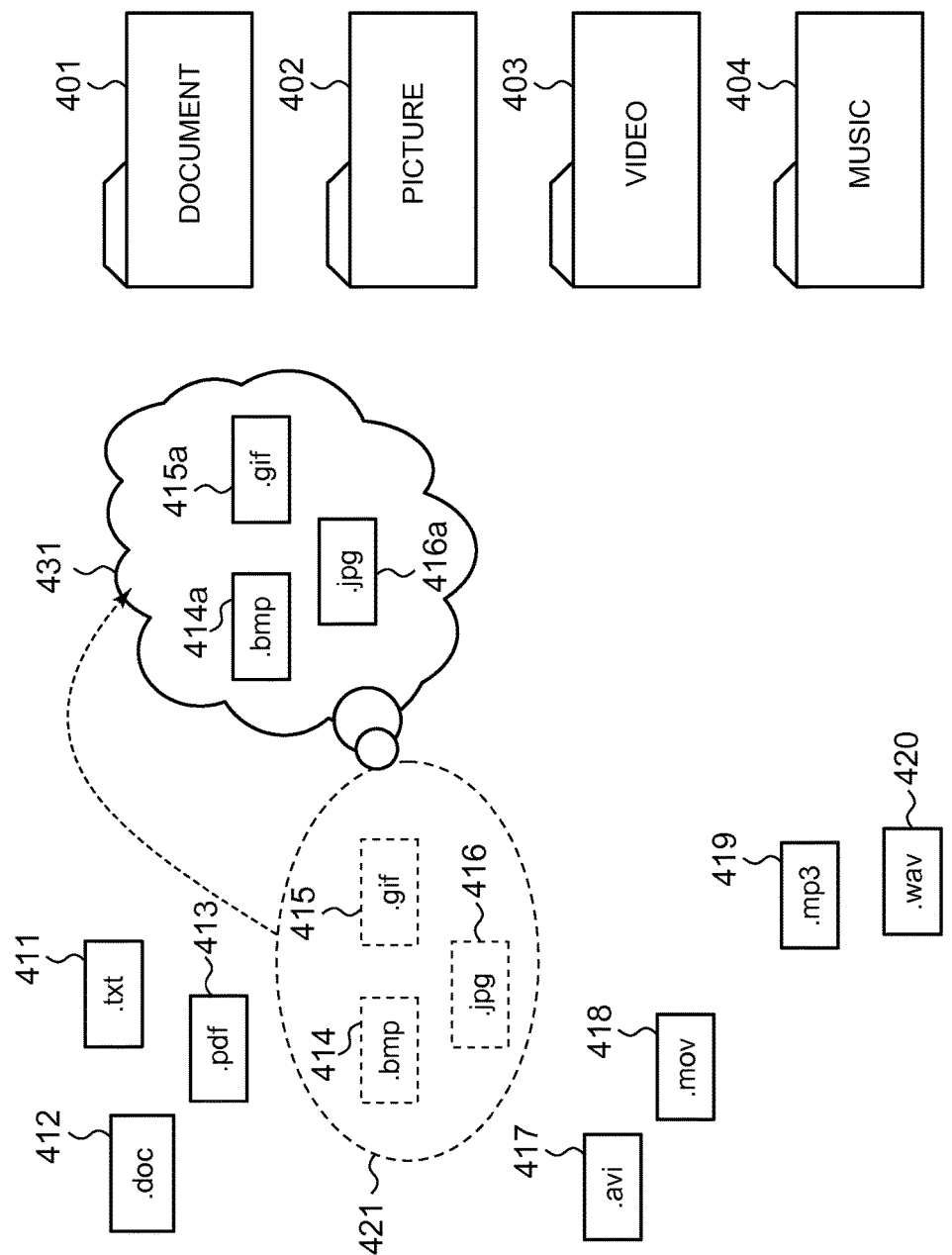
FIG. 4D is a diagram showing the operation example to activate the group object used in the embodiments of the disclosure.

FIG. 4B to FIG. 4D show an operation example to activate a group object after multiple files are selected.

FIG. 4B shows an operation example to select multiple picture files 414-416 from among multiple files 411-420, 421. The user's operation to select multiple files is, for example, such that a hand is opened above the touch screen, a predetermined period of time has elapsed after a hand or finger is put close to the touch screen, or the like. When a mode for selecting multiple files is started in response to the user's operation, the user puts a finger on files to select the files in turn, or traces around a file group 414-416 desired to select. The multiple files are selected with this user's operation, and the selected files 414-416 go into the selected state.

FIG. 4C shows an operation example to activate a group object. The user's operation to activate a group object is, for example, such that the user slides, waves, or throws a hand or finger largely across the screen of the touch screen 441 and 442, the user drags the selected file group 421 (quickly) in a predetermined direction, or the like. Then, a group object 431 is activated in response to the user's operation, and the group object 431 is displayed on the screen in the form of a cloud. The group object 431 can be displayed at a position or in a size not to block the user's field of vision to operate on the desktop. The icon of the group object 431 can also be displayed at a position or in a size to avoid overlapping with object icons on the desktop as much as possible.

FIG. 4D shows an example of displaying the selected files 414-416 inside the group object 431, 414a-416a. This means that the selected files 414-416 are incorporated into the group object 431. The icons of the files 414-416 on the desktop corresponding to the files 414a-416a incorporated in the group object 431 can be displayed on the desktop, for example, like light shadows, or disappear from the desktop, or blink on and off on the desktop.

Figure 4E:
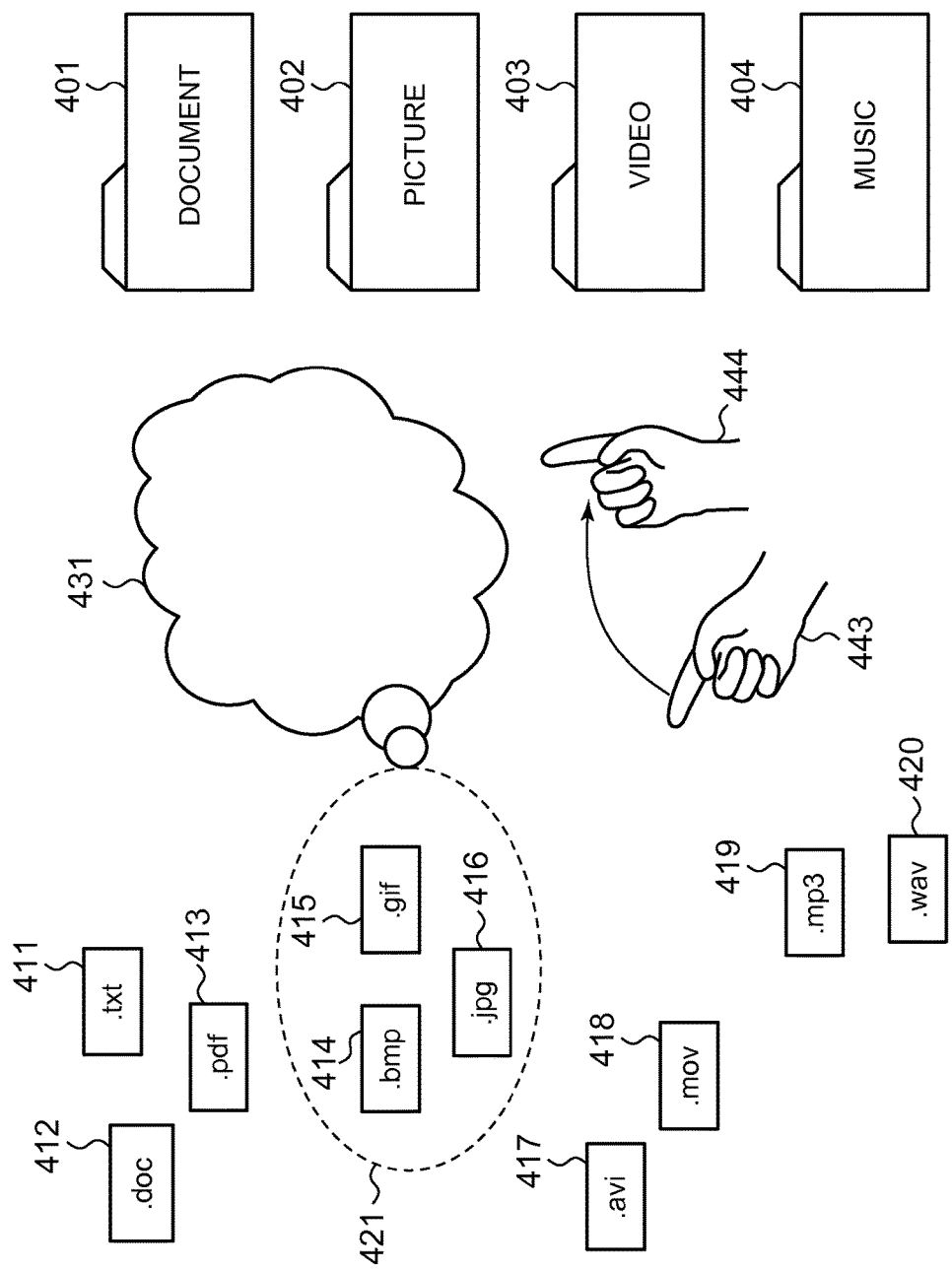
FIG. 4E is a diagram showing the operation example to activate the group object used in the embodiments of the disclosure.
Figure 4F:
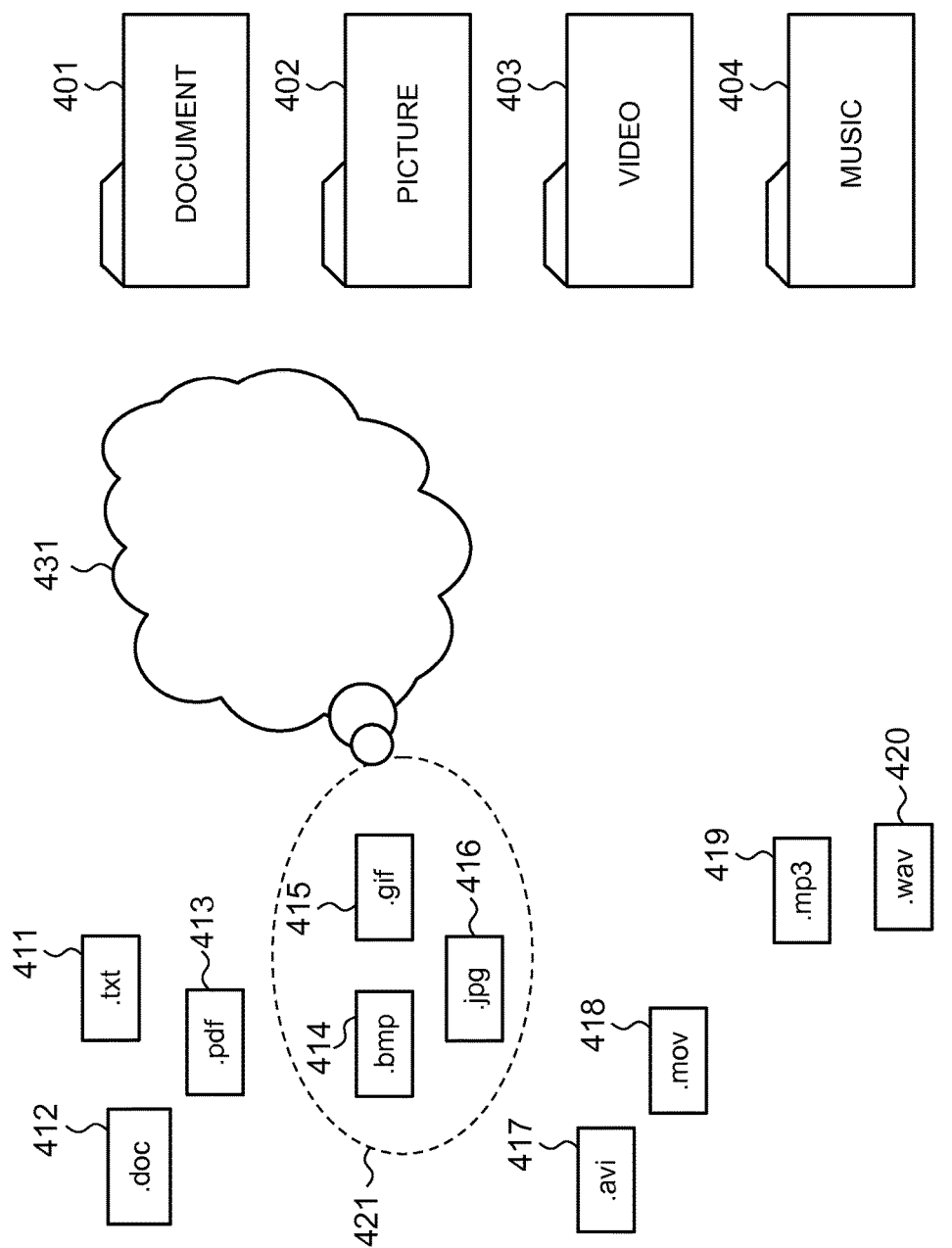
FIG. 4F is a diagram showing the operation example to activate the group object used in the embodiments of the disclosure.
Figure 4G:
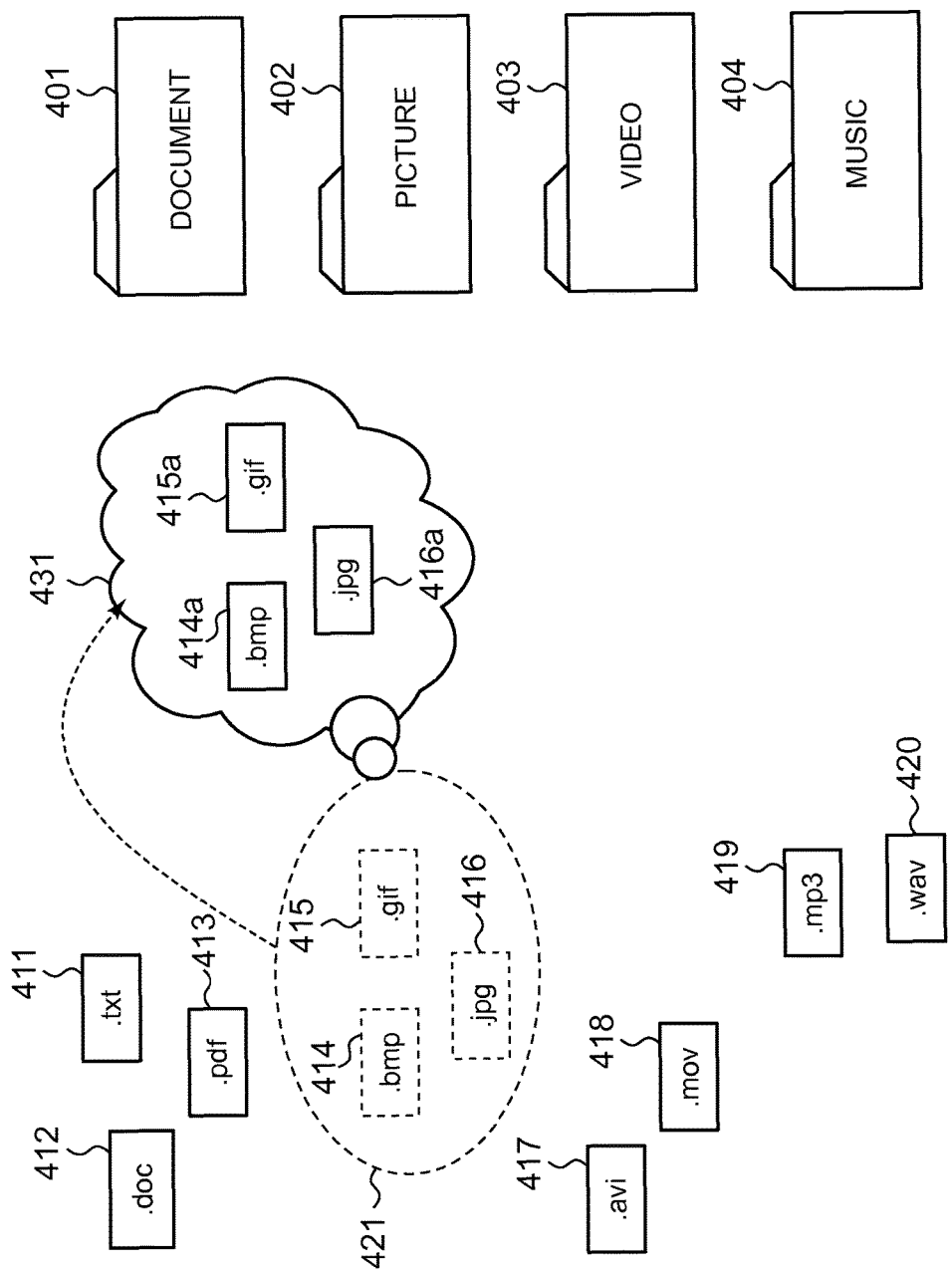
FIG. 4G is a diagram showing the operation example to activate the group object used in the embodiments of the disclosure.

FIG. 4E to FIG. 4G shows an operation example to select multiple files after a group object is activated.

FIG. 4E shows an operation example to activate a group object. Like the operation in FIG. 4C, for example, the user slides, waves, or throws a hand or finger largely across the screen of the touch screen 443-444, the user drags the selected file group 421 (quickly) in a predetermined direction, or the like, to activate the group object. Then, the group object is activated in response to the user's operation, and a group object 431 is displayed on the screen in the form of a cloud.

FIG. 4F shows an operation example to select multiple files in response to a user's operation. Like the operation in FIG. 4B, for example, the user puts a finger on files on the touch screen to select the files in turn or traces around a group of files 414-416 desired to select. When the group object 431 has already been activated before files are selected, the device can activate the above-mentioned multiple selection mode simultaneously with the activation of the group object 431. Even in such a case, the user puts a finger on files to select the files in turn or traces around the file group 414-416 desired to select in the same manner. Thus, multiple files are selected with this user's operation.

FIG. 4G shows an example of displaying the selected files 414-416 inside the group object 431. In response to the user's file selection operation, the selected files 414-416 are incorporated into the group object 431. Then, the selected files 414-416 are displayed in the group object 431. Like in the case shown in FIG. 4D, the icons of the files 414-416 on the desktop are displayed like light shadows on the desktop or disappear from the desktop.

FIG. 5A to FIG. 5F are diagram showing an operation example to additionally move files into a group object used in the embodiments of the present invention.

Figure 5A:
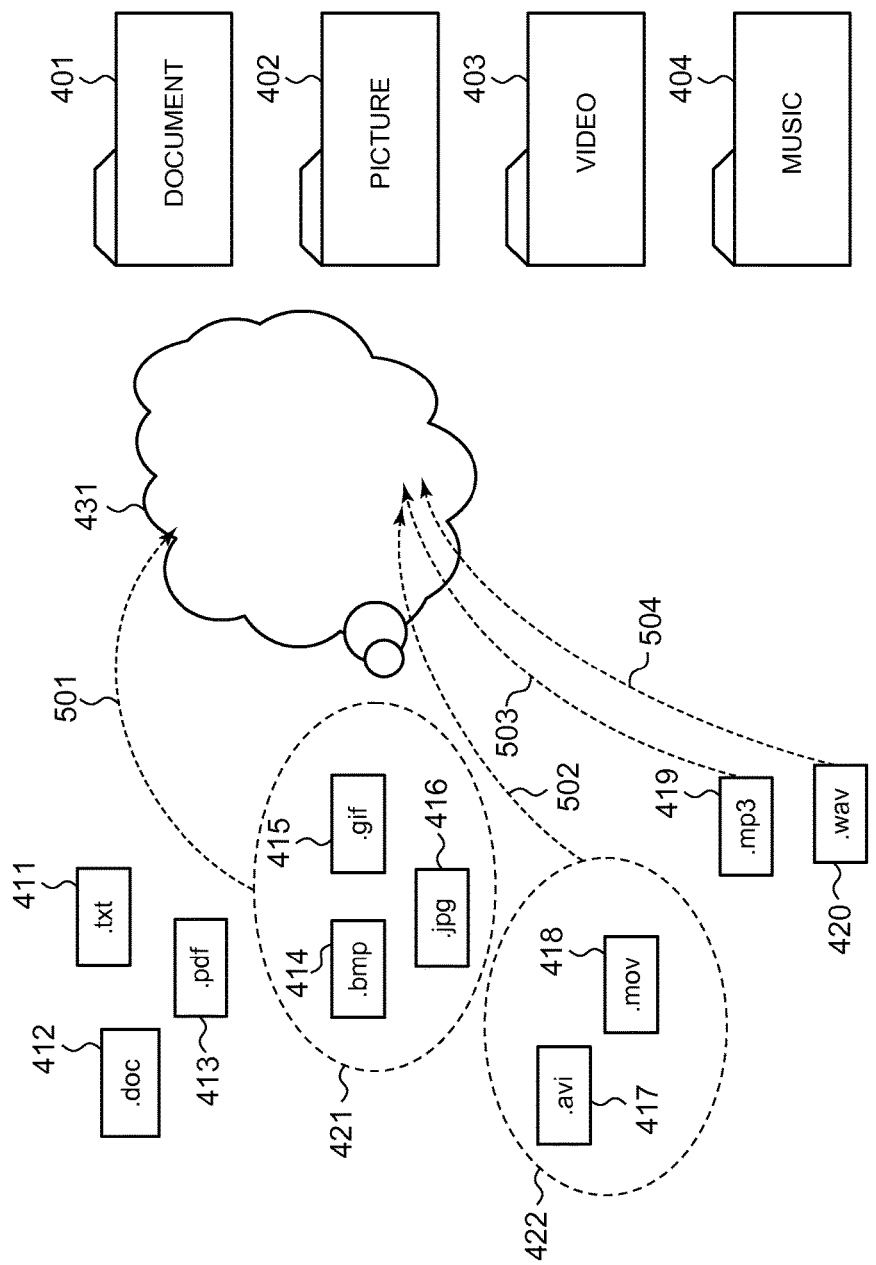
FIG. 5A is a diagram showing an operation example to move files into a group object used in the embodiments of the disclosure.

FIG. 5A shows the history of operations 501-504 desired to perform in FIG. 5B to FIG. 5F.

The user can perform the following operations in turn:
1. moving a group 421 of picture files 414 to 416 into the group object 431;
2. moving a group 422 of video files 417 and 418 into the group object 431;
3. moving a music file 419 into the group object 431; and
4. moving a music file 420 into the group object 431.

The user can also perform the following operations:
1. moving the group 421 of the picture files 414-416 and the group 422 of the video files 417 and 418 into the group object 431 all together; and
2. moving the group 421 of the picture files 414-416 and the music file 419 into the group object 431 all together.

Thus, the user can move multiple objects (in units of object groups or in units of files) or one object from folders into a group object.

Figure 5B:
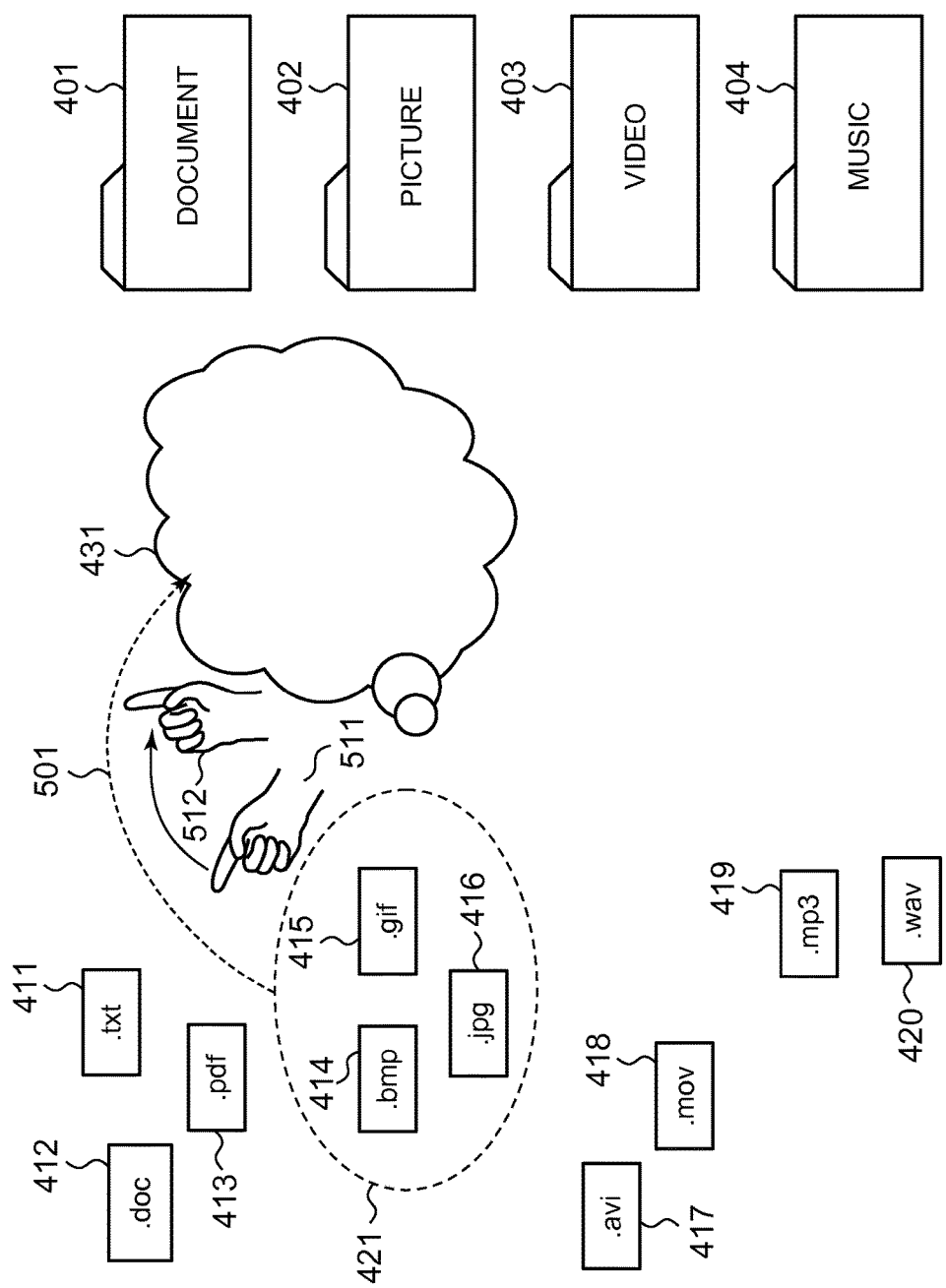
FIG. 5B is a diagram showing the operation example to move files into the group object used in the embodiments of the disclosure.

FIG. 5B shows that the user moves the group 421 of the selected picture files 414 to 416 into the group object 431 according to the method shown in any of FIG. 4B to FIG. 4D or FIG. 4E to FIG. 4G.

Figure 5C:
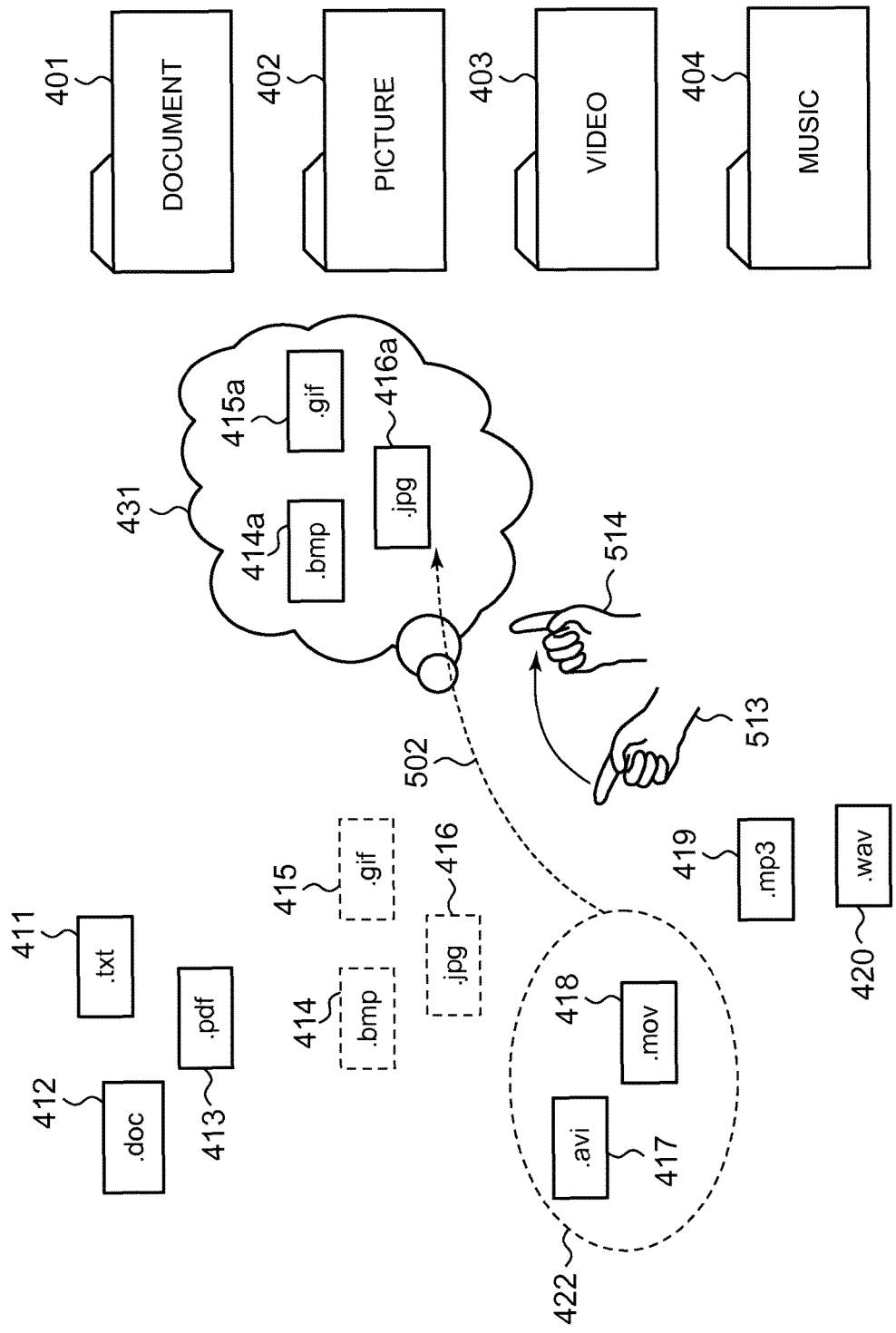
FIG. 5C is a diagram showing the operation example to move files into the group object used in the embodiments of the disclosure.

FIG. 5C shows that the picture files 414-416 are incorporated into the group object 431, 414a-416a. Along with this, it shows that the icons of the picture files 414-416 are displayed on the desktop like light shadows. Next, it shows that the user selects the video files 417 and 418 and moves the group 422 of the selected video files 417 and 418 into the group object 431. The video files 417 and 418 are selected, for example, by putting a finger on the video files 417 and 418 to select them in turn, or by tracing around the group of the video files 417 and 418 desired to select. Then, the user drags, with a finger, the group 422 of the selected video files 417 and 418 into the group object 431, 513, and 514. The multiple video files 417 and 418 are thus incorporated into the group object 431 with the user's operations (see FIG. 5D).

FIG. 5D shows that the video files 417 and 418 are incorporated in the group object 431, 417a, and 418a. Along with this, it shows that the icons of the video files 417 and 418 are displayed on the desktop like light shadows. Next, it shows that the user selects the music file 419 and moves the selected music file 419 into the group object 431. The music file 419 is selected in the same manner as mentioned above. Then, the user drags, with a finger, the selected music file 419 into the group object 431 515 and 516. Thus, the music file 419 is incorporated into the group object 431 with the user's operations (see FIG. 5E).

Figure 5E:
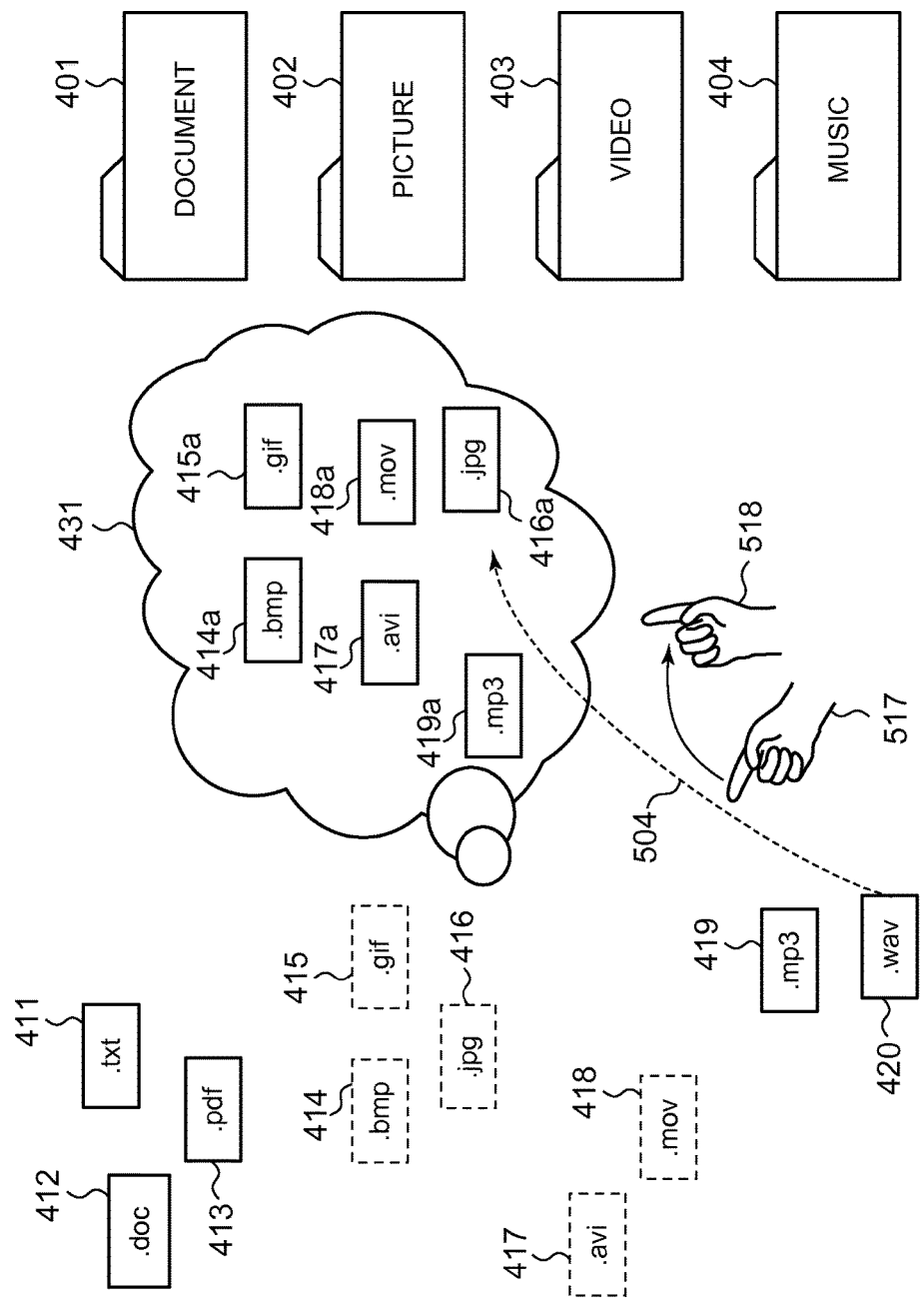
FIG. 5E is a diagram showing the operation example to move files into the group object used in the embodiments of the disclosure.

FIG. 5E shows that the music file 419 is incorporated in the group object 431, 419a. Along with this, it shows that the icon of the music file 419 is displayed on the desktop like a light shadow. Next, it shows that the user selects the music file 420 and moves the selected music file 420 into the group object 431. The music file 420 is selected in the same manner as mentioned above. Then, the user drags, with a finger, the selected music file 420 into the group object 431, 517, and 518. Thus, the music file 420 is incorporated into the group object 431 with the user's operations (see FIG. 5F).

Figure 5F:
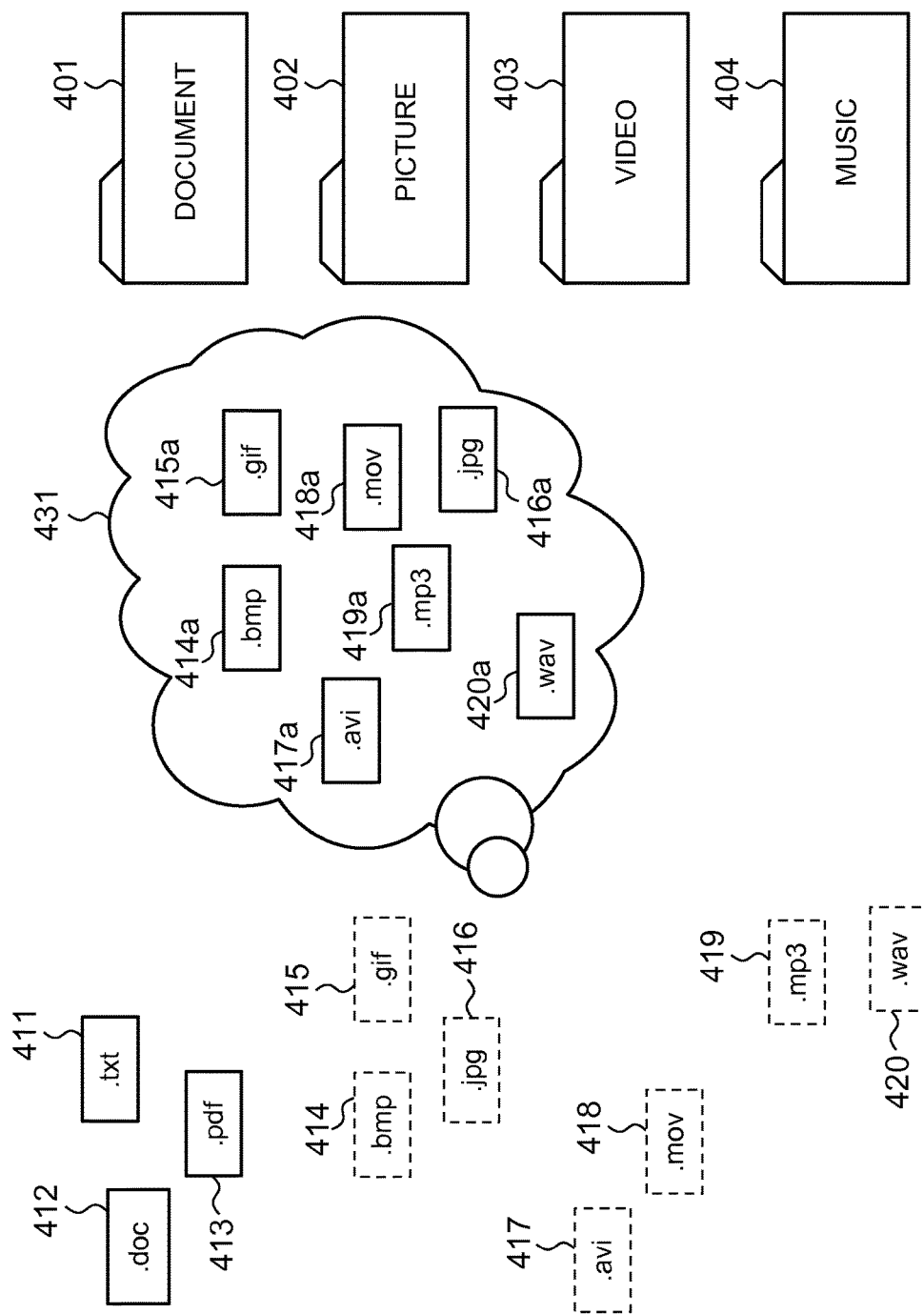
FIG. 5F is a diagram showing the operation example to move files into the group object used in the embodiments of the disclosure.

FIG. 5F shows that the music file 420 is incorporated in the group object 431, 420a.

FIG. 5B to FIG. 5F show that the user incorporates one of the selected multiple files into the group object 431. Conversely, the user can select, with a finger, files incorporated in the group object 431, and throw the selected files out of the group object 431 (i.e., onto the desktop) to return the files onto the desktop (not shown).

The user can also select and drag the icon of the group object 431 with a finger, a hand, or the mouse to move the group object 431 to any position on the desktop.

Figure 6A:
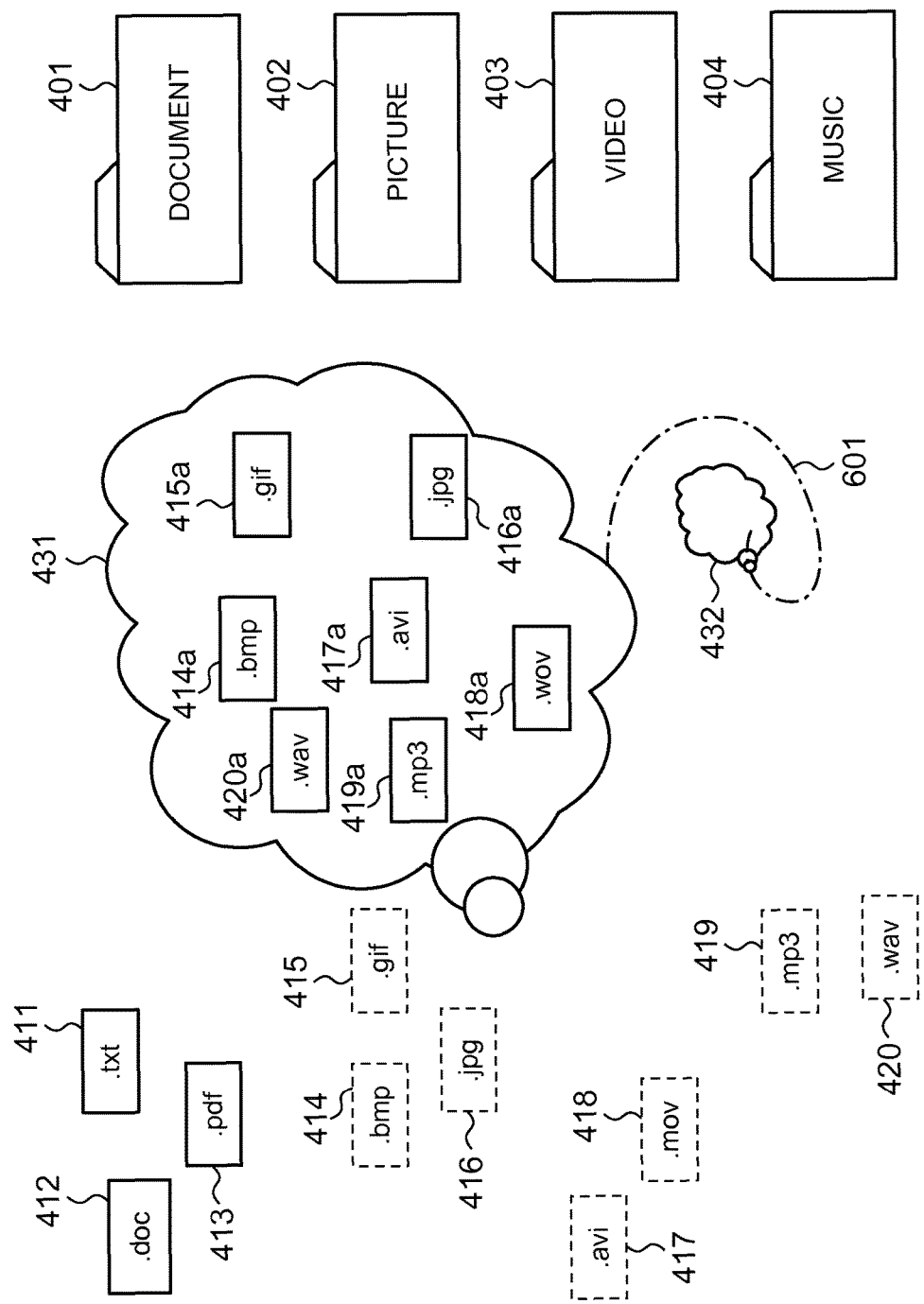
FIG. 6A is a diagram showing an operation example to temporarily hide a group object used in the embodiments of the disclosure.
Figure 6B:
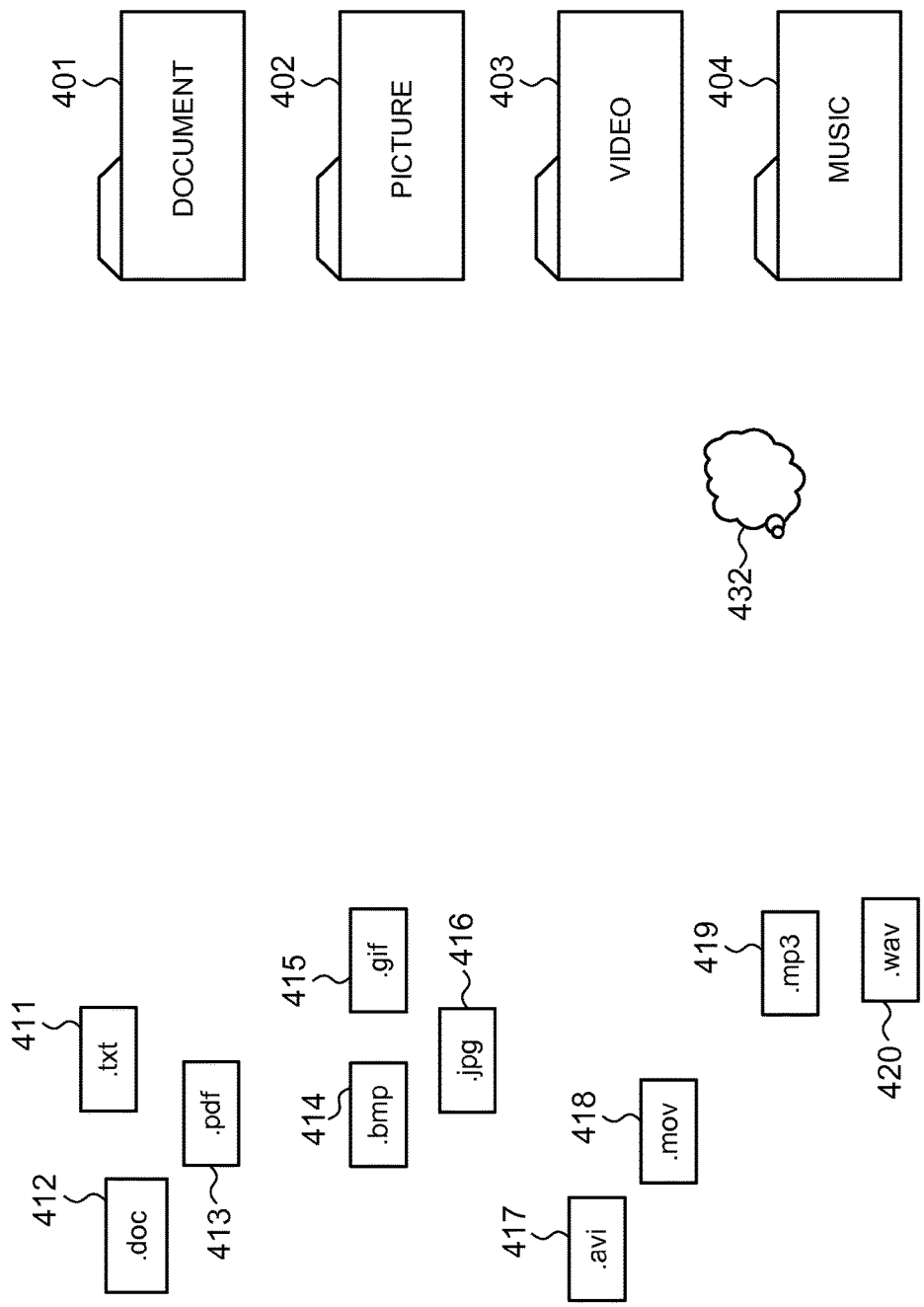
FIG. 6B is a diagram showing the operation example to temporarily hide the group object used in the embodiments of the disclosure.

FIG. 6A to FIG. 6B are diagram showing operations for temporarily hiding a group object used in the embodiments of the present invention.

The user can temporarily erase (i.e., hide) the group object 431 from the screen or display it as a small icon on the screen in order to ensure the user's field of vision to manipulate files or the like. Temporary erasing (i.e., hiding) of the icon of the group object 431 from the screen or displaying it as a small icon on the screen is called a group object hiding mode below. On the other hand, a state in which the group object 431 is manipulable is called a group object manipulating mode below.

The group object processing section 224 can hold the group object manipulating mode for a predetermined period of time unless a finger or hand of the user appears on the screen, e.g., for one minute, and after that, switch from the group object manipulating mode to the group object hiding mode. When no operation is performed on the group object 431 for a predetermined period of time, the group object processing section 224 can switch from the group object manipulating mode to the group object hiding mode. Further, when a finger or hand of the user moves a predetermined distance away from the group object across the screen, the group object processing section 224 can switch from the group object manipulating mode to the group object hiding mode. In addition, when the user clicks and/or drags an area (area other than files or folders, such as the desktop or work space, or a specified icon or area) or a mouse gesture or pen flick operation is detected, the group object processing section 224 can switch from the group object manipulating mode to the group object hiding mode.

In the group object hiding mode, since the group object 431 is just hidden from the screen on a temporary basis, the files moved into the group object 431 remain in the group object 431.

FIG. 6A shows a state in which the group object is switched from the group object manipulating mode to the group object hiding mode.

The user can switch the group object from the group object manipulating mode to the group object hiding mode, for example, by drawing a cross (not shown) on the group object 431. FIG. 6A shows a state of transition 601 in which the group object 431 is displayed as a small icon on the screen after being switched to the group object hiding mode.

FIG. 6B shows a state of the screen when the group object 431 is in the group object hiding mode.

In the group object hiding mode, the group object 431 can be displayed as a small icon 432 as one example. As an alternative example, in the group object hiding mode, the group object 431 may disappear from the desktop without being displayed as the small icon 432 so that the group object 431 will not be displayed. While the group object 431 is in the group object hiding mode, icons corresponding to the files in the group object on the desktop may be displayed the way they were (i.e., by the solid lines) rather than as light shadows.

Figure 6C:
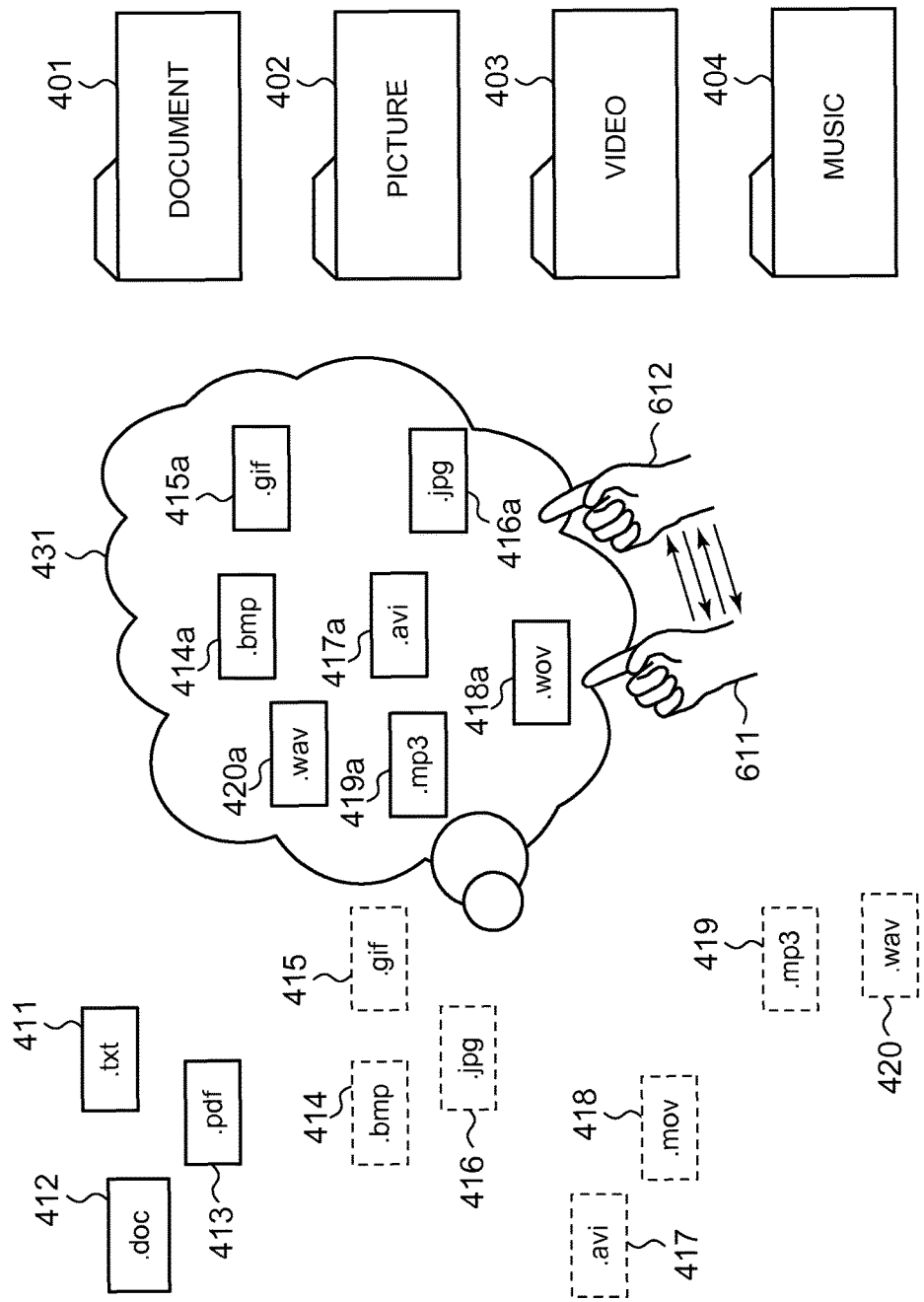
FIG. 6C is a diagram showing an operation example to erase a group object used in the embodiments of the disclosure.
Figure 6D:
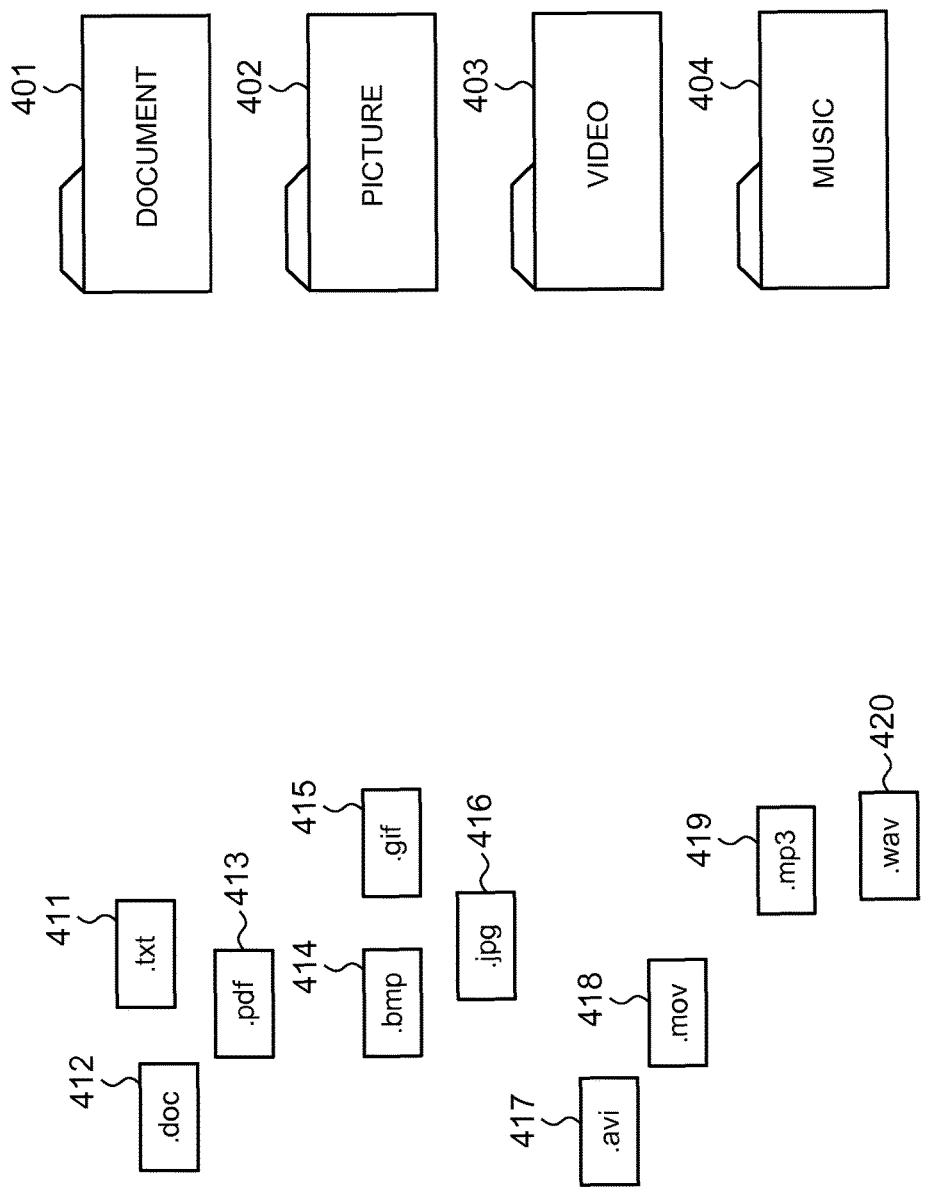
FIG. 6D is a diagram showing the operation example to erase the group object used in the embodiments of the disclosure.

FIG. 6C to FIG. 6D are diagrams showing operations for erasing a group object used in the embodiments of the present invention.

When there is no need to perform processing using a group object, the user can erase the group object.

FIG. 6C shows a user's operation example to erase a group object. The user can erase the group object, for example, by dragging a finger or hand quickly on the group object (like scrubbing down to erase the group object) 611 and 612.

FIG. 6D is a state of the screen after the group object is erased. The group object is erased from the desktop, and the files located in the group object are displayed in the original positions on the desktop the way they were (i.e., by the solid lines) rather than as light shadows. In response to erasing the group object, file information in the group object is also deleted from the memory of the device.

FIG. 7A to FIG. 7D are diagrams showing an operation example to temporarily hide a group object used in the embodiments of the present invention and activate the group object again.

For example, when the user wants to switch from the group object hiding mode to the group object manipulating mode, the following operations are performed.

FIG. 7A shows an operation example to display the above-mentioned small icon on the screen to switch from the group object hiding mode to the group object manipulating mode when the group object 431 is not displayed on the screen in the group object hiding mode.

For example, the user performs the following operations so that the group object display section 223 can display an icon 432a to switch from the group object hiding mode to the group object manipulating mode: The user brings his finger or hand close to the vicinity of the screen or the surface of the screen 701. When the group object processing section 224 detects that the user's finger or hand is brought close to the vicinity of the screen or the surface of the screen, the group object display section 223 can provide a reduced display of the icon 432a of the group object 431 within a field of vision (e.g., at a position 2 cm upper right) a little bit away from the position of the finger or hand (i.e., position immediately below the user's field of vision to operate) (see FIG. 7A). The display of the icon 432a of the group object 431 enables the user to further perform an operation to switch from the group object hiding mode to the group object manipulating mode. Alternatively, the group object display section 223 may display the icon 432a to switch from the group object hiding mode to the group object manipulating mode when the user selects the multiple selection mode (see the description of FIG. 4B).

In the group object hiding mode, the group object 431 may also be displayed as the small icon 432a on the screen (see FIG. 7A).

Figure 7B:
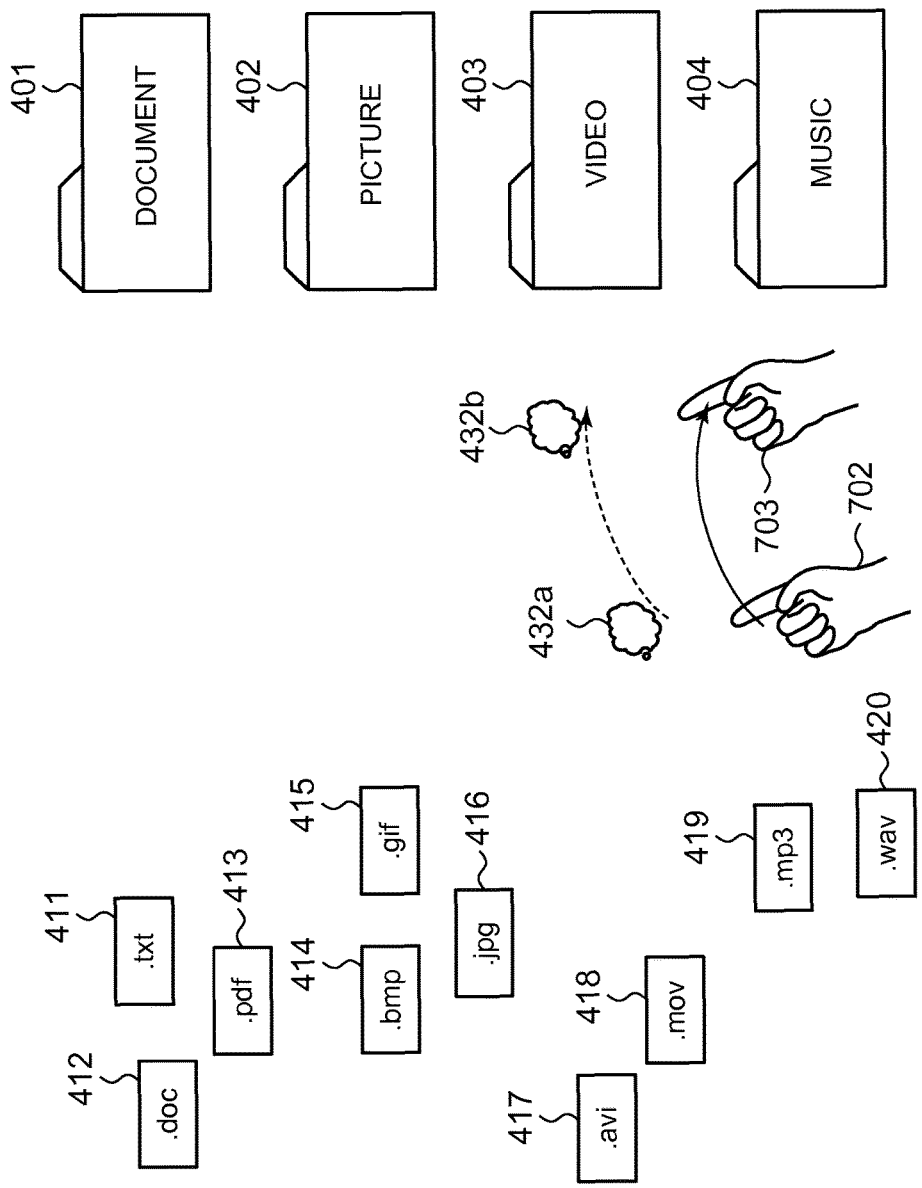
FIG. 7B is a diagram showing the operation example to activate the group object again after temporarily hiding the group object used in the embodiments of the disclosure.

FIG. 7B shows that the icon 432a of the group object 431 displayed in FIG. 7A can be moved on the screen.

When the group object processing section 224 detects the movement of the position of the user's hand or finger or the mouse at normal speed 702-703, the group object display section 223 can move and display the icon 432a of the group object 431 to follow the distance corresponding to the movement of the hand, finger, or the mouse 702-703 (i.e., not too close or too far) on the screen 432a and 432b.

After the icon 432a of the group object 431 is displayed on the screen, if the user does not perform the operations to switch from the group object hiding mode to the group object manipulating mode (for example, when the user is performing a touch operation irrespective of the group object), the group object display section 223 can erase the icon 432a of the group object 431 from the screen after a predetermined period of time has elapsed.

Figure 7C:
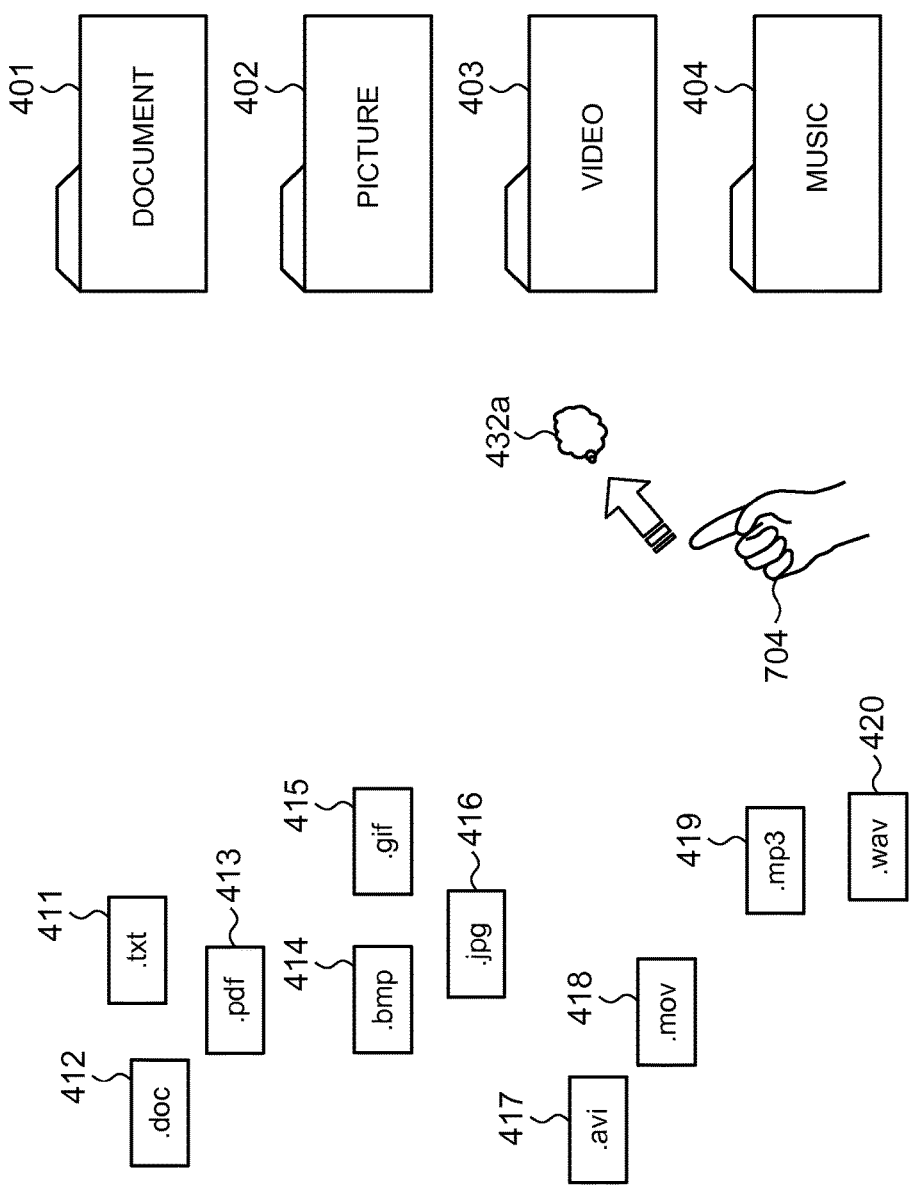
FIG. 7C is a diagram showing the operation example to activate the group object again after temporarily hiding the group object used in the embodiments of the disclosure.

FIG. 7C shows an operation example to use the icon 432a of the group object 431 shown in FIG. 7A to switch from the group object hiding mode to the group object manipulating mode.

For example, the user can perform the following operations to switch from the group object hiding mode to the group object manipulating mode, namely: The user moves his finger or hand, or the mouse quickly on the icon 432a of the group object 431 in any direction (e.g., upper right), performs a touch operation (e.g., triple touch or simultaneous touch with two fingers), or selects an object(s). As a result, the group object processing section 224 can switch from the group object hiding mode to the group object manipulating mode. When the user selects the multiple file selecting mode (see the description of FIG. 4B), the group object processing section 224 may automatically switch from the group object hiding mode to the group object manipulating mode.

Figure 7D:
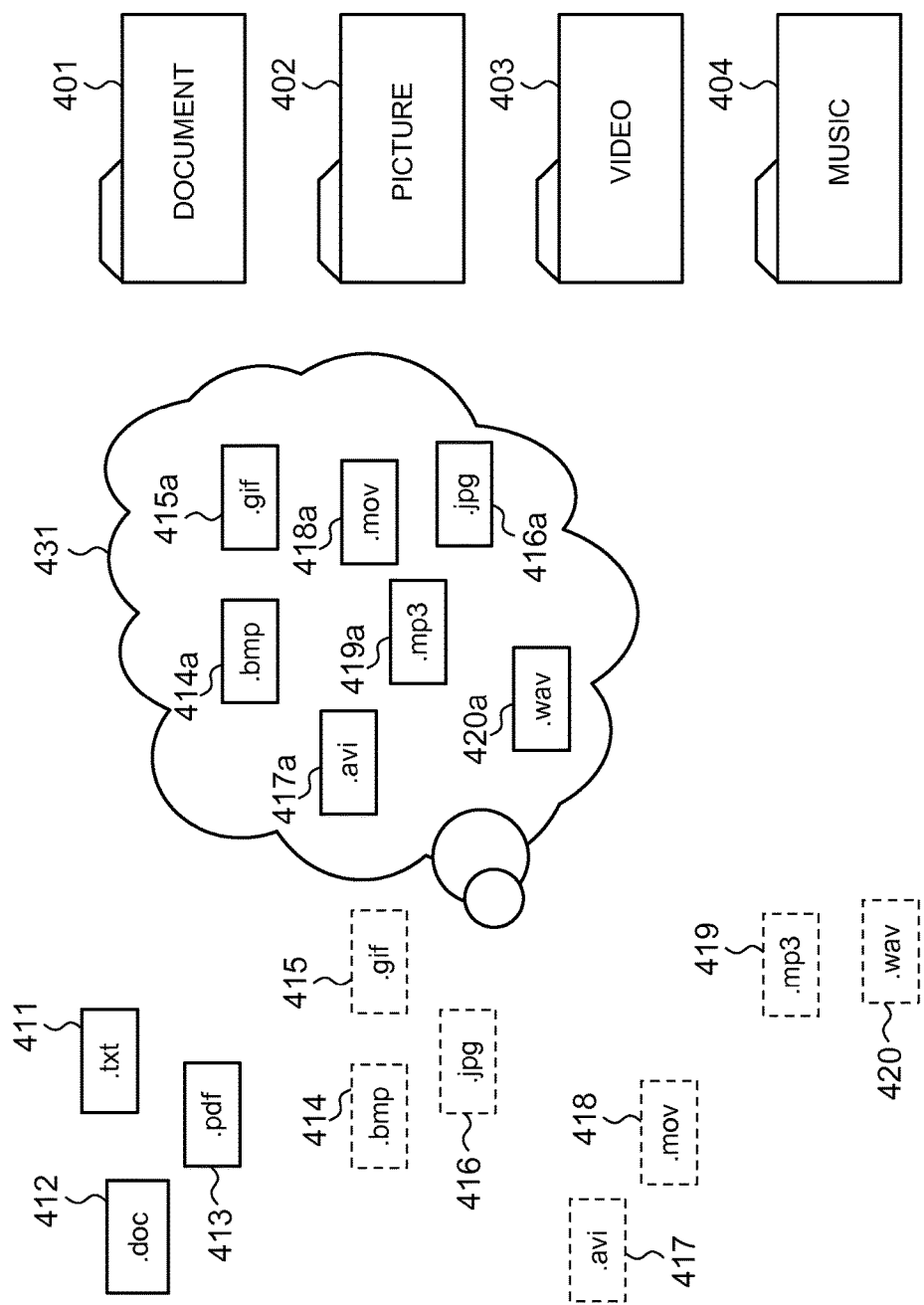
FIG. 7D is a diagram showing the operation example to activate the group object again after temporarily hiding the group object used in the embodiments of the disclosure.

FIG. 7D shows that the group object hiding mode is switched to the group object manipulating mode and the group object 431 reappears on the screen. The group object 431 can be displayed at a position and in a size not to overlap the files and the folders on the screen in order to prevent the user's field of vision to operate from being blocked.

FIG. 8A to FIG. 8H are diagrams showing an operation example, as an embodiment of the present invention, to move, into multiple destination objects, specific objects among the objects displayed in a group object.

Figure 8A:
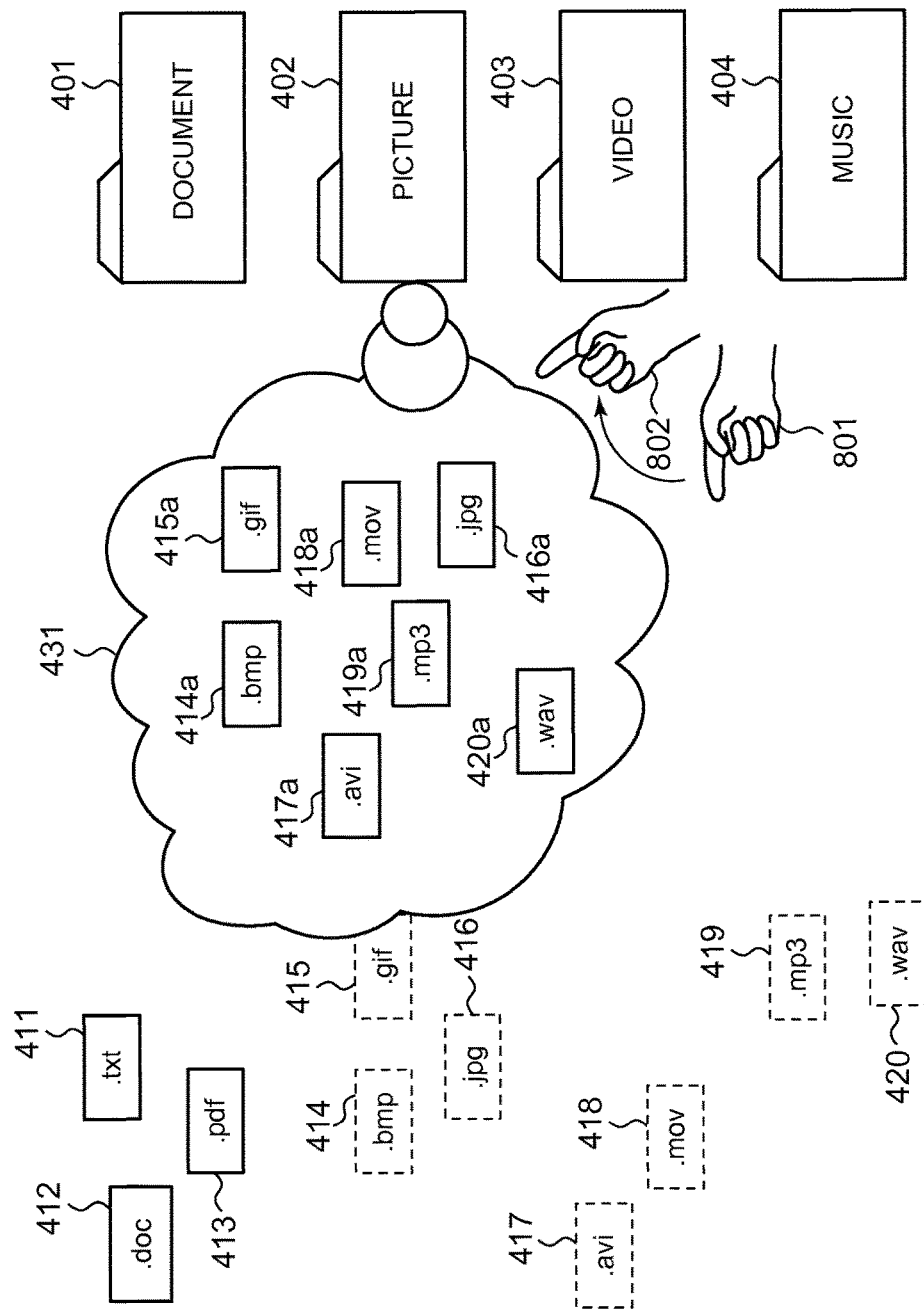
FIG. 8A is a diagram showing an operation example, in accordance with an embodiment of the disclosure, to move, into multiple destination objects, specific objects among objects displayed in a group object.

FIG. 8A shows that a group object 431 is activated and picture files 414a to 416a, video files 417a and 418a, and music files 419a and 420a are located in the group object 431.

Suppose that the user wants to move the picture files 414a-416a in the group object 431 into the picture folder 402 as the destination object. In this case, the user drags the group object 431 onto the picture folder 402, 801, and 802.

Figure 8B:
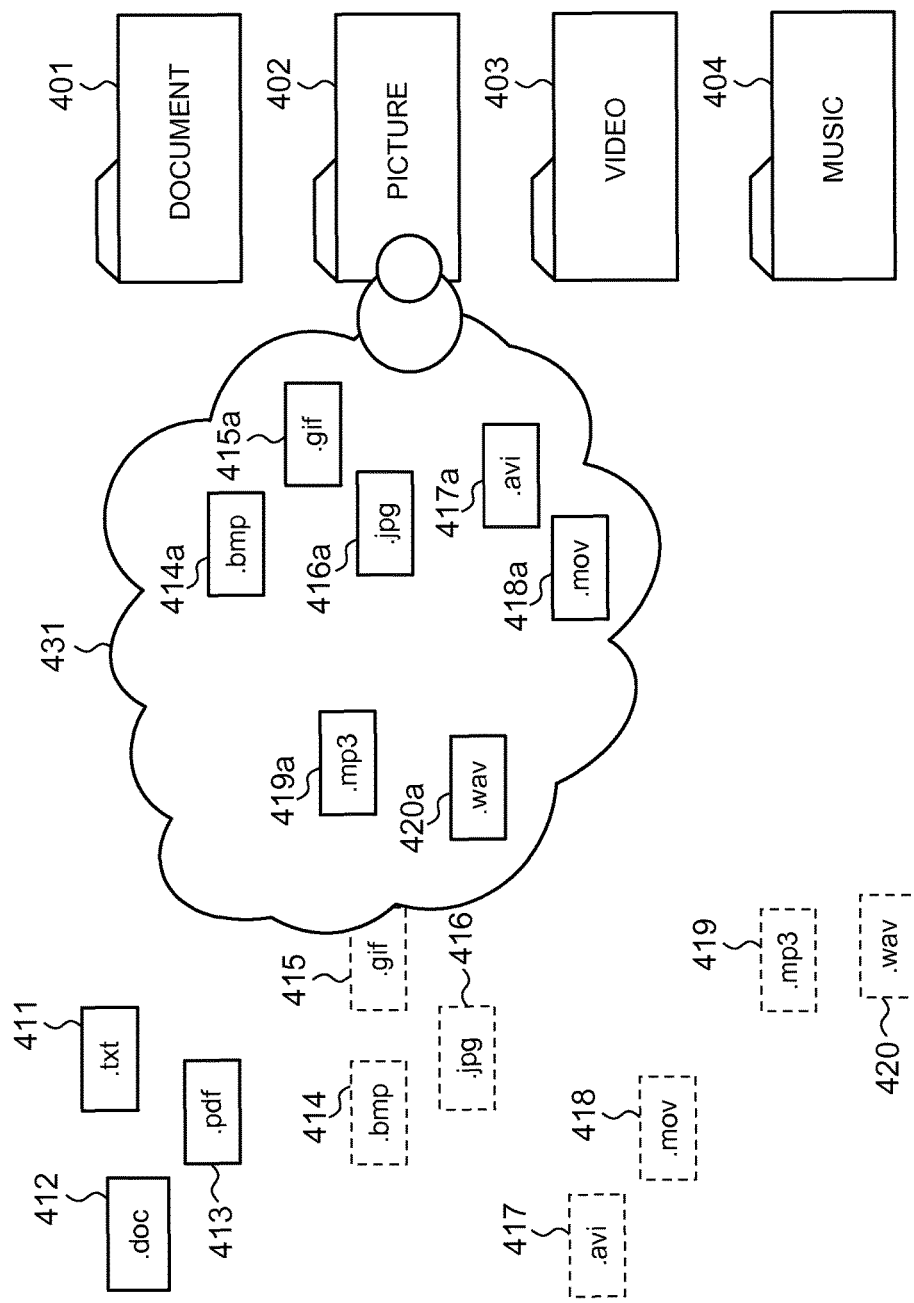
FIG. 8B is a diagram showing the operation example, in accordance with an embodiment of the disclosure, to move, into the multiple destination objects, the specific objects among the objects displayed in the group object.

FIG. 8B shows that the files 414a-416a having attributes of the picture folder (i.e., attributes indicating that the extensions are picture files) are selected from among the files 414a-420a in the group object 431 in response to dragging the group object 431 onto the picture folder 402. The selected picture files 414a-416a can be automatically moved to a position close to the picture folder 402 in the group object 431.

The video files 417a and 418a in the group object 431 may also be moved to a position close to the video folder 403 in the group object 431. This can be done by the group object processing section 224 finding a folder associated with the same attributes as the attributes of files (i.e., extensions) in the group object 431. In this case, the shape or size of the group object 431 can be so changed that the group object 431 will be brought close to the video folder 403.

Figure 8C:
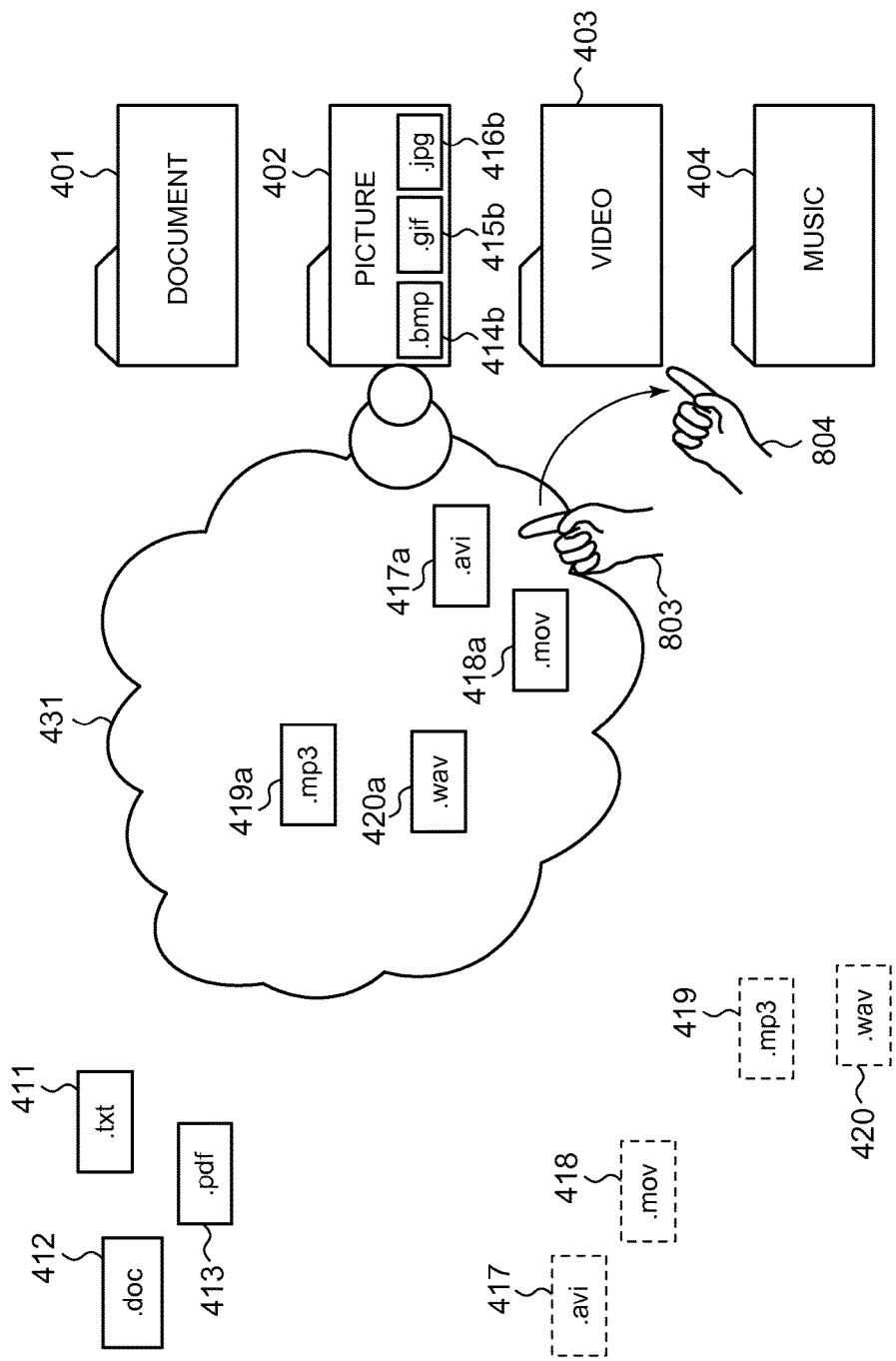
FIG. 8C is a diagram showing the operation example, in accordance with an embodiment of the disclosure, to move, into the multiple destination objects, the specific objects among the objects displayed in the group object.

FIG. 8C shows that the picture files 414a-416a has been moved from the group object 431 to the picture folder 402. Thus, the picture files 414b-416b are stored in the picture folder 402. The size of the group object 431 can be reduced after the picture files 414a-416a are removed from the group object 431. The icons of the picture files 414-416 indicated by the dotted lines on the desktop disappear in response to moving the picture files 414a-416a from the group object 431 to the picture folder 402 (like falling down from a tray).

As shown in FIG. 8A to FIG. 8C, the group object 431 is dragged onto or near a destination object having certain attributes so that files having the same attributes as the attributes of the destination object among the files in the group object 431 can be automatically moved from the group object into the destination object.

As shown in FIG. 8C, suppose that the user continuously wants to move the video files 417a and 418a in the group object 431 into the video folder 403 as the destination object. In this case, the user drags the group object 431 onto the video folder 403,803, and 804.

FIG. 8D shows that the files 417a and 418a having the attributes of video folders (i.e., the attributes indicating that the extensions are video files) are selected from among the files 417a-420a in the group object 431 in response to dragging the group object 431 onto the video folder 403. The selected video files 417a and 418a can be automatically moved to a position near the video folder 403 in the group object 431.

Further, the music files 419a and 420a in the group object 431 may be moved to a position close to the music folder 404 in the group object 431. In this case, the shape or size of the group object 431 can be so changed that the group object 431 will be brought close to the music folder 404.

Figure 8E:
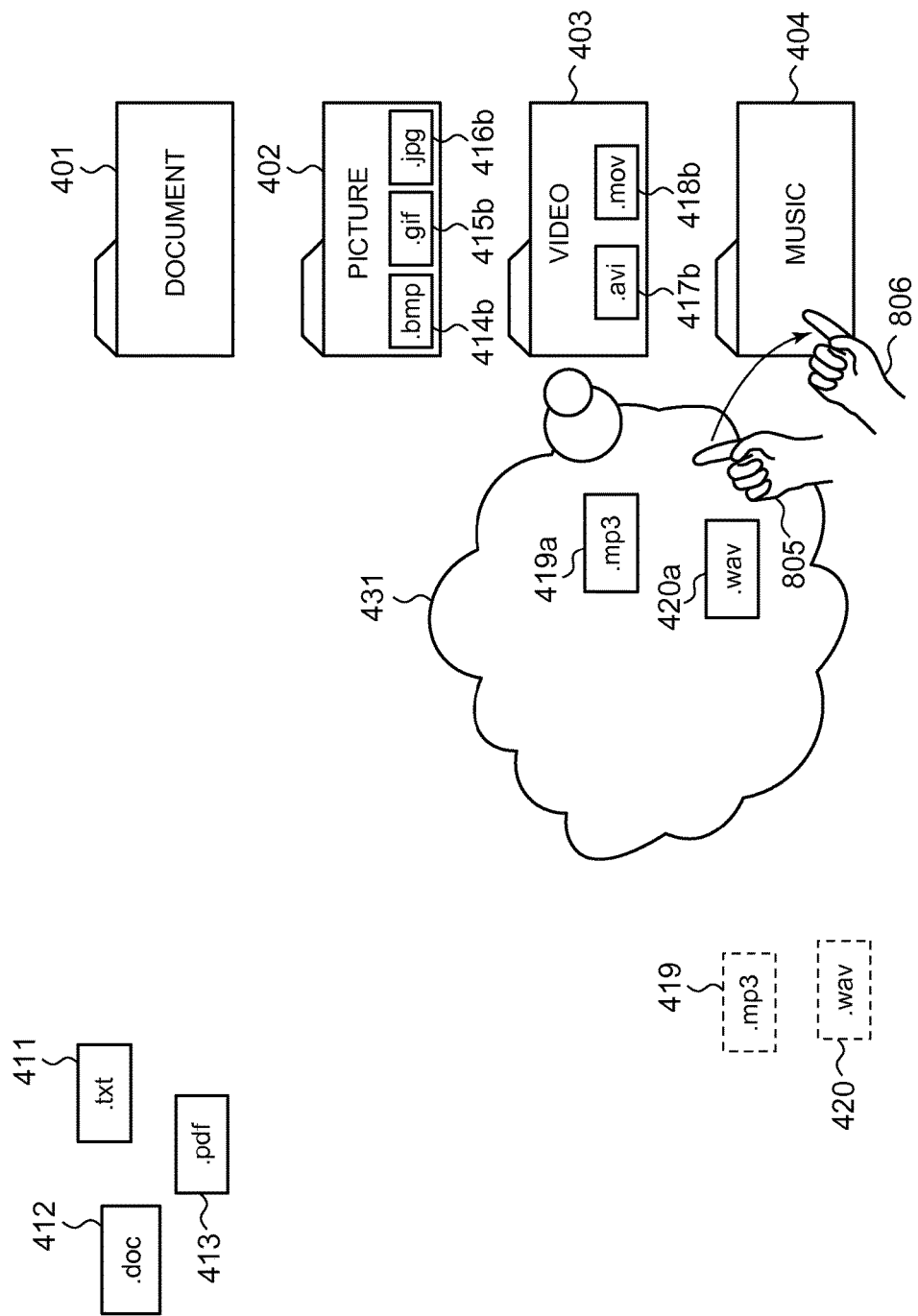
FIG. 8E is a diagram showing the operation example, in accordance with an embodiment of the disclosure, to move, into the multiple destination objects, the specific objects among the objects displayed in the group object.

FIG. 8E shows that the video files 419a and 420a has been moved from the group object 431 to the video folder 403. Therefore, video files 417b and 418b are stored in the video folder 403. After the video files 417a and 418a disappear from the group object 431, the group object 431 can be drawn smaller in size. The icons of the video files 417 and 418 indicated by the dotted lines on the desktop disappear in response to moving the video files 417a and 418a from the group object 431 to the video folder 403 (like falling down from a tray).

As shown in FIG. 8E, suppose that the user continuously wants to move the music files 419a and 420a in the group object 431 into the music folder 404 as the destination object. In this case, the user drags the group object 431 onto the music folder 404, 805, and 806.

Figure 8F:
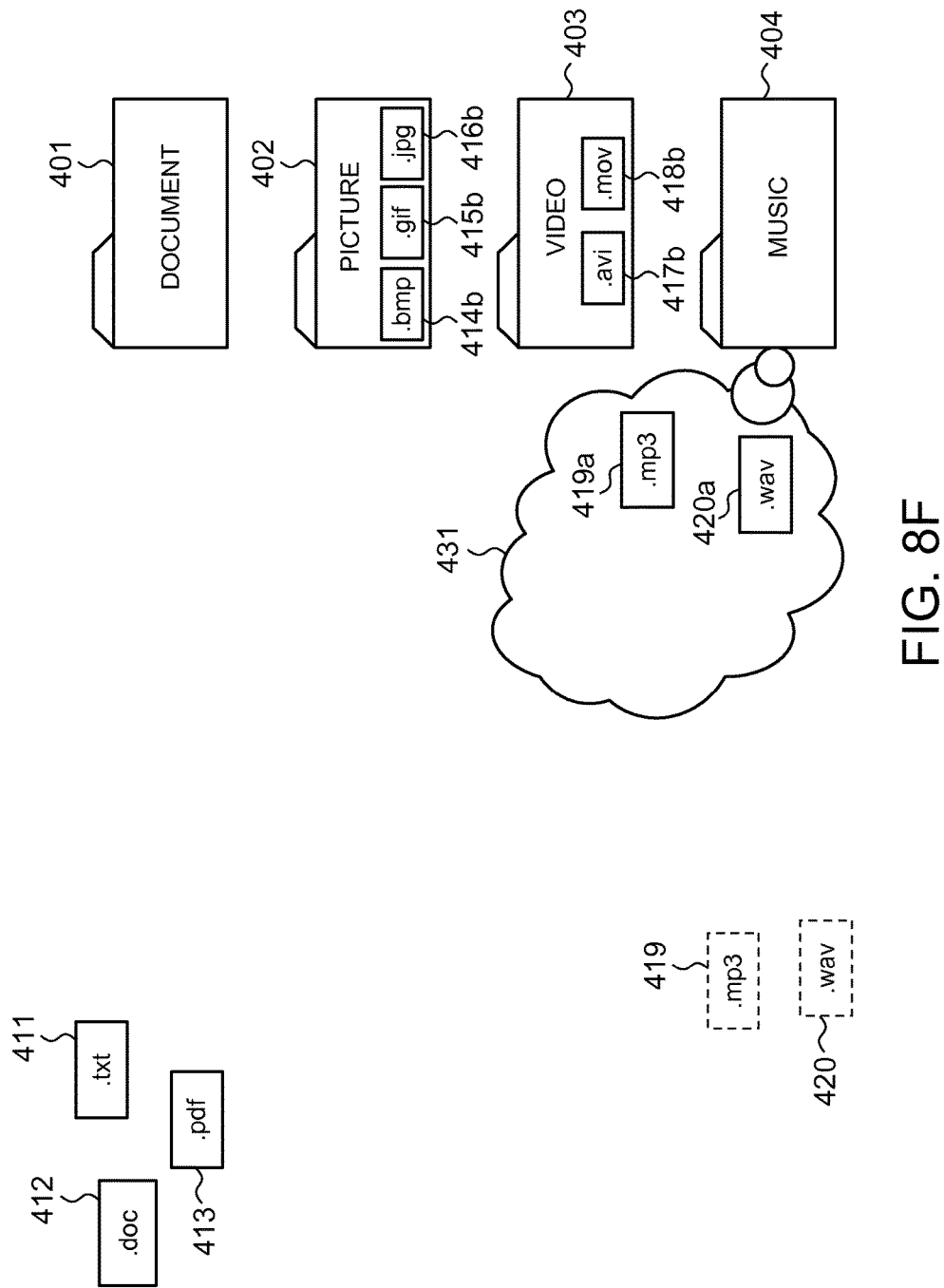
FIG. 8F is a diagram showing the operation example, in accordance with an embodiment of the disclosure, to move, into the multiple destination objects, the specific objects among the objects displayed in the group object.

FIG. 8F shows that the files 419a and 420a having the attributes of music folders (i.e., the attributes indicating that the extensions are music files) are selected from among the files 419a and 420a in the group object 431 in response to dragging the group object 431 onto the music folder 404. The selected music files 419a and 420a can be moved to a position close to the music folder 404 in the group object 431.

FIG. 8G shows that the music files 419a and 420a has been moved from the group object 431 to the music folder 404. Therefore, music files 419b and 420b are stored in the music folder 404.

FIG. 8H shows that there is no file in the group object 431 because the music files 419a and 420a are moved from the group object 431 to the music folder 404 in FIG. 8G. Since there is no file in the group object 431, the mode can be automatically changed from the group object manipulating mode to the group object hiding mode. FIG. 8H shows that the group object 431 is changed to a small icon 432 on the screen 801. Alternatively, since there is no file in the group object 431, the processing for the group object 431 itself may be ended.

Figure 9A:
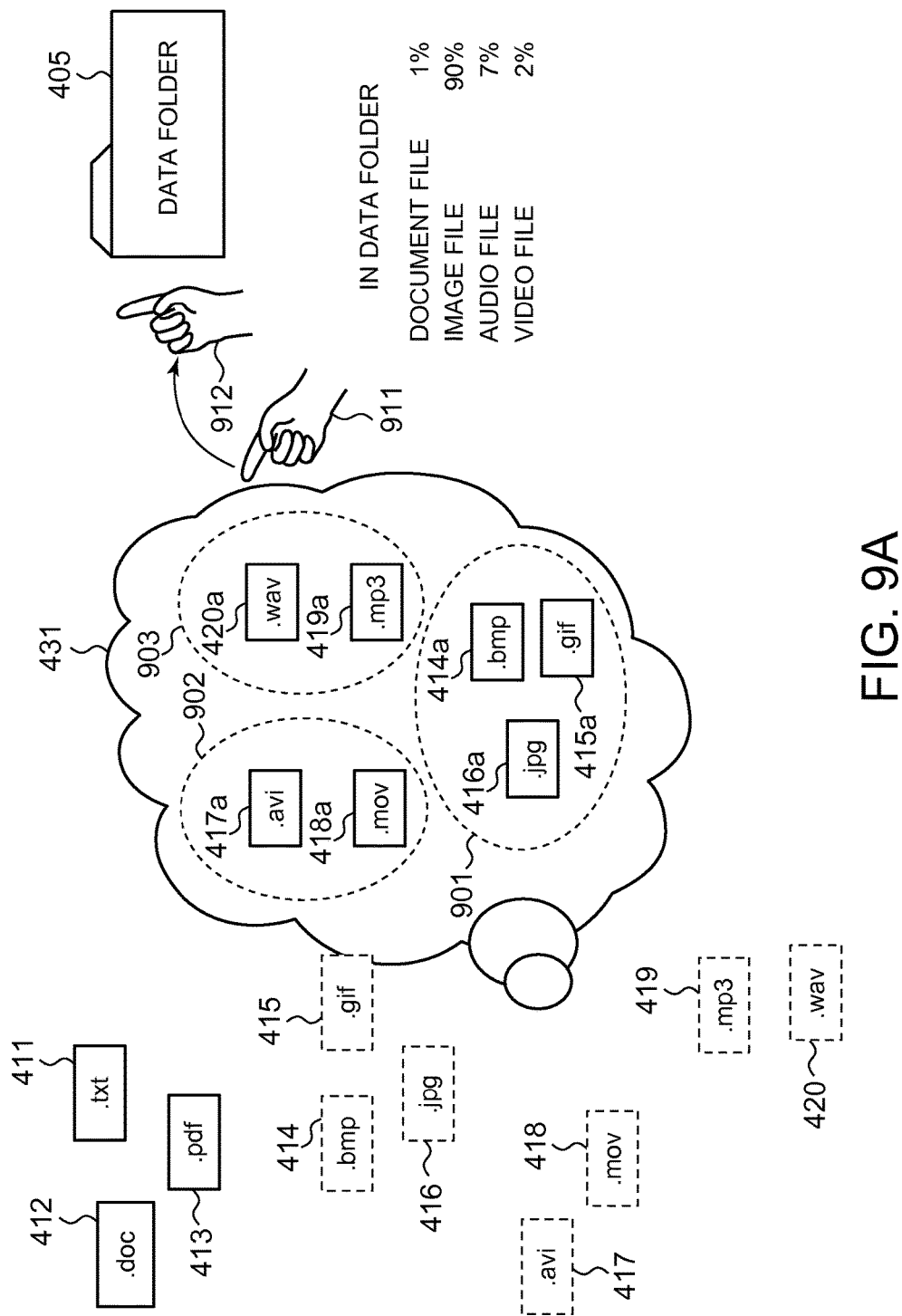
FIG. 9A shows an operation example, in accordance with an embodiment of the disclosure, in which when a group object has been moved into a predetermined range of a destination object (data folder), objects having an attribute belonging to a group whose percentage of presence is largest among groups classified based on file extensions stored in the data folder are moved from the group object into the destination object.
Figure 9B:
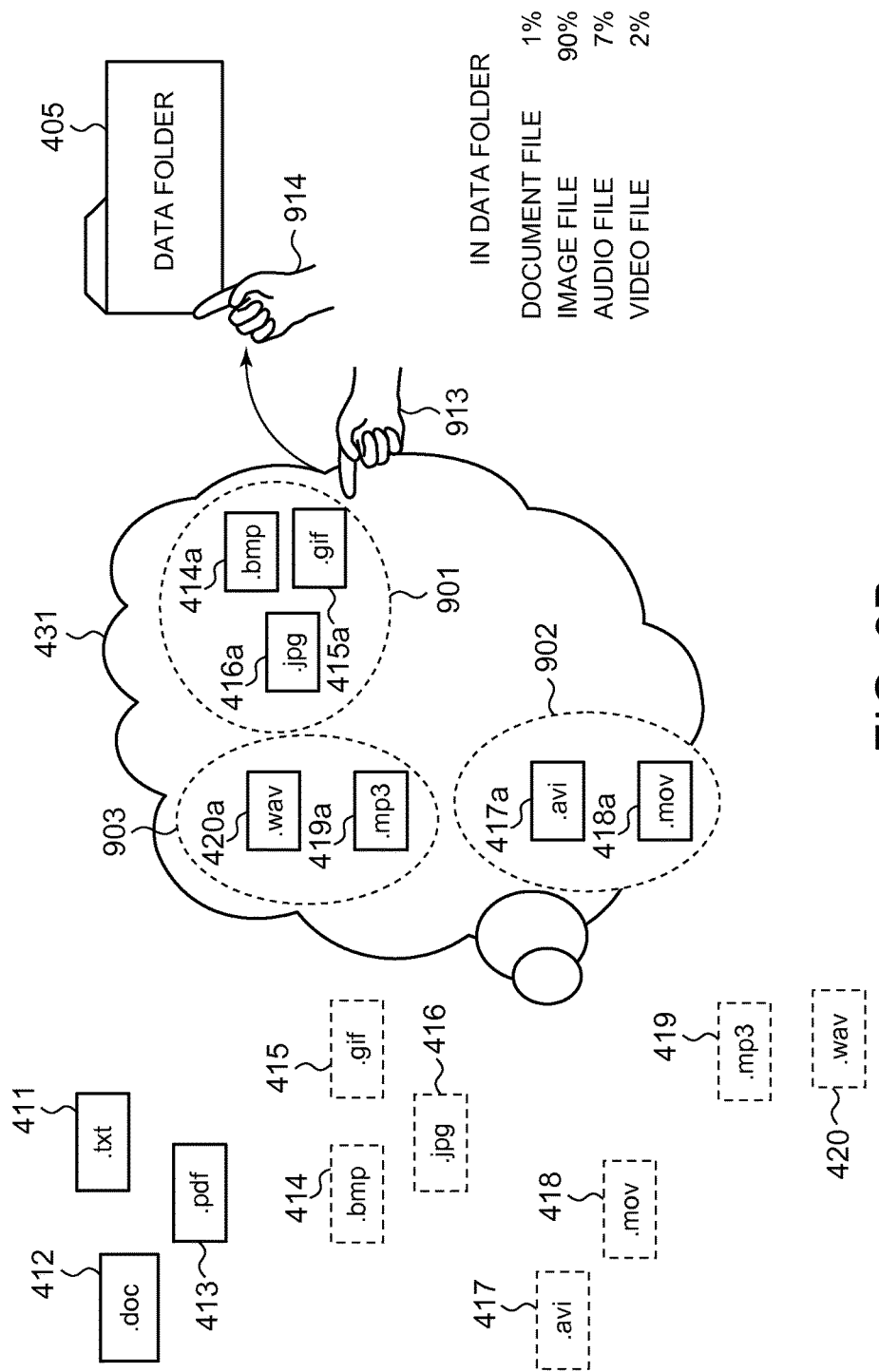
FIG. 9B shows the operation example, in accordance with an embodiment of the disclosure, in which when the group object has been moved into the predetermined range of the destination object (data folder), the objects having the attribute belonging to the group whose percentage of presence is largest among the groups classified based on the file extensions stored in the data folder are moved from the group object into the destination object.
Figure 9C:
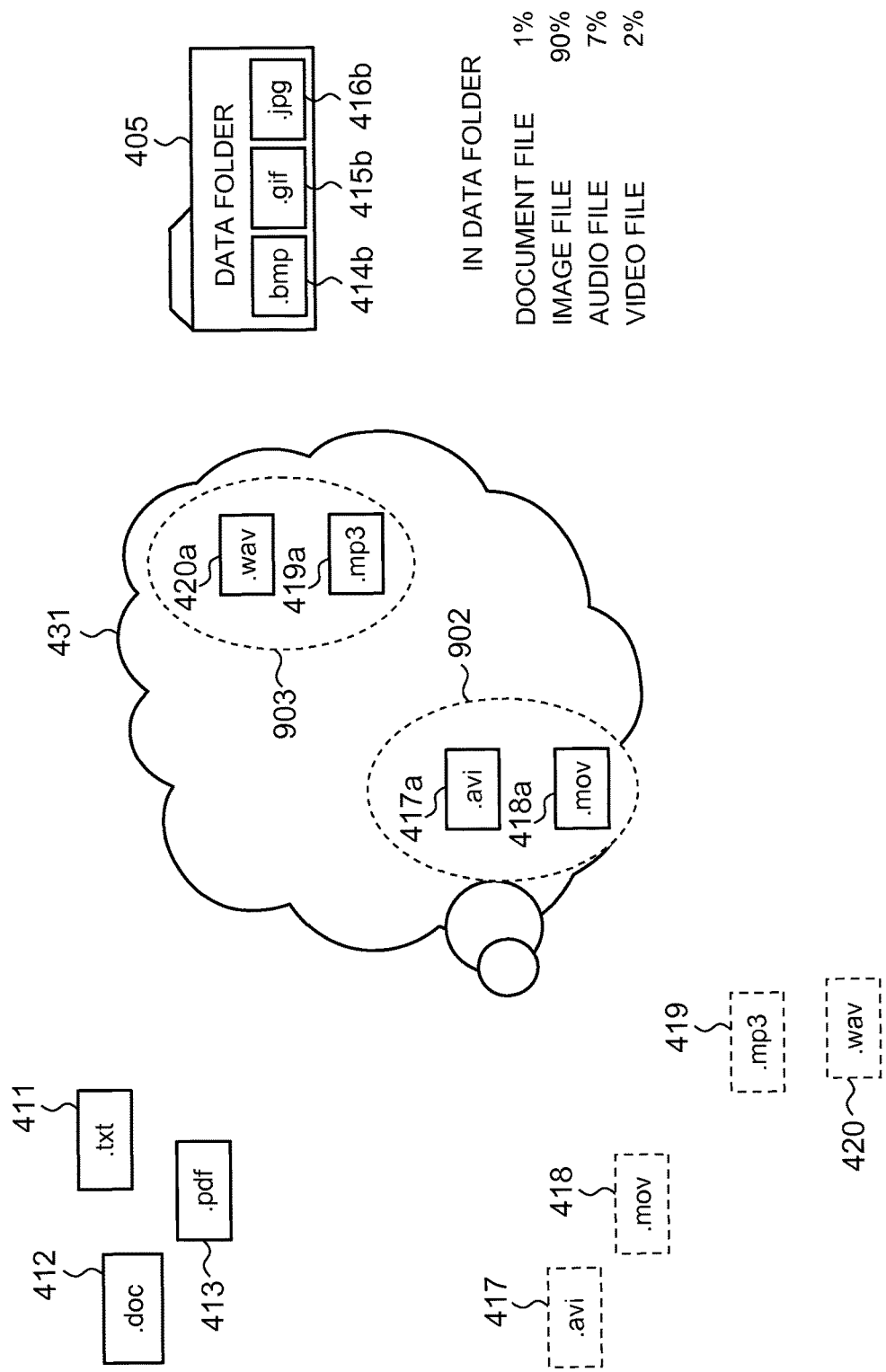
FIG. 9C shows the operation example, in accordance with an embodiment of the disclosure, in which when the group object has been moved into the predetermined range of the destination object (data folder), the objects having the attribute belonging to the group whose percentage of presence is largest among the groups classified based on the file extensions stored in the data folder are moved from the group object into the destination object.

FIG. 9A to FIG. 9C show an operation example, as an embodiment of the present invention, in which when a group object has been moved into a predetermined range of a destination object (data folder), objects having attributes belonging to a group whose percentage of presence is largest are moved from the group object into the destination object from among groups classified based on the file extensions stored in the data folder.

FIG. 9A shows a state in which the respective files 414a-420a in the group object 431 shown in FIG. 5F are sorted and displayed as the group object 431 shown in FIG. 9A according to the attribute of each of the files 414a-420a. FIG. 9A also shows a state in which the respective files in the group object 431 shown in FIG. 5F are displayed in the group object 431 shown in FIG. 9A in such a manner that they are grouped into three groups, namely a picture file group 901, a video file group 902, and a music file group 903 according to the attribute of each of the files 414a-420a) (each of the file extensions in the case of FIG. 9A).

Further, FIG. 9A shows that the user is dragging the group object 431 to move it into a predetermined range of a data folder 405 as the destination object 911 and 912.

FIG. 9B shows that the group object 431 is approaching the data folder 405. Here, the group object processing section 224 detects that the group object 431 is approaching the data folder 405, and calculates, for each data file group, the percentage of presence of files belonging to each data file group in the data folder 405 based on the data file extensions stored in the data folder 405 as follows:

| Data File Group | Percentage of Presence |
| --- | --- |
| Document File | 1% |
| Image file | 90% |
| Audio File | 7% |
| Video File | 2% |

As a result, as shown in FIG. 9B, among the data file groups present in the data folder 405, the picture file group 901 having the same attributes as the image files whose percentage of presence is largest are moved to a position close to the data folder 405 in the group object 431.

Thus, the respective files in the group object can be dynamically sorted based on the percentage of presence of each object attribute or the number of objects stored in the destination object. The dotted line indicative of each group may be displayed on the screen, or it may not be displayed if the respective groups are displayed at predetermined intervals so that the user can recognize each group.

FIG. 9B also shows that the user is dragging the group object 431 to move it into a predetermined range of the data folder 405 as the destination object 913 and 914.

FIG. 9C shows that the picture file group 901 having the same attributes (i.e., the attributes indicating that the extensions are picture files) as the image files whose percentage of presence is largest in the data file groups present in the data folder 405 among the files 419a and 420a in the group object 431 have been moved into the data folder 405 in response to dragging the group object 431 into the predetermined range of the data folder 405. As a result of the migration, the icons of the picture files 414-416 on the desktop are deleted.

Figure 10A:
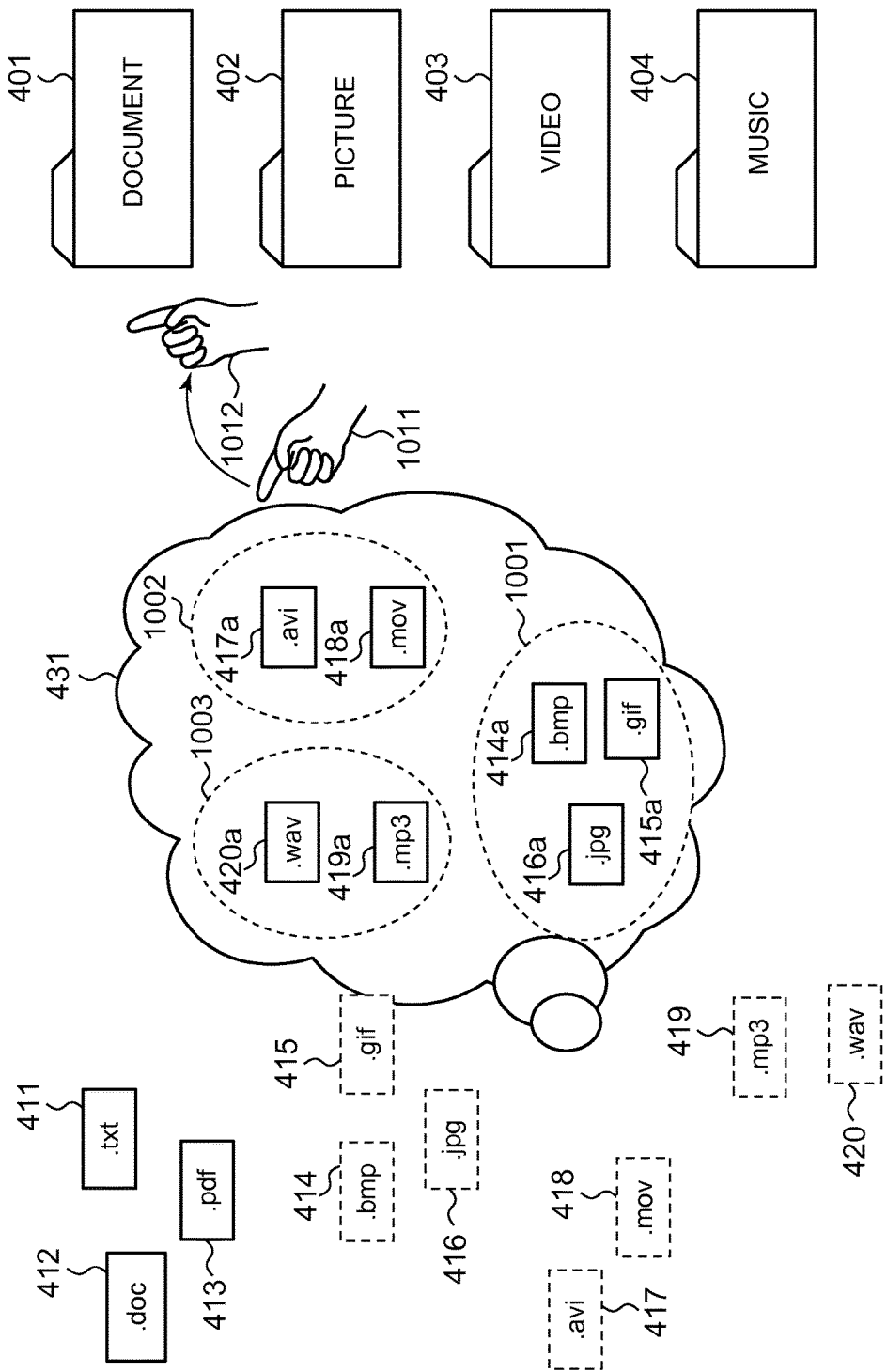
FIG. 10A is a diagram showing an operation example, in accordance with an embodiment of the disclosure, to sort objects in a group object when the group object has been moved into a predetermined range of a destination object.
Figure 10B:
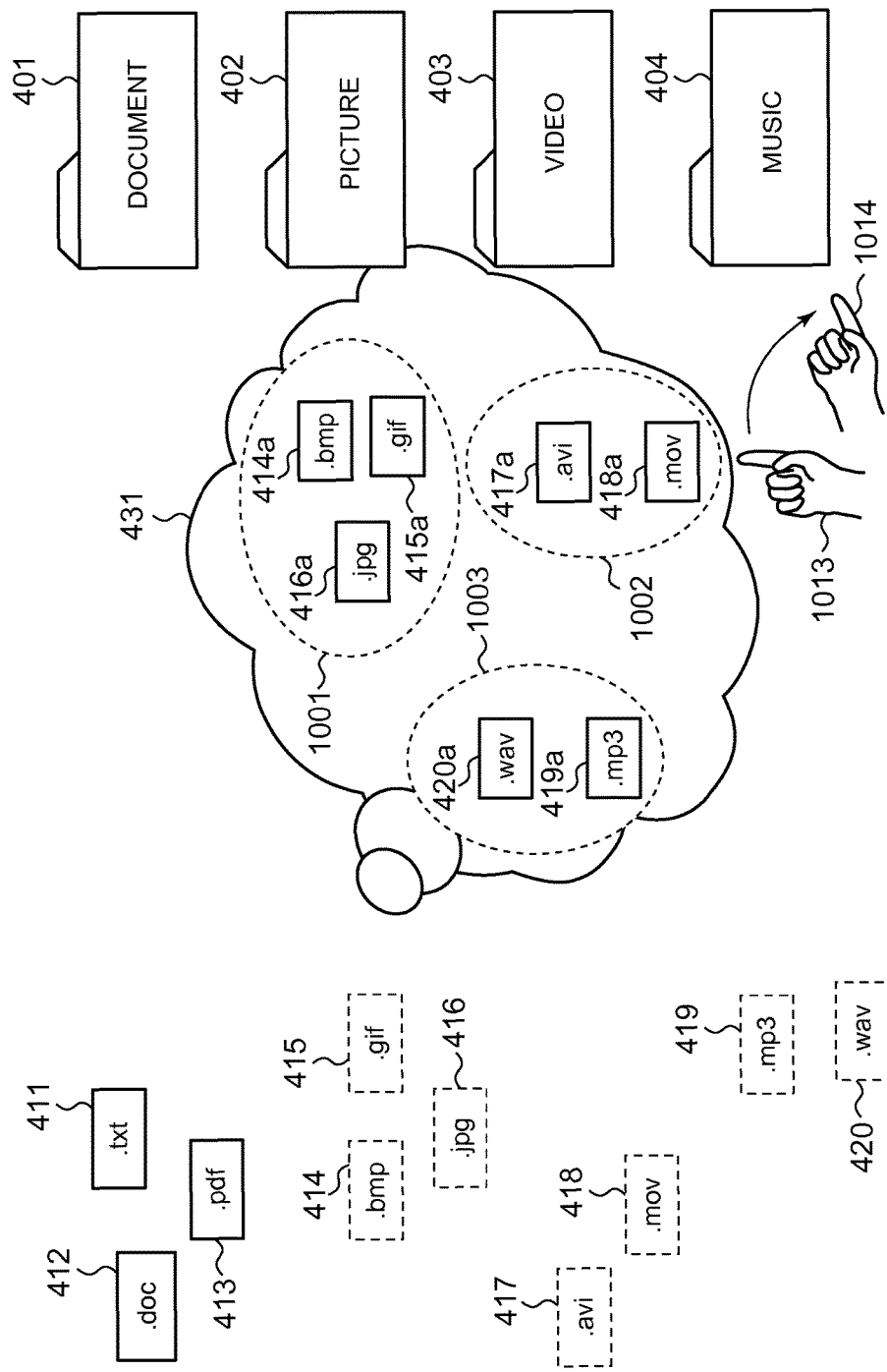
FIG. 10B is a diagram showing the operation example, in accordance with an embodiment of the disclosure, to sort the objects in the group object when the group object has been moved into the predetermined range of the destination object.

FIG. 10A to FIG. 10C show an operation example, as an embodiment of the present invention, to sort objects in a group object when the group object has been moved into a predetermined range of a destination object.

FIG. 10A shows a state in which the respective files 414a-420a in the group object 431 shown in FIG. 5F are displayed in the group object 431 shown in FIG. 10A in such a manner that they are sorted according to the attribute of each of the files 414a-420a. FIG. 10A also shows a state in which the respective files in the group object 431 shown in FIG. 5F are displayed in the group object 431 shown in FIG. 10A in such a manner that they are grouped into three groups, namely a picture file group 1001, a video file group 1002, and a music file group 1003 according to the attribute of each of the files 414a-420a (each of the file extensions in the case of FIG. 10A). Thus, respective files in a group object can be dynamically sorted according to the position or distance between the group object and a folder. The dotted line indicative of each group may be displayed on the screen, or it may not be displayed if the respective groups are displayed at predetermined intervals so that the user can recognize each group.

Further, FIG. 10A shows that the user drags the group object 431 to move it into a predetermined range of a picture folder 402, 1011, and 1012. As a result, the respective files 414a-420a in the group object 431 can be sorted as shown in FIG. 10B.

FIG. 10B shows a state in which the respective files 414a-420a in the group object 431 are sorted in response to dragging the group object 431 into a predetermined range of the picture folder 402 (e.g., onto the picture folder 402 or the vicinity of 1013 and 1014). In the group object 431, picture files 414a-416a having the same attributes as the attributes contained in the picture folder 402 (i.e., the extensions of picture files) are moved to a position close to the picture folder 402 and displayed. Further, in the group object 431, video files 417a and 418a having the same attributes as the attributes contained in the video folder 403 (i.e., the extensions of video files) are moved to a position close to the video folder 403 and displayed. Thus, respective files in a group object can be dynamically sorted according to the position or distance between the group object and a destination folder.

Further, FIG. 10B shows that the user then drags the group object 431 to move it into a predetermined range of a music folder 404. As a result, the respective files 414a-420a in the group object 431 can be dynamically sorted as shown in FIG. 10C.

FIG. 10C shows a state in which the respective files 414a-420a in the group object 431 are sorted in response to dragging the group object 431 into the predetermined range of the music folder 404. In the group object 431, the music files 419a and 420a having the same attributes as the attributes contained in the music folder 404 (i.e., the extensions of music files) are displayed at a position close to the music folder 404. Further, in the group object 431, the video files 417a and 418a having the same attributes as the attributes contained in the video folder 403 (i.e., the extensions of video files) are displayed at a position close to the video folder 403. Thus, respective files in a group object can be dynamically sorted according to the position or distance between the group object and a destination folder.

Figure 11A:
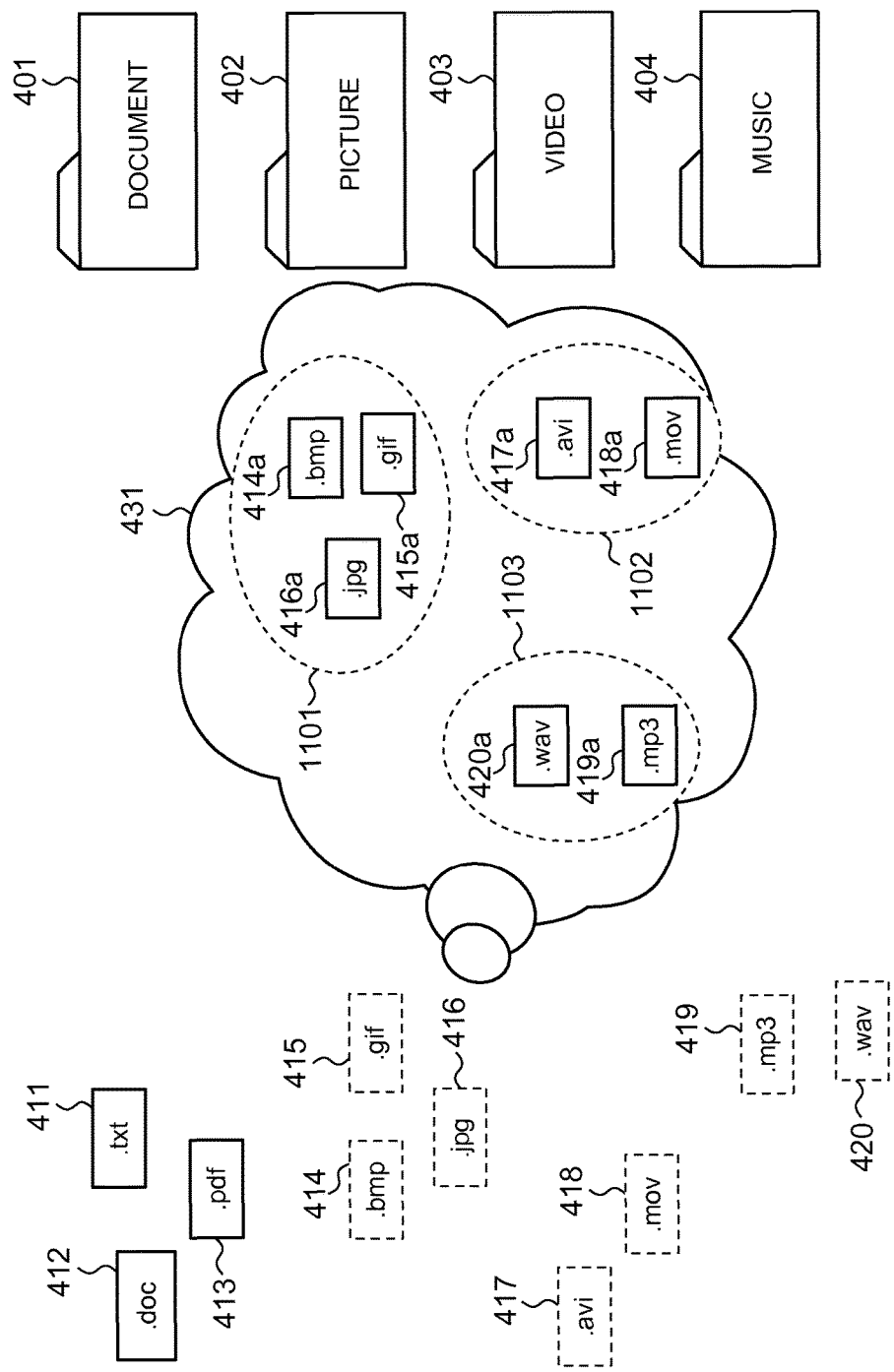
FIG. 11A is a diagram showing an operation example, in accordance with an embodiment of the disclosure, to sort objects in a group object when the group object is within a predetermined range of multiple destination candidate objects.
Figure 11B:
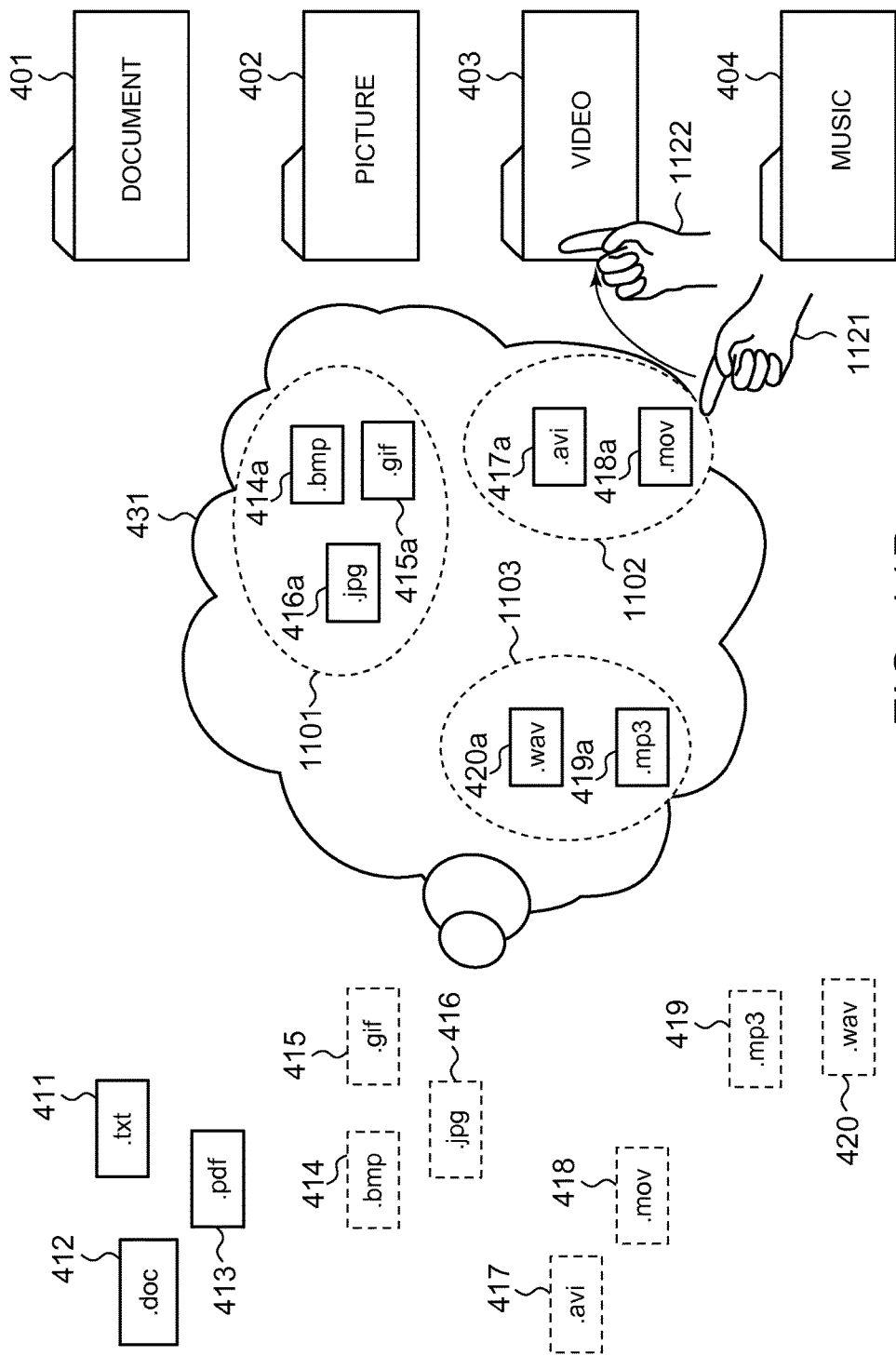
FIG. 11B is a diagram showing the operation example, in accordance with an embodiment of the disclosure, to sort the objects in the group object when the group object is within the predetermined range of the multiple destination candidate objects.
Figure 11C:
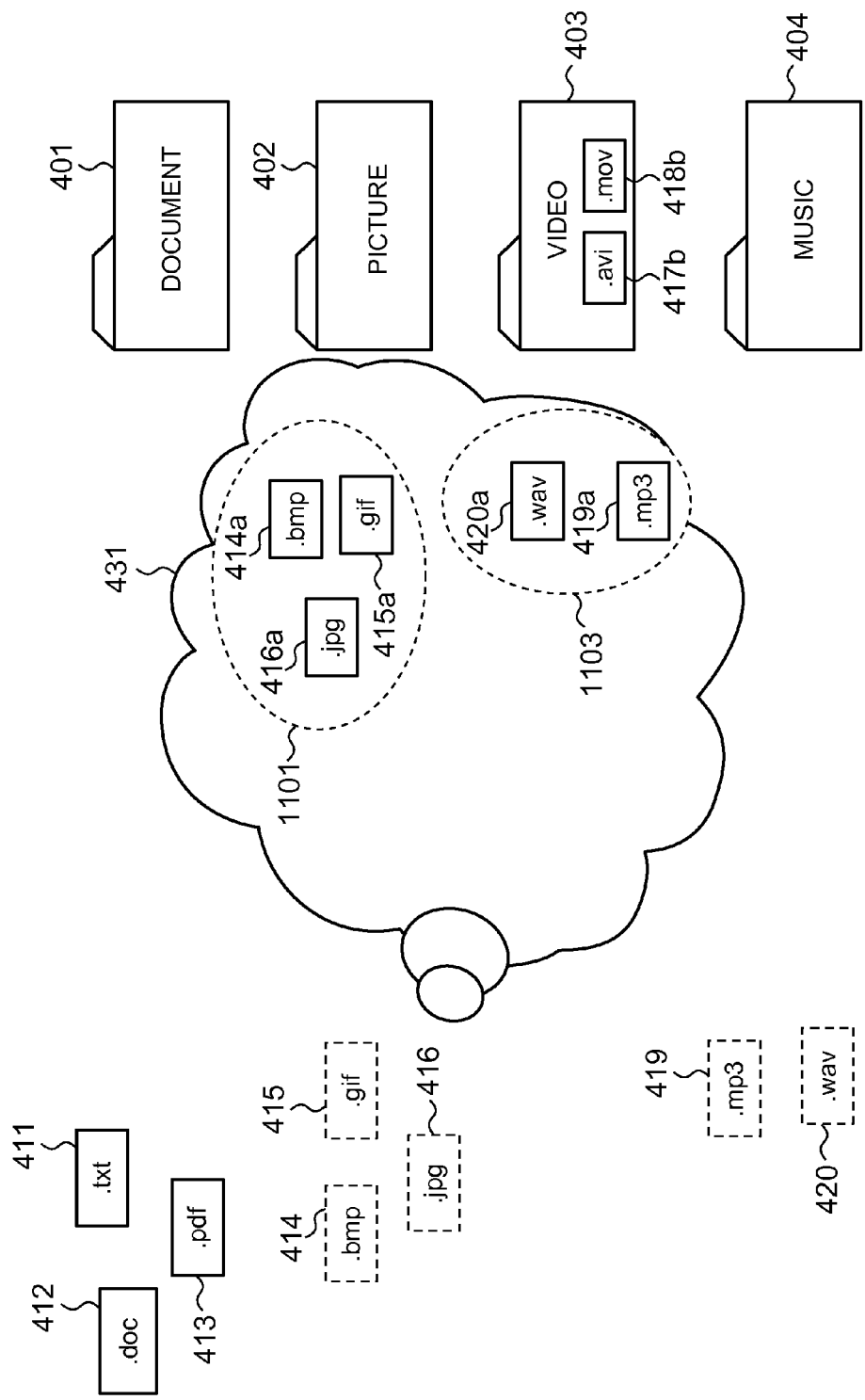
FIG. 11C is a diagram showing the operation example, in accordance with an embodiment of the disclosure, to sort the objects in the group object when the group object is within the predetermined range of the multiple destination candidate objects.

FIG. 11A to FIG. 11C show an operation example, as an embodiment of the present invention, to sort objects in a group object when the group object is in a predetermined range of multiple destination candidate objects.

FIG. 11A shows a state in which the respective files 414a-420a in the group object 431 shown in FIG. 5F are displayed in the group object 431 shown in FIG. 11A in such a manner that they are sorted according to the attribute of each of the files 414a-420a. FIG. 11A also shows a state in which the respective files 414a-420a in the group object 431 shown in FIG. 5F are displayed in the group object 431 shown in FIG. 11A in such a manner that they are grouped into three groups, namely a picture file group 1101, a video file group 1102, and a music file group 1103 according to the attribute of each of the files 414a-420a (each file extension in the case of FIG. 11A). The dotted line indicative of each group may be displayed on the screen, or it may not be displayed if the respective groups are displayed at predetermined intervals so that the user can recognize each group.

FIG. 11B shows that the user can easily move specific files in the group object 431 into a specific folder because the respective files 414a-420a are sorted in the group object 431 on a file attribute basis as shown in FIG. 11A. FIG. 11B shows a state in which the user drags 1121 and 1122 video files 417a and 418a in the group object 431 to move them to a video folder 403. The result is shown in FIG. 11C.

FIG. 11C shows that the video files 417a and 418a in the group object 431 has been moved to the video folder 403 as a result of dragging shown in FIG. 11B. As a result of the migration, the icons of the video files 417 and 418 on the desktop are deleted.

Figure 12A:
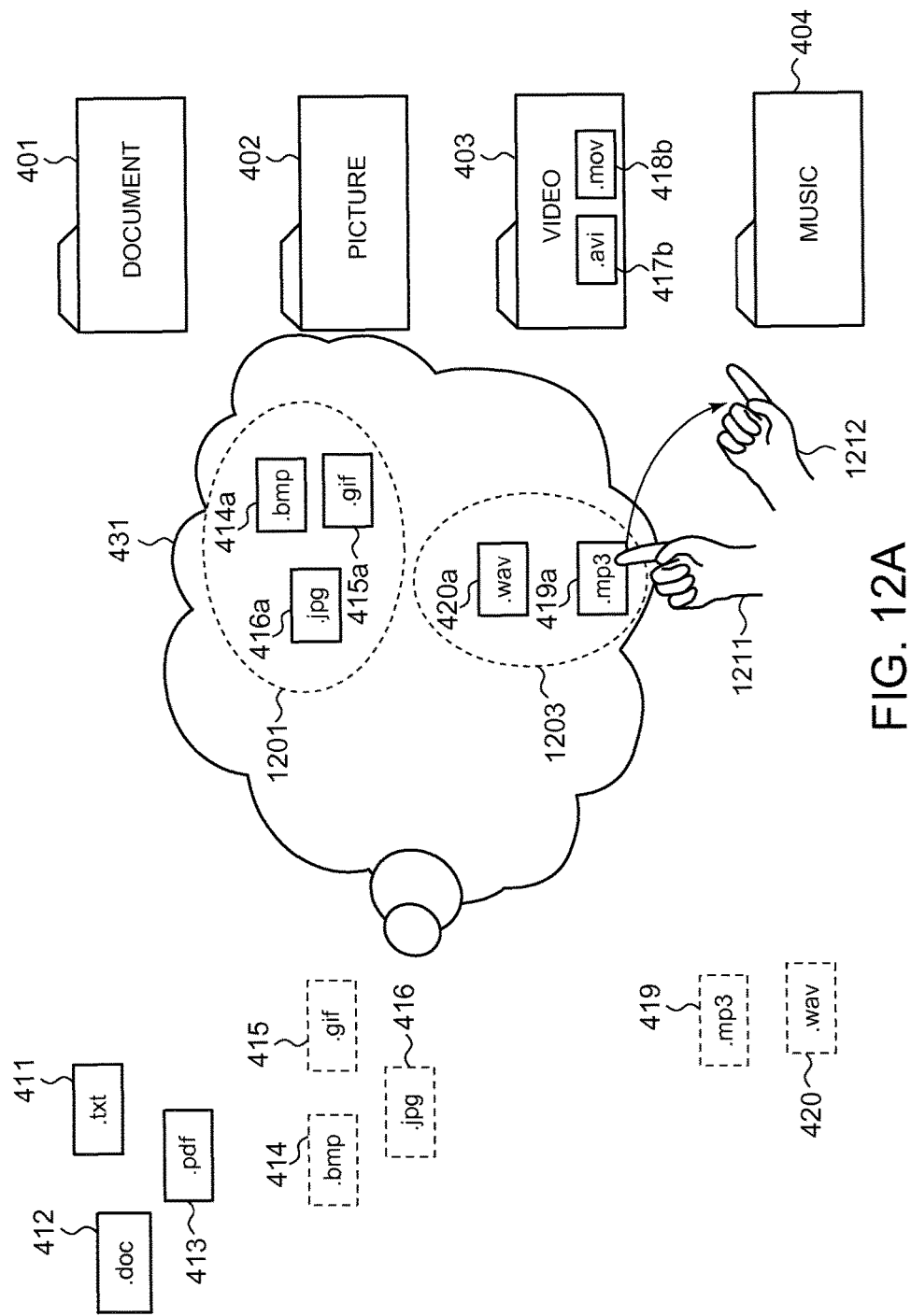
FIG. 12A is a diagram showing an operation example, in accordance with an embodiment of the disclosure, to move specific objects to a destination object after objects in a group object are sorted.
Figure 12B:
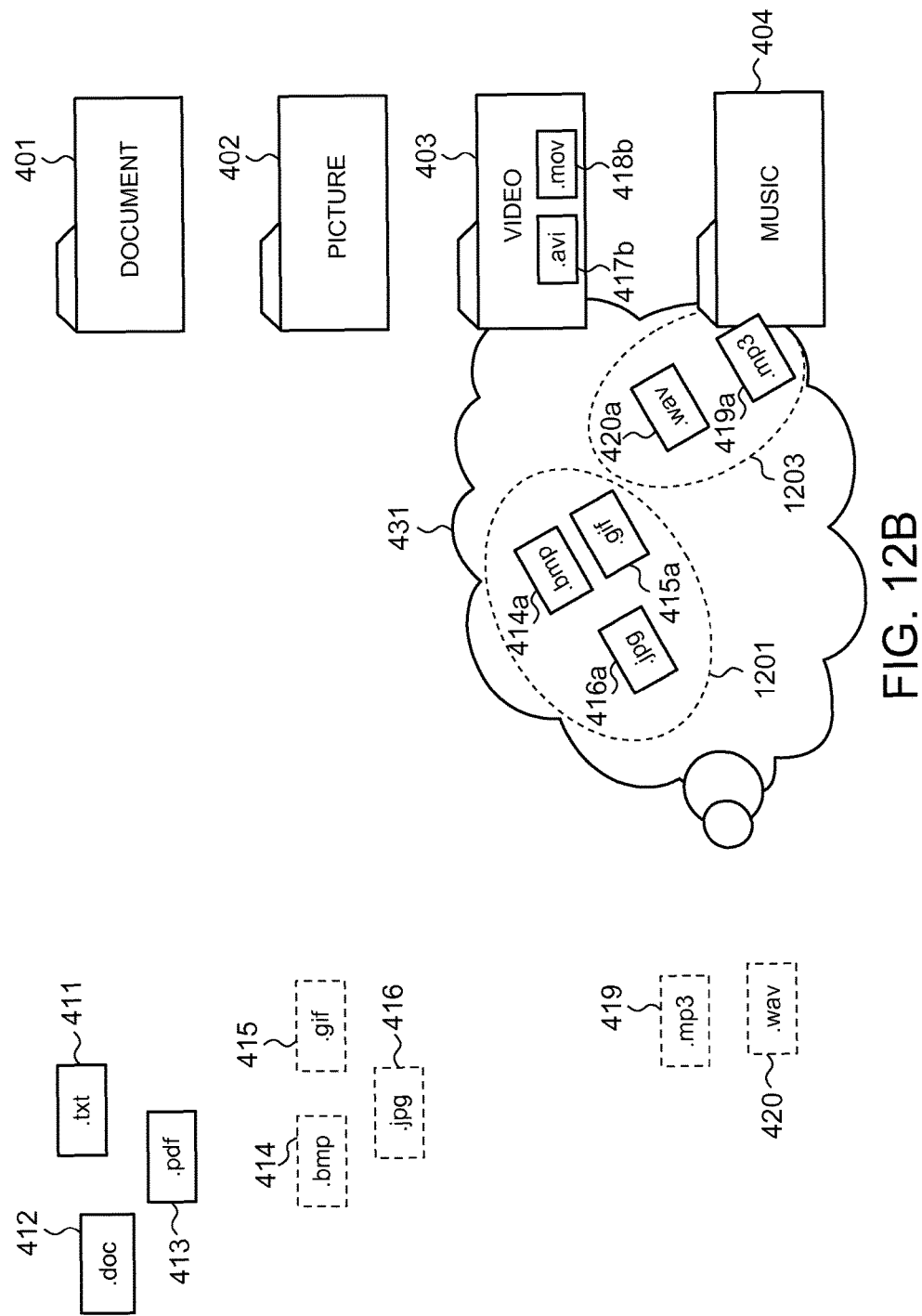
FIG. 12B is a diagram showing the operation example, in accordance with an embodiment of the disclosure, to move the specific objects to the destination object after the objects in the group object are sorted.
Figure 12C:
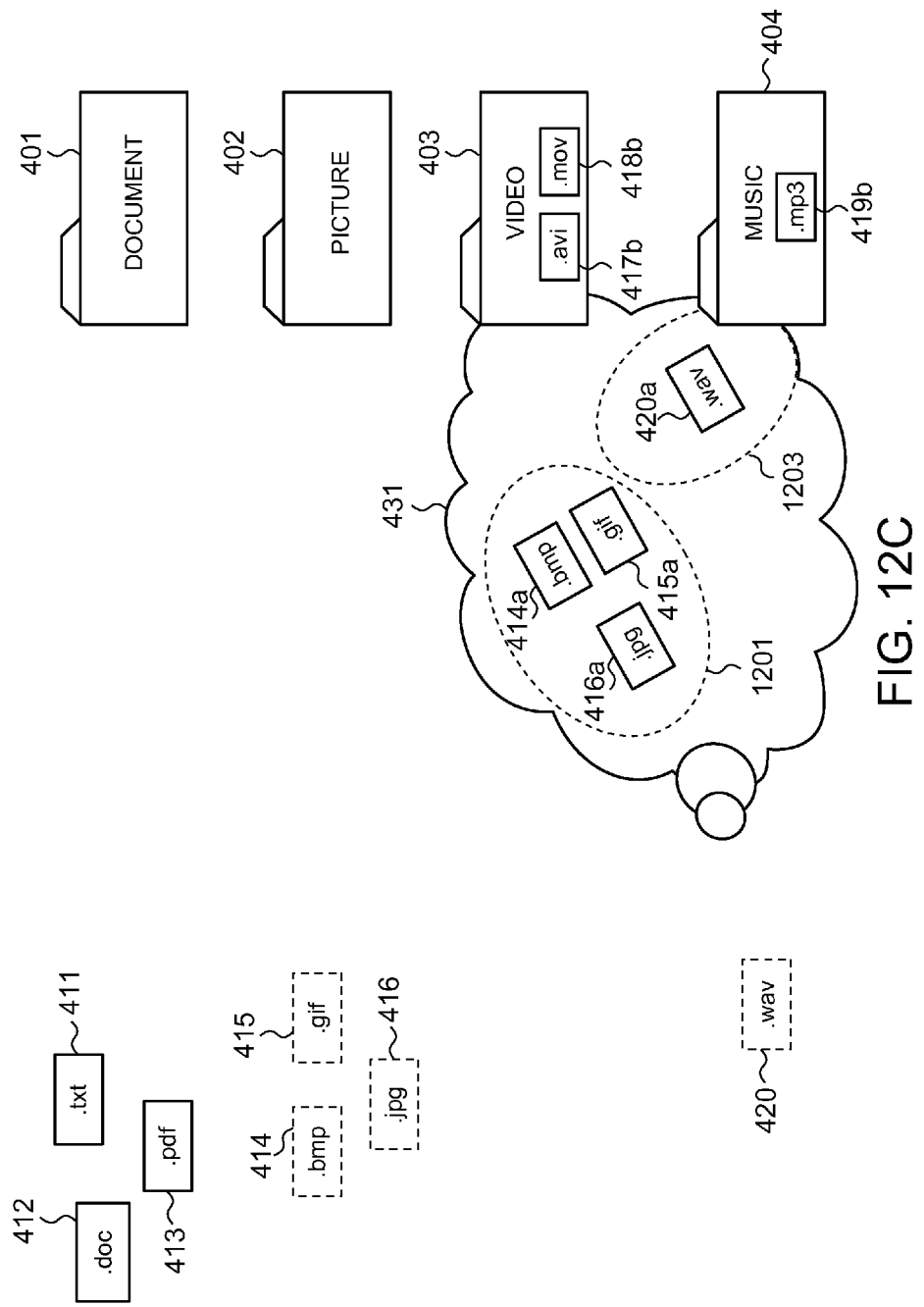
FIG. 12C is a diagram showing the operation example, in accordance with an embodiment of the disclosure, to move the specific objects to the destination object after the objects in the group object are sorted.
Figure 12D:
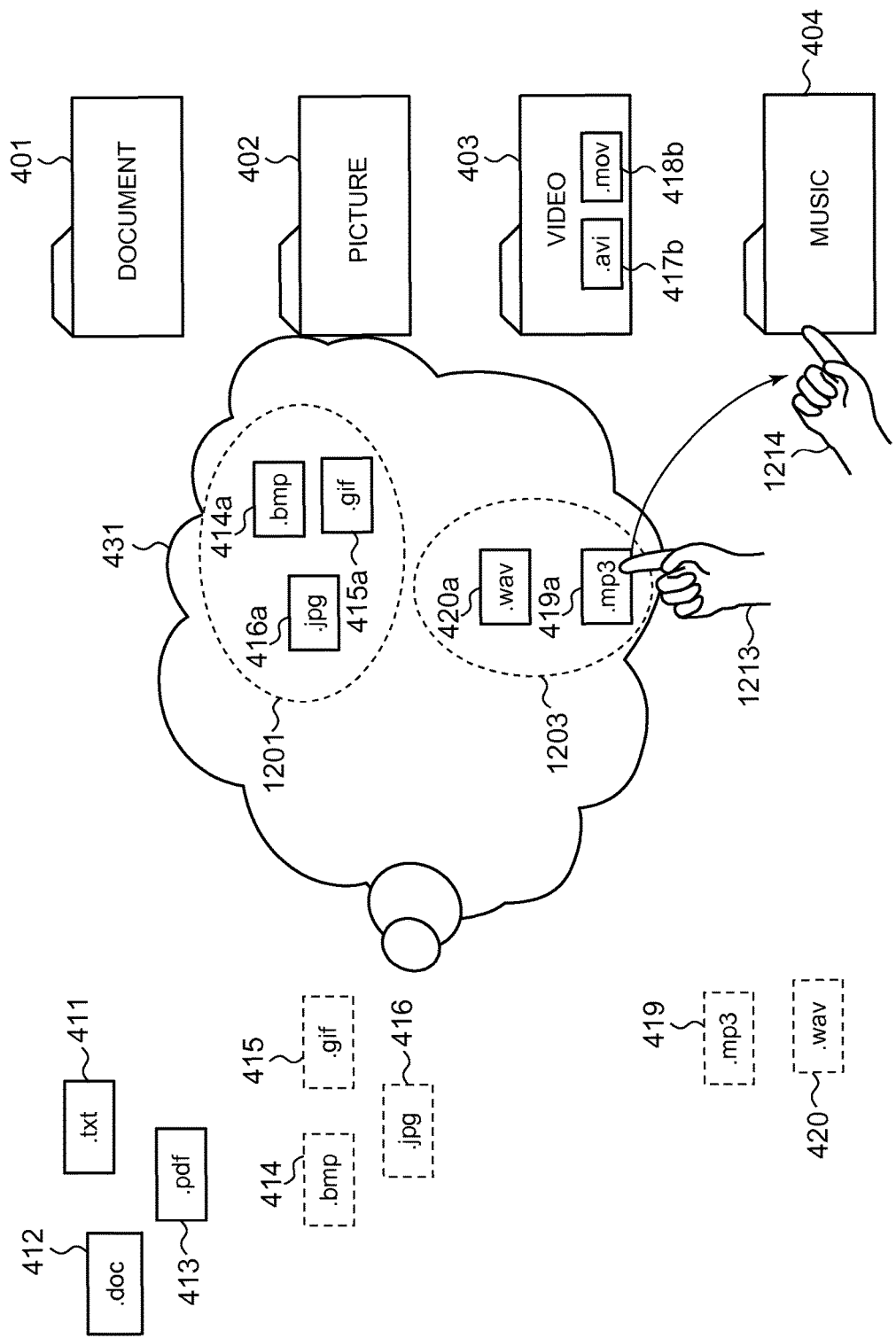
FIG. 12D is a diagram showing the operation example, in accordance with an embodiment of the disclosure, to move the specific objects to the destination object after the objects in the group object are sorted.
Figure 12E:
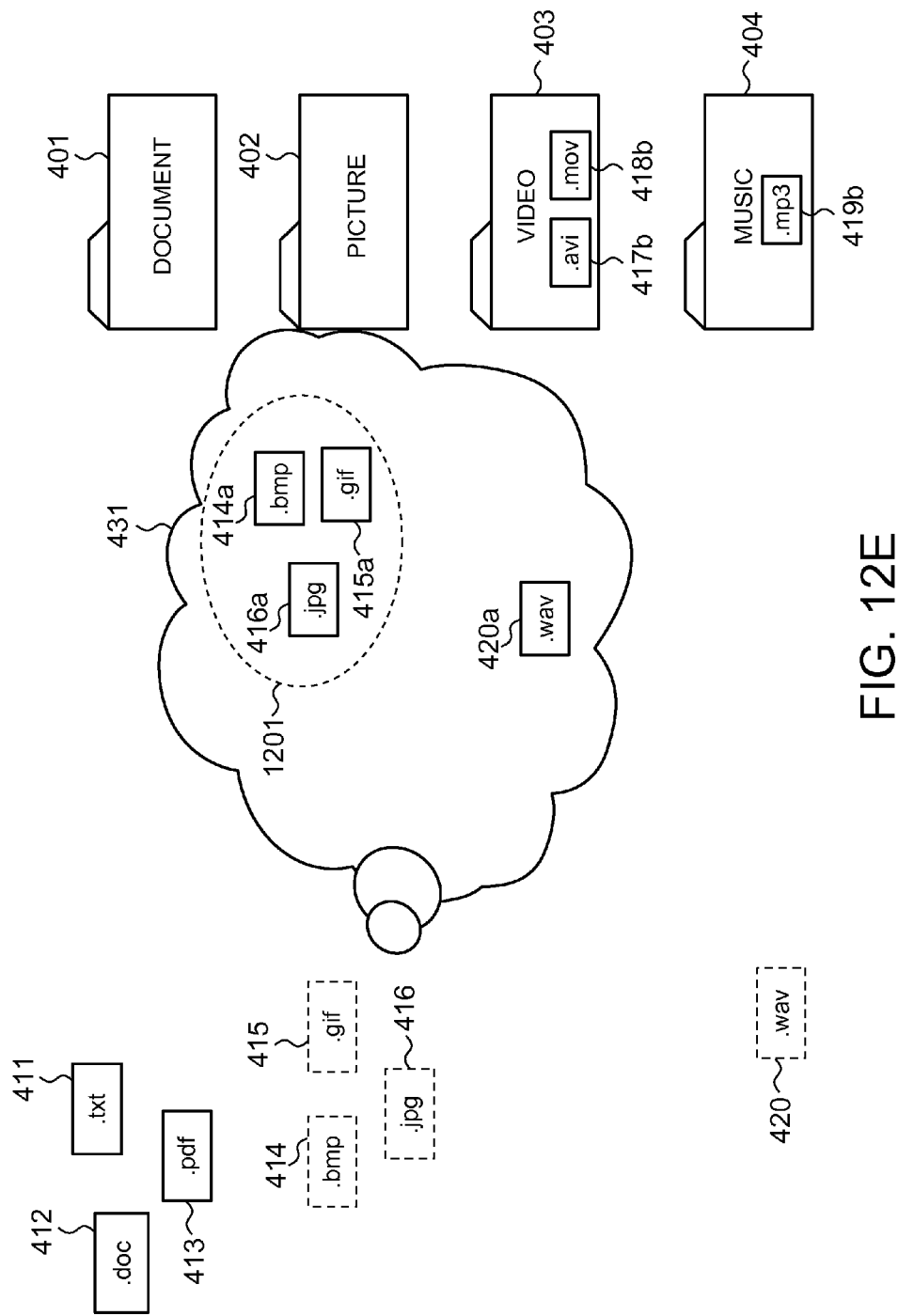
FIG. 12E is a diagram showing the operation example, in accordance with an embodiment of the disclosure, to move the specific objects to the destination object after the objects in the group object are sorted.

FIG. 12A to FIG. 12C shows an operation example, as an embodiment of the present invention, to move a specific object in a group object to a destination object after the objects in the group object are sorted. This moving method includes a method of moving the group object to a destination object to move the specific object as shown in FIG. 12A to FIG. 12C, and a method of moving the specific object directly to the destination object as shown in FIG. 12D to FIG. 12E.

FIG. 12A shows that the user moves the group object to a destination object to move only a music file 419a in the group object 431 into the music folder 404.

The user drags the group object 431 in the direction of the music folder 404, 1211, and 1212.

FIG. 12B shows that the music file 419a is put on the music folder 404 in response to the user's dragging action 1211 and 1212 shown in FIG. 12A.

FIG. 12C shows that only the music file 419a in the group object 431 has been moved to the music folder 404 in response to putting the music file 419a on the music folder 404.

FIG. 12D shows that the user moves a music file 419a in the group object 431 to a destination object to move only the music file 419a to the music folder 404.

The user drags the music file 419a in the direction of the music folder 404, 1213, and 1214.

FIG. 12E shows that the music file 419a in the group object 431 has been moved into the music folder 404. Note that the user can also move a music file 419b moved into the music folder 404 or music files (not shown) located in the music folder 404 into the group object 431 in the same manner.

Figure 13:
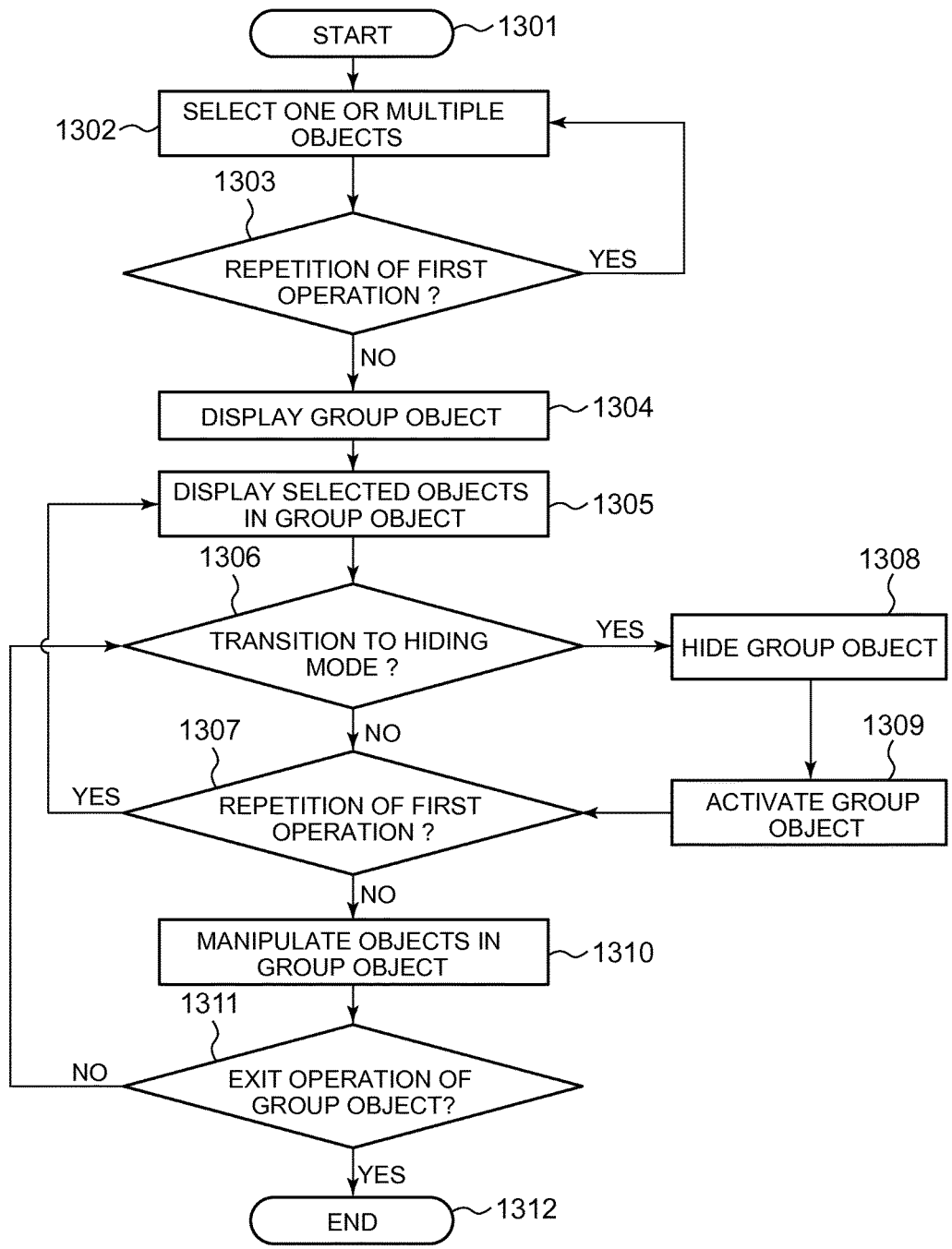
FIG. 13 is a flowchart showing each processing in both of a group object manipulating mode and hiding mode in accordance with an embodiment of the disclosure.

FIG. 13 is a flowchart showing each processing in both the group object manipulating mode and hiding mode as the embodiments of the present invention.

In step 1301, a device capable of being used in the embodiments of the present invention (hereinafter simply called the device) starts a group object processing program. The processing program can be automatically read and started, for example, upon starting the device.

In step 1302, the selection section 222 enables the user to select one or multiple objects on a folder, and detects that the objects are selected in response to a user's operation.

In step 1303, the selection section 222 detects whether the user selects any other object after step 1302. When the selection section 222 detects a repetition of the user's selection operation (for example, see FIG. 5C, FIG. 5D, and FIG. 5E), the procedure returns to step 1302. On the other hand, when the user's operation is to display a group object (for example, see FIG. 4A, FIG. 4B, and FIG. 4C), the selection section 222 passes the processing to the group object display section 223, and the procedure proceeds to step 1304.

In step 1304, the group object display section 223 displays a group object on the display section 211 in response to a user's operation.

In step 1305, the group object display section 223 displays the objects, selected by the user in step 1302, in the group object in response to a user's operation.

In step 1306, the group object processing section 224 detects whether there is a user's instruction to make a transition to the group object hiding mode. If there is no instruction to make a transition to the group object hiding mode and there is an instruction to manipulate objects or objects in the group object, the procedure proceeds to step 1307. On the other hand, when there is an instruction to make a transition to the group object hiding mode, the group object processing section 224 proceeds to step 1308.

The determination as to whether there is a user's instruction to make a transition to the group object hiding mode is made, for example, by determining whether a predetermined period of time has elapsed since the group object was displayed. In such a case, the group object processing section 224 proceeds to step 1308 after the predetermined period of time has elapsed. On the other hand, if the manipulation of objects, the group object, or files in the group object in response to a user's operation is detected before the predetermined period of time elapses, the group object processing section 224 proceeds to step 1307.

In step 1307, the selection section 222 detects whether the user selects any object like in step 1303. When the selection section 222 detects a repetition of the user's selection operation, the procedure returns to step 1305. On the other hand, when the manipulation of the group object or files in the group object according to a user's operation is detected, the group object processing section 224 proceeds to step 1310.

In step 1308, the group object processing section 224 makes a transition from the group object manipulating mode to the group object hiding mode in response to a user's operation. The group object display section 223 hides the group object from the screen or displays a small icon in response to the transition. The user's operation is the operation shown in the description of FIG. 6A and FIG. 6B, for example.

In step 1309, the group object processing section 224 makes a transition from the group object hiding mode to the group object manipulating mode in response to a user's operation. The user's operation is the operation shown in the description of FIG. 7C and FIG. 7D, for example. The user's operation may also be to select one or multiple objects in step 1302. The group object display section 223 displays the group object again on the screen in response to the transition. The group object processing section 224 proceeds to step 1307 in response to the activation of the group object.

In step 1310, objects in the group object are manipulated according to a user's operation. The details of the manipulation of objects in the group object will be described later with reference to FIG. 14. The group object processing section 224 proceeds to step 1311 in response to completion of the manipulation.

In step 1311, if there is the next user's operation, the group object processing section 224 returns to step 1306, and if the transition is not to the hiding mode, the operation in step 1307 is performed again. On the other hand, if the next user's operation is an exit operation of the group object or when no object is left in the group object, the group object processing section 224 proceeds to step 1312. Further, if there is no manipulation of objects in the group object for a predetermined period of time, the group object processing section 224 returns to step 1306 to hide the group object 1308.

In step 1312, the group object processing section 224 exits from the group object processing program in response to a user's operation or an operation for shutting down the device.

In the above flowchart, processing step 1302 to step 1304 may also be executed in the following order: step 1304, step 1302, and step 1303.

Figure 14:
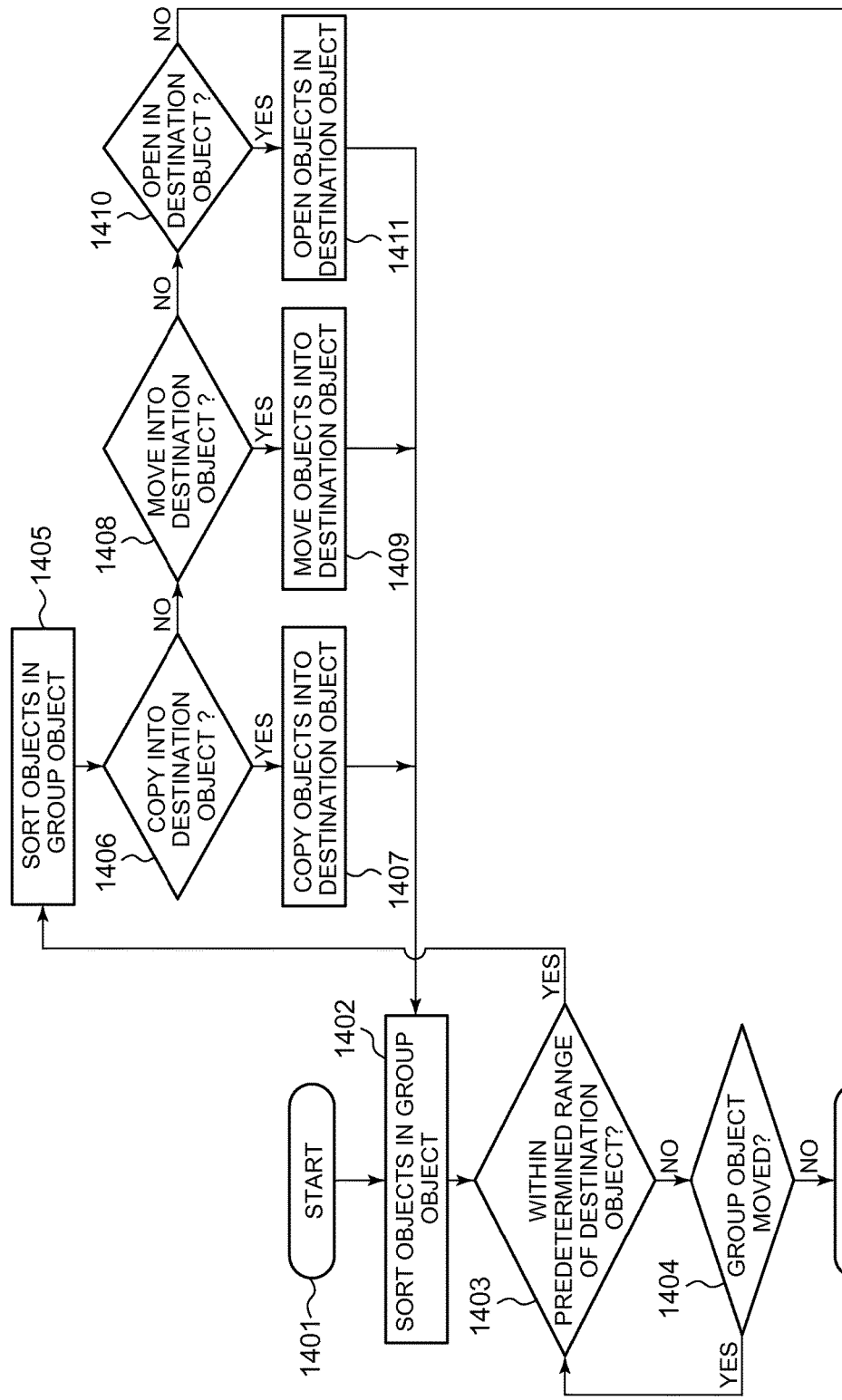
FIG. 14 is a flowchart showing processing for manipulating objects in a group object in accordance with an embodiment of the disclosure.

FIG. 14 is a flowchart showing processing for manipulating objects in a group object as an embodiment of the present invention.

In step 1401, the group object processing section 224 starts processing for manipulating objects in a group object.

In step 1402, the group object processing section 224 can sort the objects in the group object if needed according to the attributes of the objects. The sorting results are as shown in FIG. 10A and FIG. 11A, for example.

In step 1403, the group object processing section 224 determines whether the group object is in a predetermined range of a destination object in response to a user's operation. If the group object is not in the predetermined range, the group object processing section 224 proceeds to step 1404. On the other hand, if the group object is in the predetermined range, the group object processing section 224 proceeds to step 1405.

In step 1404, the group object processing section 224 determines whether the group object has been moved in response to a user's operation. If the group object has been moved, the group object processing section 224 returns to step 1403 (see FIG. 8A, FIG. 8C, FIG. 8E, FIG. 10A, and FIG. 10B). On the other hand, if the group object is not moved, the group object processing section 224 proceeds to step 1412.

In step 1405, the group object processing section 224 sorts the objects moved in the group object using the attributes of a destination object (see FIG. 8B, FIG. 8D, FIG. 8F, FIG. 10B, and FIG. 10C).

In step 1406, the group object processing section 224 determines whether the user's operation is to copy any object in the group object into the destination object. The group object processing section 224 proceeds to step 1407 if the user's operation is to copy, or to step 1408 if the user's operation is not to copy.

In step 1407, the group object processing section 224 copies a specific object(s) in the group object into the destination object. As a result of the copying, the group object display section 223 displays the copied object(s) in the destination object. After completion of the copying, the group object processing section 224 returns to step 1402 in which the objects can be sorted in the group object according to the attributes of the objects.

In step 1408, the group object processing section 224 determines whether the user's operation is to move any object in the group object into a destination object. The group object processing section 224 proceeds to step 1409 if the user's operation is to move, or to step 1410 if the user's operation is not to move.

In step 1409, the group object processing section 224 moves a specific object(s) in the group object into the destination object. As a result of the migration, the icon display section 221 displays the moved object(s) in the destination object (see FIG. 8C, FIG. 8E, FIG. 8G, FIG. 11C, and FIG. 12C). On the other hand, the group object display section 223 deletes, from the group object, an object(s) corresponding to the object(s) moved in the destination object. After completion of the migration, the group object processing section 224 returns to step 1402 in which the objects can be sorted in the group object according to the attributes of the objects.

In step 1410, the group object processing section 224 determines whether the user's operation is to open, in the destination object, any object in the group object. The group object processing section 224 proceeds to step 1411 if the user's operation is to open, or to step 1412 if the user's operation is not to open.

In step 1411, the group object processing section 224 opens, in the destination object, a specific object(s) in the group object. When the specific object(s) is opened in the destination object, the icon(s) of the specific object(s) is deleted from the group object, and icon(s) of the specific object(s) in the group object before being moved are returned to those indicated by the solid lines. The group object processing section 224 returns to step 1402 in response to opening the specific object(s) in the destination object so that the objects in the group object can be sorted according to the attributes of the objects.

In step 1412, the group object processing section 224 ends the processing for manipulating the objects in the group object. The group object processing section 224 proceeds to step 1311 in FIG. 13 after ending the processing.

Figure 15:
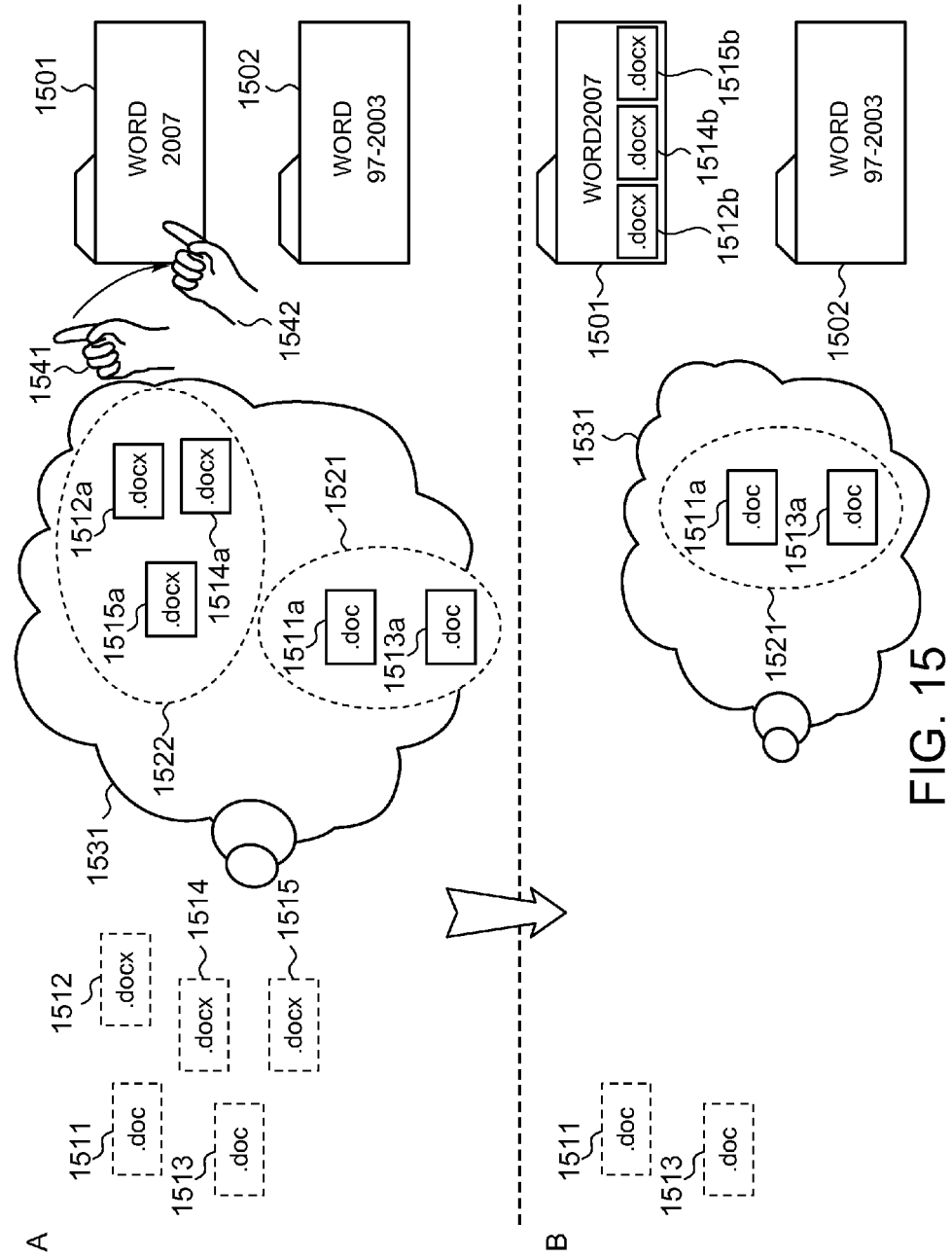
FIG. 15 is a diagram showing processing for sorting files different in application specific format preferentially according to the embodiments of the disclosure.

FIG. 15 is a diagram showing processing for sorting files different in application specific format preferentially according to the embodiments of the present invention.

The user wants to sort files into predetermined folders while distinguishing between files in WORD 97-2003 format and files in WORD2007 format. Therefore, the user turns on the group object manipulating mode to call a group object 1531 and put WORD files 1511-1515 into the group object 1531. FIG. 15A (upper side) shows a state immediately after that. In FIG. 15A, the WORD files 1511-1515 is moved in the group object 1531 and sorted into group 1 1521 of files 1511a and 1513a in Word 97-2003 format and group 2 of files 1512a, 1514a, and 1515a in Word 2007 format.

The user moves the group object 1531 to a folder 1501, 1541, and 1542. The WORD 2007 format is associated with the folder 1501 as the attribute.

Therefore, the group object processing section 224 selects the group 2 having the same attribute as the attribute of the folder 1501 from the group object 1531 and moves the group 2 to the folder 1501. FIG. 15B shows a state immediately after that. FIG. 15B shows that the WORD files 1512a, 1514a, and 1515a sorted in the group 2 1522 has been moved to the folder 1501, 1512b, 1514b, and 1515b. In FIG. 15B, the WORD files 1512, 1514, and 1515 are erased from the desktop.

In FIG. 15, an example in which the application specific format is used as the attribute is described. The following will describe an example in which the shooting location of an image file is used as the attribute. Suppose that GPS data is embedded in each image file, and each folder is associated with a GPS range, for example, indicative of Tokyo, Osaka prefecture, or Kyoto prefecture.

The user wants to sort image files into predetermined folders by distinguishing among three shooting locations (Tokyo, Osaka, and Kyoto). Therefore, the user turns on the group object manipulating mode to call a group object and put the image files into the group object (note that there is no problem if files other than image files are contained). In the group object, the respective files are sorted into three groups, namely a file group shot in Tokyo, a file group shot in Osaka, and a file group shot in Kyoto according to the GPS data on each file.

The group object is moved to a folder storing images in Tokyo (hereinafter called the folder (Tokyo)). The folder is associated with the GPS format of Tokyo as the attribute.

Therefore, the group object processing section 224 selects image files shot in Tokyo and having the same attribute as the attribute of the folder (Tokyo) from the group object 1531, and moves the selected image files to the folder (Tokyo). Along with the migration, the icon display section 221 deletes the images files shot in Tokyo from the desktop.

Figure 16:
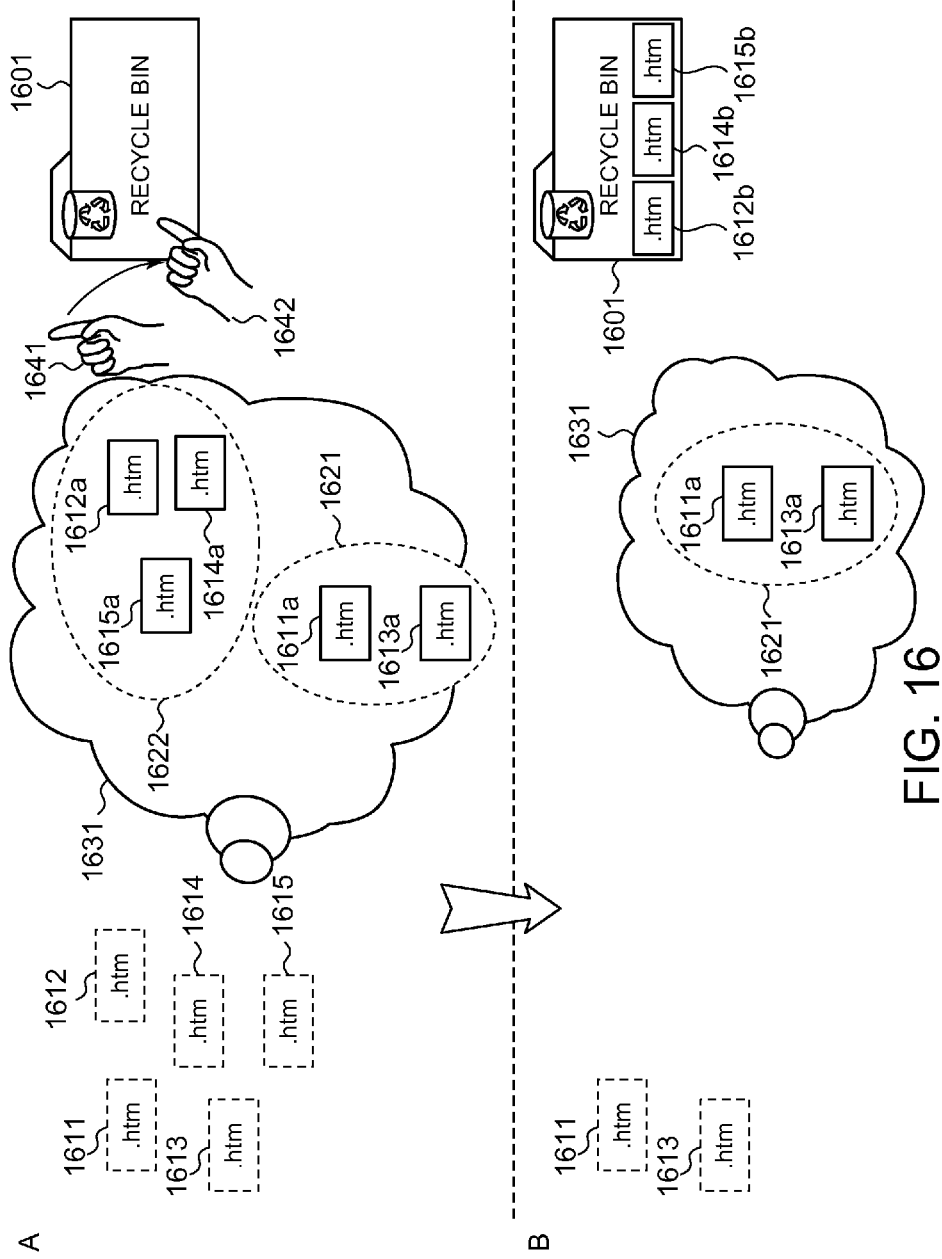
FIG. 16 is a diagram showing processing for throwing dead link files among multiple bookmark files into a recycle bin according to the embodiments of the disclosure.

FIG. 16 is a diagram showing processing for throwing dead link files among multiple bookmark files into the recycle bin according to the embodiments of the present invention.

The user wants to throw files that are dead links as attributes among the multiple bookmark files into the recycle bin. Therefore, the user turns on the group object manipulating mode to call a group object 1631 and put bookmark files 1611-1615 into the group object 1631. FIG. 16A (upper side) shows a state immediately after that. In FIG. 16A, bookmark files 1611-1615 are moved into the group object 1631. Each of the bookmark files 1611-1615 has an attribute indicating a dead link or that the link works. Therefore, based on the attribute of each of the bookmark files 1611-1615, the group object processing section 224 sorts the bookmark files 1611-1615 into group 1 1621 of bookmark files 1611a and 1613a whose links work and group 2 of dead link bookmark files 1612a, 1614a, and 1615a.

The user moves the group object 1631 onto a recycle bin 1601, 1641-1642. The attribute of the recycle bin 1601 is the dead link of each bookmark file, and the recycle bin 1601 is so set that when the group object enters a predetermined range of the recycle bin 1601, a dead link bookmark file(s) will be moved into the recycle bin.

Therefore, the group object processing section 224 selects, from the group object 1631, the group 2 having the same attribute as the attribute of the recycle bin 1601, and moves the group 2 to the recycle bin 1601. FIG. 16B shows a state immediately after that. FIG. 16B shows that the bookmark files 1612a, 1614a, and 1615a sorted in the group 2 1622 has been moved to the recycle bin 1601, 1612b, 1614b, and 1615b. Further, in FIG. 16B, the bookmark files 1612, 1614, and 1615 are erased from the desktop.

Figure 17:
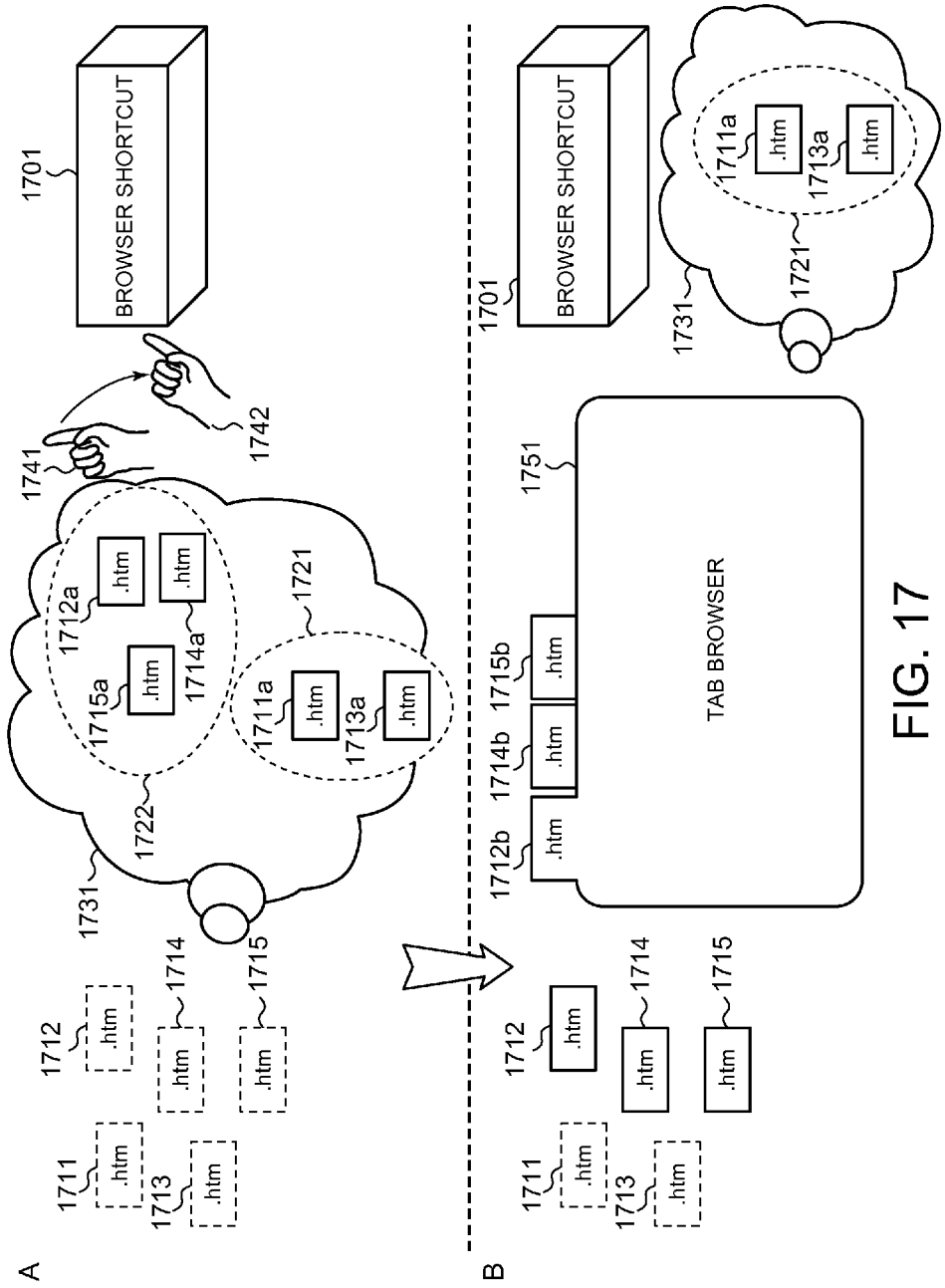
FIG. 17 is a diagram showing processing for opening, in a tab browser, files having a predetermined character string among multiple bookmark files according to the embodiments of the disclosure.

FIG. 17 is a diagram showing processing for opening, in a tab browser, files having a predetermined character string among multiple bookmarks according to the embodiments of the present invention.

The user wants to open and browse, in the tab browser, bookmark files each having predetermined characters (e.g., IBM) in the URL as its attribute among the bookmark files (where IBM is a trademark). Therefore, the user turns on the group object manipulating mode to call a group object 1731 and put the bookmark files 1711-1715 into the group object 1731. FIG. 17A (upper side) shows a state immediately after that. In FIG. 17A, the bookmark files 1711-1715 are moved into the group object 1731. The bookmark files 1711 and 1713 do not include the characters of IBM in each URL. On the other hand, the bookmark files 1712, 1714, and 1715 include the character string of IBM in each URL. Based on the attribute (URL) contained in each of the bookmark files 1711-1715, the group object processing section 224 sorts the bookmark files into group 1 1721 of the bookmark files 1711a and 1713a that do not include the characters of IBM in each URL and group 2 of the bookmark files 1712*a*, 1714*a*, and 1715*a* including the characters of IBM in each URL.

The user moves the group object 1731 into a predetermined range of a browser shortcut 1701 as the destination object 1741 and 1742. The attribute of the browser shortcut 1701 indicates bookmark files including the characters of IBM in each URL, and the browser shortcut 1701 is set to open, in a tab browser 1751, bookmark files including the characters of IBM in each URL.

Therefore, the group object processing section 224 selects, from the group object 1731, the group 2 having the same attribute as the attribute of the browser shortcut 1701, and opens, in the tab browser 1751, each of the bookmark files 1712*a*, 1714*a*, and 1715*a* belonging to the group concerned. FIG. 17B shows a state immediately after that. In FIG. 17B, the tab browser 1751 reads the bookmark files 1712, 1714, and 1715 and displays a web page specified by each URL. Currently, the content specified by the URL of the bookmark file 1712 is displayed. The user can change tags to browse the contents of the bookmark file 1714 and the bookmark file 1715 sequentially. The tab browser 1751 can read multiple bookmark files in chronological order, for example, from a bookmark file stored last in the group 2. Further, in FIG. 17B, the bookmark files 1712*a*, 1714*a*, and 1715*a* are erased from the group object 1731, and the icons of the bookmark files 1712, 1714, and 1715 on the desktop are returned to those indicated by the solid lines.

FIG. 17 is described by taking, as an example, a case where the destination object is the browser shortcut 1701 that can open multiple bookmark files at a time. However, when the browser does not open multiple bookmark files at a time, the group object processing section 224 can activate multiple windows corresponding to the number of bookmark files, start the browser for each window, and read each bookmark file to display the content specified by the URL of the bookmark file. The above windows can be displayed hierarchically in chronological order, for example, from a bookmark file stored last.

Further, when the destination object is an editor shortcut, rather than the browser shortcut 1701, the group object processing section 224 can read from the first bookmark file in ascending order of the alphabet in a manner to make it editable.

Figure 18:
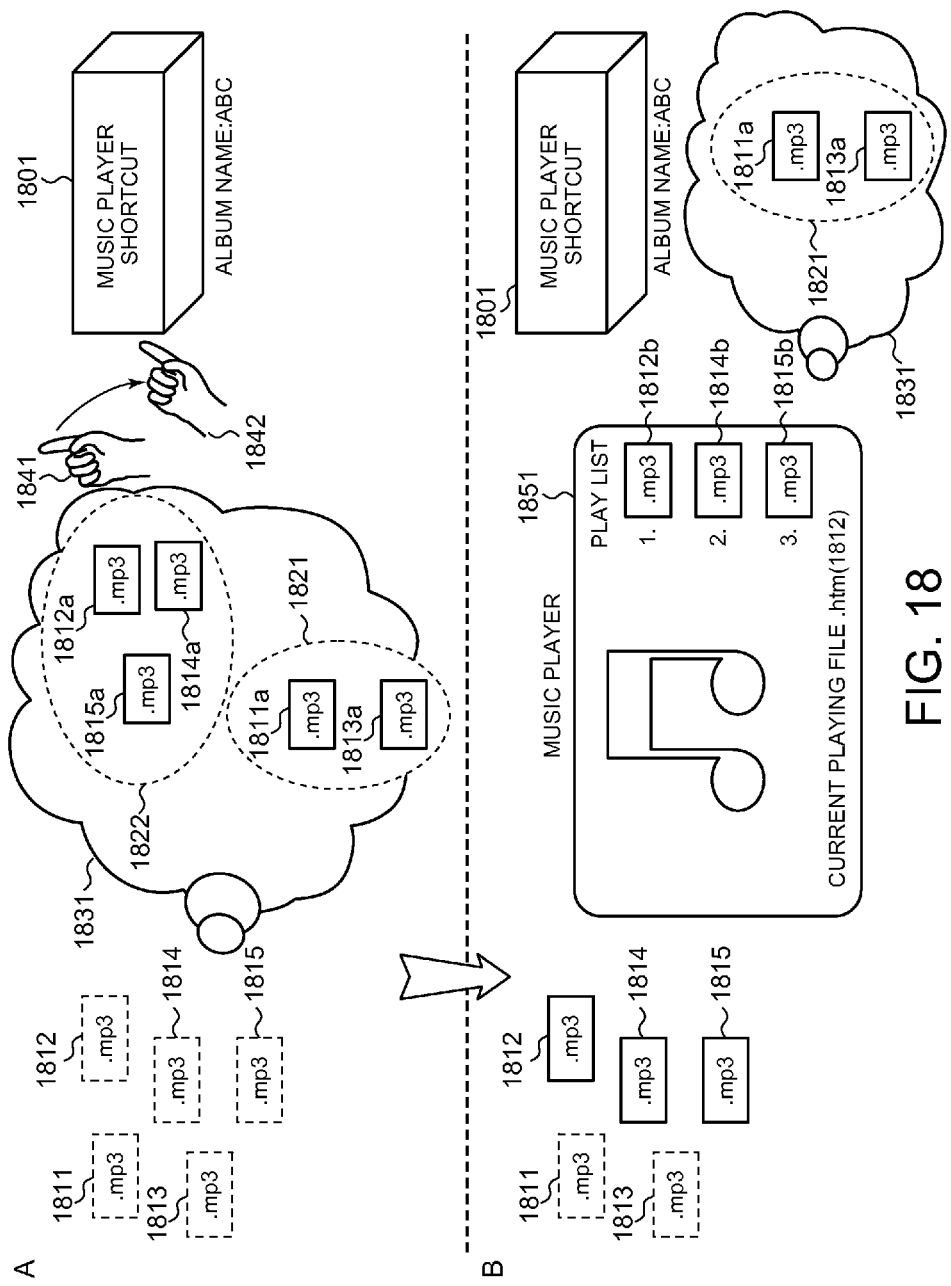
FIG. 18 is a diagram showing processing for opening, in a music player, files having a predetermined album name among multiple music files according to the embodiments of the disclosure.

FIG. 18 is a diagram showing processing for opening, in a music player, files having a predetermined album name among multiple music files according to the embodiments of the present invention.

The user wants to open, in a music player, music files having an album name "ABC" as an attribute among multiple music files. Therefore, the user turns on the group object manipulating mode to call a group object 1831 and put music files 1811-1815 into the group object 1831. FIG. 18A (upper side) shows a state immediately after that. In FIG. 18A, music files 1811-1815 are moved into the group object 1831. The album name contained in the music files 1811 and 1813 as the attribute is "XYZ." On the other hand, the album name contained in the music files 1812, 1814, and 1815 as the attribute is "ABC." Based on the attribute (album name) contained in each of the music files 1811-1815, the group object processing section 224 sorts the music files into group 1 1821 of the music files 1811*a* and 1813*a* whose album name is not "ABC" and group 2 of the music files 1812*a*, 1814*a*, and 1815*a* whose album name is "ABC."

The user moves the group object 1831 into a predetermined range of a music player shortcut 1801 as a destination object 1841 and 1842. The attribute of the music player shortcut 1801 indicates music files whose album name is "ABC," and the music player shortcut 1801 is so set that the music files whose album name is "ABC" will be opened in the music player shortcut 1801.

Therefore, the group object processing section 224 selects, from the group object 1831, the group 2 having the same attribute as the attribute of the music player shortcut 1801, and opens, in a music player 1851, each of the music files 1812*a*, 1814*a*, 1815*a* belonging to the group. FIG. 18B shows a state immediately after that. In FIG. 18B, the music player 1851 reads the music files 1812, 1814, and 1815 and sets them in a play list. Currently, the music file 1812 is being played. The music player 1851 plays back the read music files 1812, 1814, and 1815 sequentially. For example, the music player 1851 can read multiple music files in order of the frequency of playing each music file or in order of music pieces in each album. Further, in FIG. 18B, the music files 1812*a*, 1814*a*, and 1815*a* are erased from the group object 1831, and the icons of the music files 1812, 1814, and 1815 on the desktop are returned to those indicated by the solid lines.

FIG. 18 is described by taking, as an example, a case where the destination object is the music player shortcut 1801 that can open multiple music files at a time. Even when the destination object is a playback or browsing application (for example, a video player, an image viewer, or an electronic book reader) or its shortcut, files to be played back can be processed by a method similar to that shown in the description of FIG. 18.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodi-

What is claimed is:

1. A method comprising:

displaying a plurality of icons for files and a plurality of icons for folders within a graphical user interface;

receiving a first user input to create a group object, which results in the group object being created and displayed in the graphical user interface;

selecting a set of two or more file icons via a second user input for inclusion within the displayed group object;

moving, within the graphical user interface responsive to additional user input, the group object containing the selected files to within a predetermined range of a first folder icon and a second folder icon;

responsive to moving the group object, determining a first subset of files and a second set of files of the group object to be moved or copied to the first folder and the second folder, wherein the first subset and the second subset each comprises at least one but less than a total number of files of the group object, wherein selection of the files within the subset is based on whether attributes of the at least one of the first and second folder match attributes of the files; and responsive to moving the group object, moving or copying the determined first subset of files to the first one of the folders and the determined second set subset of files to the second one of the folders to which the group object was moved within the predetermined range of.

2. The method of claim 1, further comprising:

receiving user input to remove the group object from the user interface responsive to user input; and responsive to the user input to remove the group object, returning each icon of the group object to its original location in the graphical user interface and removing the group object from the graphical user interface.

3. The method of claim 1, further comprising:

adjusting a displayed size of the group object each time a quantity of selected icons within the group object changes, wherein the displayed size of the group object is increased for each object added to the group object, wherein the displayed size of the group object is decreased for each object removed from the group object.

4. The method of claim 1, further comprising:

maintaining a display state for the group object, wherein display states comprises a full display state and a minimized display state, wherein icons of the files of the group object are displayed within the group object when it is in a full display state, wherein icons of files of the group objects are not displayed within the group object when it is in a minimized display state;

changing between the full display state and the minimized display state of the group object responsive to user input; and responsive to the changing, adjusting the maintained display state for the group object in accordance with a current post-change state of the group object and adjusting a display within the graphical user interface of the group object in accordance with a current post-change state of the group object.

5. The method of claim 1, further comprising:

maintaining the group object until an explicit user action to deactivate the group object;

after selecting a set of two or more icons for the group object, executing a plurality of user-interactive actions after the group object is established that have nothing to do with the group object, and taking programmatic actions for each of the user-interactive actions as appropriate for these user-interactive actions; and after executing the plurality of user-interactive actions, moving the group object within the graphical user display to within the predetermined range of the folder icon.

6. A computer program product comprising:

one or more non-transitory computer-readable storage devices; and program instructions, stored on at least one of the one or more storage devices, to display a plurality of icons for files and a plurality of icons for folders within a graphical user interface;

program instructions, stored on at least one of the one or more storage devices, to receive a first user input to create a group object, which results in the group object being created and displayed in the graphical user interface;

program instructions, stored on at least one of the one or more storage devices, to select a set of two or more file icons via a second user input for inclusion within the displayed group object, wherein the group object is able to read at least one attribute associated with each file within the group object;

program instructions, stored on at least one of the one or more storage devices, to move, within the graphical user interface responsive to additional user input, the group object containing the selected files to within a predetermined range of one of the icons for one of the folders;

program instructions, stored on at least one of the one or more storage devices, to, responsive to moving the group object, determine a subset of files of the group object, wherein the subset comprises at least one but less than a total number of files of the group object, wherein selection of the files within the subset is based on whether attributes of the folder match attributes of the files; and program instructions, stored on at least one of the one or more storage devices, to, responsive to moving the group object, move or copy the determined subset of files to the one of the folders to which the group object was moved within the predetermined range of.

7. The computer program product of claim 6, further comprising:

program instructions, stored on at least one of the one or more storage devices, to receive user input to remove the group object from the user interface responsive to user input; and program instructions, stored on at least one of the one or more storage devices, to, responsive to the user input to remove the group object, return each icon of the group object to its original location in the graphical user interface and removing the group object from the graphical user interface.

8. The computer program product of claim 6, further comprising:

program instructions, stored on at least one of the one or more storage devices, to adjust a displayed size of the group object each time a quantity of selected icons within the group object changes, wherein the displayed size of the group object is increased for each object added to the group object, wherein the displayed size of the group object is decreased for each object removed from the group object.

9. The computer program product of claim 6, further comprising:
program instructions, stored on at least one of the one or more storage devices, to maintain a display state for the group object, wherein display states comprises a full display state and a minimized display state, wherein icons of the files of the group object are displayed within the group object when it is in a full display state, wherein icons of files of the group objects are not displayed within the group object when it is in a minimized display state;
program instructions, stored on at least one of the one or more storage devices, to change between the full display state and the minimized display state of the group object responsive to user input; and
program instructions, stored on at least one of the one or more storage devices, to, responsive to the changing, adjust the maintained display state for the group object in accordance with a current post-change state of the group object and adjusting a display within the graphical user interface of the group object in accordance with a current post-change state of the group object.

10. The computer program product of claim 6, further comprising:
program instructions, stored on at least one of the one or more storage devices, to maintain the group object until an explicit user action to deactivate the group object;
program instructions, stored on at least one of the one or more storage devices, to, after selecting a set of two or more icons for the group object, execute a plurality of user-interactive actions after the group object is established that have nothing to do with the group object, and taking programmatic actions for each of the user-interactive actions as appropriate for these user-interactive actions; and
program instructions, stored on at least one of the one or more storage devices, to, after executing the plurality of user-interactive actions, move the group object within the graphical user display to within the predetermined range of the folder icon.

11. A computer system comprising: one or more processors, one or more computer-readable memories, and one or more computer readable tangible storage devices;
program instructions, stored on at least one of the one or more storage devices for execution by at least one of the one or more processors via at least one of the one or more memories, to receive a first user input to create a group object, which results in the group object being created and displayed in the graphical user interface;
program instructions, stored on at least one of the one or more storage devices for execution by at least one of the one or more processors via at least one of the one or more memories, to select a set of two or more file icons via a second user input for inclusion within the displayed group object;
program instructions, stored on at least one of the one or more storage devices for execution by at least one of the one or more processors via at least one of the one or more memories, to move, within the graphical user interface responsive to additional user input, the group object containing the selected files to within a predetermined range of one of the icons for one of the folders, wherein the group object is able to read at least one attribute associated with an object stored in the folder to which the group object is moved within the predetermined range of;
program instructions, stored on at least one of the one or more storage devices for execution by at least one of the one or more processors via at least one of the one or more memories, to moving the group object, determine a subset of files of the group object, wherein the subset comprises at least one but less than a total number of files of the group object, wherein selection of the files within the subset is based on whether attributes of the folder match attributes of the files; and
program instructions, stored on at least one of the one or more storage devices for execution by at least one of the one or more processors via at least one of the one or more memories, to, responsive to moving the group object, move or copy the determined subset of files to the one of the folders to which the group object was moved within the predetermined range of.

12. The computer system of claim 11, further comprising:
program instructions, stored on at least one of the one or more storage devices for execution by at least one of the one or more processors via at least one of the one or more memories, to receive user input to remove the group object from the user interface responsive to user input; and
program instructions, stored on at least one of the one or more storage devices for execution by at least one of the one or more processors via at least one of the one or more memories, to, responsive to the user input to remove the group object, return each icon of the group object to its original location in the graphical user interface and removing the group object from the graphical user interface.

13. The computer system of claim 11, further comprising:
program instructions, stored on at least one of the one or more storage devices for execution by at least one of the one or more processors via at least one of the one or more memories, to adjust a displayed size of the group object each time a quantity of selected icons within the group object changes, wherein the displayed size of the group object is increased for each object added to the group object, wherein the displayed size of the group object is decreased for each object removed from the group object.

14. The computer system of claim 11, further comprising:
program instructions, stored on at least one of the one or more storage devices for execution by at least one of the one or more processors via at least one of the one or more memories, to maintain a display state for the group object, wherein display states comprises a full display state and a minimized display state, wherein icons of the files of the group object are displayed within the group object when it is in a full display state, wherein icons of files of the group objects are not displayed within the group object when it is in a minimized display state;
program instructions, stored on at least one of the one or more storage devices for execution by at least one of the one or more processors via at least one of the one or more memories, to change between the full display state and the minimized display state of the group object responsive to user input; and
program instructions, stored on at least one of the one or more storage devices for execution by at least one of the one or more processors via at least one of the one or more memories, to, responsive to the changing, adjust the maintained display state for the group object in accordance with a current post-change state of the group object and adjusting a display within the graphical user interface of the group object in accordance with a current post-change state of the group object.

15. The computer system of claim 11, further comprising:
program instructions, stored on at least one of the one or more storage devices for execution by at least one of the one or more processors via at least one of the one or more memories, to maintain the group object until an explicit user action to deactivate the group object;
program instructions, stored on at least one of the one or more storage devices for execution by at least one of the one or more processors via at least one of the one or more memories, to after selecting a set of two or more icons for the group object, execute a plurality of user-interactive actions after the group object is established that have nothing to do with the group object, and taking programmatic actions for each of the user-interactive actions as appropriate for these user-interactive actions; and
program instructions, stored on at least one of the one or more storage devices for execution by at least one of the one or more processors via at least one of the one or more memories, to after executing the plurality of user-interactive actions, move the group object within the graphical user display to within the predetermined range of the folder icon.

16. A method comprising:
selecting two or more of a plurality of displayed objects within a graphical user interface in response to a first operation performed by software executing on a device comprising hardware, wherein said first operation occurs responsive to a first user input;
displaying in the graphical user interface a group object used for manipulating selected objects, wherein the displaying occurs in response to a second operation performed by software executing on the device, wherein the second operation occurs responsive to a second user input;
displaying, in the graphical user interface, the selected objects within the group object in response to a third operation performed by software executing on the device; and
when the group object has been moved by additional user input within the graphical user interface from a starting position to within a predetermined range of a first destination object, dynamically sorting the objects in the group object according to a position or a distance between the group object and the first destination object, copying or moving a subset of the selected objects into the first destination object, wherein said subset comprises at least one object but less than a total number of objects contained within the group object, wherein a determination of which of the selected objects is to be copied or moved to the first destination object is made based on attributes associated with files to which the selected objects correspond, wherein the moving of the group object within the graphical user interface occurs in response to a fourth operation performed by software executing on the device, wherein the fourth operation is performed in response to user input.

17. The method of claim 16, wherein each of the selected objects is an icon displayed on the graphical user interface, wherein the first destination object is a folder displayed on the graphical user interface, and wherein the moving of the group object to the first destination object is a drag-and-drop action in which the group object is dragged and dropped onto the first destination object.

18. The method of claim 16, further comprising:
responsive to copying or moving the subset of objects to the first destination object, removing the subset of objects from the group object.

19. The method of claim 16, further comprising:
when the group object has been moved within the graphical user interface to within a predetermined range of a second destination object after the moving to the first destination object occurs, copying or moving a different subset of the selected objects into the second destination object, wherein said different subset comprises at least one object but less a total number of objects contained within the group object, wherein a determination of which of the selected objects is to be copied or moved to the first destination object is made based on attributes associated with files to which the selected objects correspond, wherein the moving of the group object within the graphical user interface occurs in response to a fifth operation performed by software executing on the device, wherein the fifth operation occurs in response to user input.

20. The method of claim 16, further comprising: reading one or more attributes associated with the first destination object; and selecting the subset of objects to copy or move to the first destination object based on those objects that have one of the attributes associated with a corresponding file that matches the read one or more attributes of the first destination object.

21. The method of claim 16, wherein the first destination object is a folder that has an attribute associated with it that indicates a type of file that is to be contained in the folder, wherein each of the selected objects have an associated extension that indicates a type of file represented by that object, wherein the subset of objects that are copied or moved are based on each of the objects in the subset of objects having a type of file matching the type of file associated with the folder.

22. The method of claim 16, further comprising:
when there are a plurality of attributes associated with the first destination object, calculating a percentage of presence of these plurality of attributes for each of the selected objects in the group object; and
determining which of the selected objects are to be included in the subset of objects to be moved or copied based on whether a calculated percentage associated with that object exceeds a previously established percentage threshold or not.

23. The method of claim 16, further comprising:
maintaining a display state for the group object, wherein display states comprises a full display state and a minimized display state, where icons of the group object are displayed with the group object;
changing between the full display state and the minimized display state of the group object responsive to user input; and
responsive to the changing, adjusting the maintained display state for the group object in accordance with a current post-change state of the group object and adjusting a display within the graphical user interface of the group object in accordance with a current post-change state of the group object.

24. The method of claim 16, further comprising:
adjusting the size of the group object as displayed within the graphical user interface each time a quantity of selected objects within the group object changes, wherein the size of the group object is increased for each object added to the group object, wherein the size of the group object is decreased for each object removed from the group object.

25. The method of claim 16, further comprising:
receiving user input to removing the group object from the user interface responsive to user input; and
responsive to the user input to remove the group object, returning each selected object of the group object to its original location of the graphical user interface and removing the group object from the display of the graphical user interface.

* * * * *